(12) United States Patent
Bamberger et al.

(10) Patent No.: US 7,233,940 B2
(45) Date of Patent: Jun. 19, 2007

(54) SYSTEM FOR PROCESSING AT LEAST PARTIALLY STRUCTURED DATA

(75) Inventors: Naama Bamberger, Jerusalem (IL); Uri Bernstein, Jerusalem (IL); Gil Reich, Eli (IL); Tamar Rosen, Jerusalem (IL); Lev Reitblat, Ma'ale Adumim (IL); Rita Zlotnikov, Jerusalem (IL); Mike Berkowitz, Aloe Shvut (IL); Yehudit Halle, Jerusalem (IL); Jack Kustanowitz, Jerusalem (IL); Yedida Lubin, Jerusalem (IL); Oren Samuel, Jerusalem (IL)

(73) Assignee: Answers Corporation, New York, NY (US)

( * ) Notice: Subject to any disclaimer, the term of this patent is extended or adjusted under 35 U.S.C. 154(b) by 293 days.

(21) Appl. No.: 09/985,486

(22) Filed: Nov. 5, 2001

(65) Prior Publication Data

US 2002/0178394 A1    Nov. 28, 2002

(51) Int. Cl.
*G06F 17/30* (2006.01)
(52) U.S. Cl. .................. 707/3; 707/102; 707/104.1; 707/103 R
(58) Field of Classification Search ............... 707/1–5, 707/100–104.1, 203, 204
See application file for complete search history.

(56) References Cited

U.S. PATENT DOCUMENTS

| | | |
|---|---|---|
| 5,115,504 A | 5/1992 | Belove et al. |
| 5,544,352 A | 8/1996 | Egger |
| 5,659,732 A | 8/1997 | Kirsch |
| 5,710,918 A | 1/1998 | Lagarde et al. |
| 5,721,911 A | 2/1998 | Ha et al. |
| 5,745,895 A | 4/1998 | Bingham et al. |
| 5,781,911 A | 7/1998 | Young et al. |
| 5,794,246 A | 8/1998 | Sankaran et al. |
| 5,826,261 A | 10/1998 | Spencer |
| 5,867,799 A | 2/1999 | Lang et al. |
| 5,870,746 A | 2/1999 | Knutson et al. |
| 5,907,838 A | 5/1999 | Miyasaka et al. |
| 5,920,854 A | 7/1999 | Kirsch et al. |
| 5,930,788 A | 7/1999 | Wical |
| 5,940,821 A | 8/1999 | Wical |
| 5,953,718 A | 9/1999 | Wical |
| 5,963,944 A | 10/1999 | Adams |
| 5,983,214 A | 11/1999 | Lang et al. |
| 5,987,454 A | 11/1999 | Hobbs et al. |
| 6,038,560 A | 3/2000 | Wical |
| 6,044,374 A | 3/2000 | Nesamoney et al. |
| 6,067,539 A | 5/2000 | Cohen |
| 6,085,190 A | 7/2000 | Sakata |
| 6,101,491 A | 8/2000 | Woods |
| 6,102,969 A | 8/2000 | Christianson et al. |
| 6,141,659 A | 10/2000 | Barker et al. |
| 6,144,958 A | 11/2000 | Ortega et al. |
| 6,148,298 A | 11/2000 | LaStrange et al. |
| 6,151,601 A | 11/2000 | Papierniak et al. |

(Continued)

*Primary Examiner*—Sana Al-Hashemi
(74) *Attorney, Agent, or Firm*—Hoffman, Wasson & Gitler, P.C.

(57) ABSTRACT

An improved system for processing at least partially structured data includes a method for comparing a population of terms in a term repository, including standardizing each term within the population of terms based on at least one standardization rule. The method also includes comparing at least a pair of terms including determining a match between the terms if, once standardized, they are substantially identical.

17 Claims, 73 Drawing Sheets

U.S. PATENT DOCUMENTS

| | | |
|---|---|---|
| 6,151,604 A | 11/2000 | Wlaschin et al. |
| 6,154,213 A * | 11/2000 | Rennison et al. ........... 715/854 |
| 6,161,103 A | 12/2000 | Rauer et al. |
| 6,163,781 A | 12/2000 | Wess, Jr. |
| 6,163,782 A | 12/2000 | Singhal |
| 6,167,405 A | 12/2000 | Rosensteel, Jr. et al. |
| 6,178,416 B1 | 1/2001 | Thompson et al. |
| 6,178,418 B1 | 1/2001 | Singer |
| 6,182,082 B1 | 1/2001 | Tanaka et al. |
| 6,185,550 B1 | 2/2001 | Snow et al. |
| 6,185,572 B1 | 2/2001 | Blackman et al. |
| 6,189,004 B1 | 2/2001 | Rassen et al. |
| 6,208,975 B1 | 3/2001 | Bull et al. |
| 6,208,988 B1 | 3/2001 | Schultz |
| 6,212,524 B1 | 4/2001 | Weissman et al. |
| 6,226,632 B1 | 5/2001 | Takahashi et al. |
| 6,226,635 B1 | 5/2001 | Katariya |
| 6,233,581 B1 | 5/2001 | Rambaud et al. |
| 6,233,584 B1 | 5/2001 | Purcell |
| 6,236,768 B1 | 5/2001 | Rhodes et al. |
| 6,236,987 B1 | 5/2001 | Horowitz et al. |
| 6,236,988 B1 | 5/2001 | Aldred |
| 6,236,991 B1 | 5/2001 | Frauenhofer et al. |
| 6,236,994 B1 | 5/2001 | Swartz et al. |
| 6,240,407 B1 | 5/2001 | Chang et al. |
| 6,263,341 B1 | 7/2001 | Smiley |
| 6,272,495 B1 | 8/2001 | Hetherington |
| 6,275,824 B1 | 8/2001 | O'Flaherty et al. |
| 6,278,990 B1 | 8/2001 | Horowitz |
| 6,282,537 B1 | 8/2001 | Madnick et al. |
| 6,314,434 B1 * | 11/2001 | Shigemi et al. ............. 707/203 |
| 6,381,592 B1 * | 4/2002 | Reuning ........................ 707/3 |
| 6,411,924 B1 * | 6/2002 | de Hita et al. .................. 704/9 |
| 6,647,391 B1 * | 11/2003 | Smith et al. ................. 707/100 |

* cited by examiner

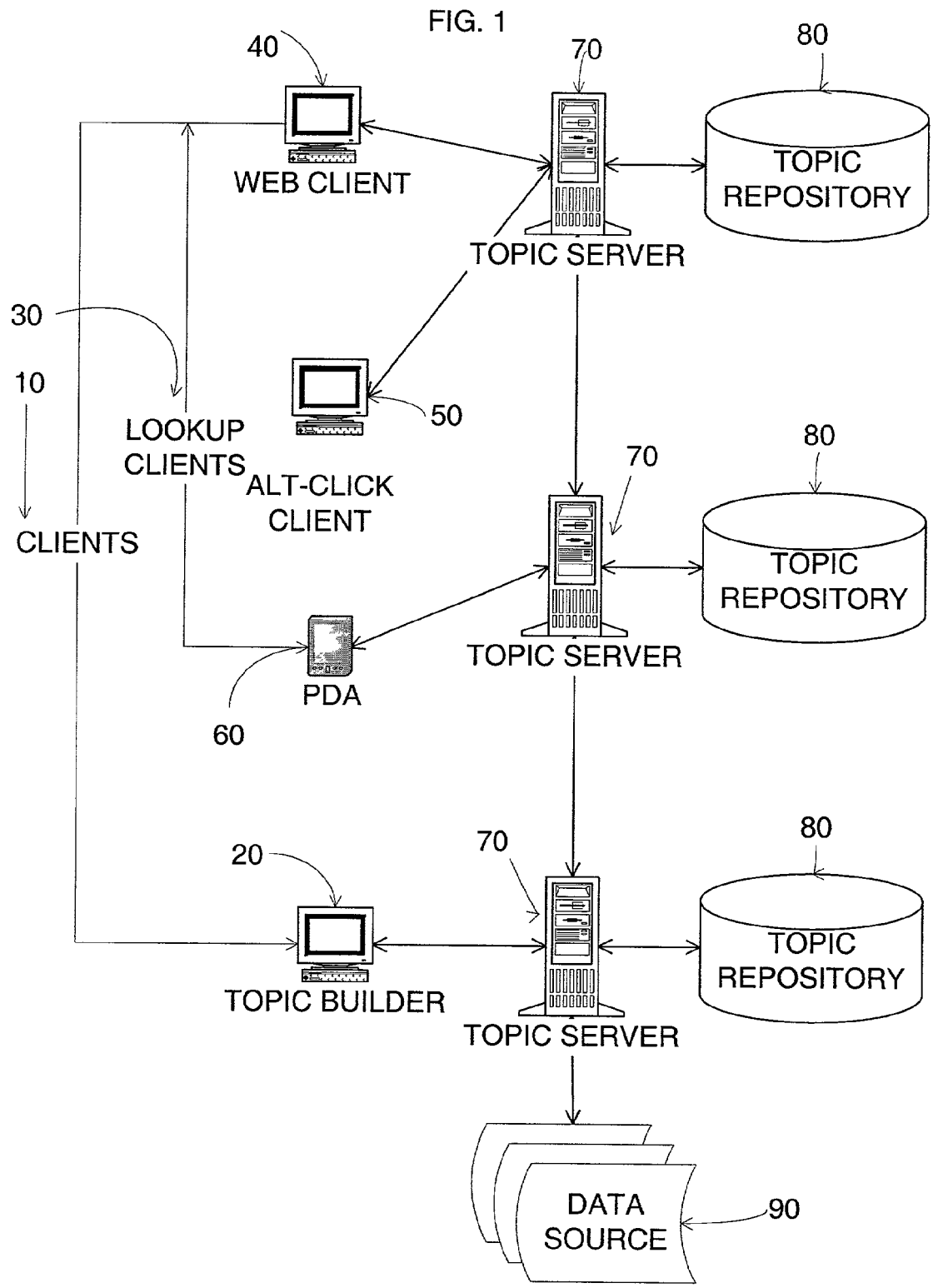

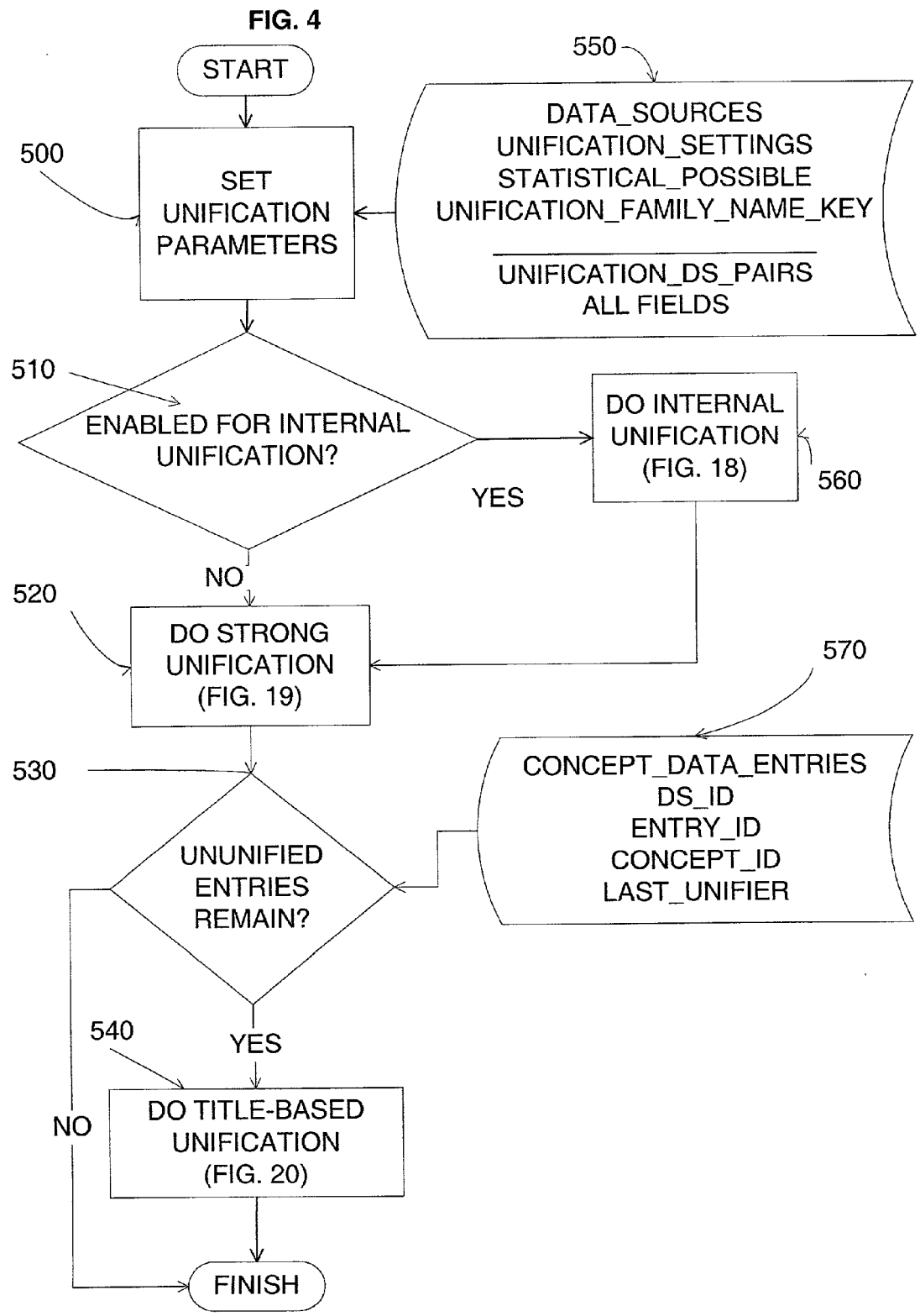

Fig. 24

| Name | Extention | Email | Room |
|---|---|---|---|
| Johm Smith | 3345 | john_s | 122 |
| Jeff Prescott | 1234 | jeff_p | 231 |

Atomica

Did You Mean?

Plane

Fleet

Internet Keywords

Web Serach

Send Page

Your Feedback

What's New

737-600

Bought from: Boeing Douglas Prod. Division
SITA: TOAMD7X
Purchace Date: August 24. 1998

The newest member of Boeing 737 family - the next generation 737/-600/-700/-800/-900 models The 737-600 is the smallest member of the family and can carry 110 - 132 passengers.

Passengers
Typical 3-class configuration: N/A
Typical 2-class configuration: 110
Typical 1-class configuration: 132

Fig. 32

| | ID | Title | Data |
|---|---|---|---|
| 1 | 1 | Barrel | A volumetric unit of measure equivalent to |
| 2 | 2 | Biomass | Organic non-fossil material of biological or |
| 3 | 3 | Blast Furn | A shaft furnace in which solid fuel (coke) i |
| 4 | 4 | Blast Furn | The waste combustible gas generated in |

Dispalying 96/96 records.

Close

Fig. 34

During integration, topics will be created for entries in the new data source. This step lets you set up how the Title, Description, and Triggers for the new topics will be generated from the data.

If this data source will only be used as a child in Related Data Source relationship, you do not need to set up Topic Creation Attribute for this data source.

Do you want to set up topic creation attributes? ● Yes ○ No

Title
Description:
Trigger Phrase
Name | Exact | Priority
[TITLE] ☑ Normal

Data Source Fields:
DATA TITLE

<Back  Next>  Cancel  Help

Fig. 35

Will you need to update this data source at some point in the future? You should configure update properties if you will want to "reintegrate" the data you are integrating now at a later date (due to changes in the original data).

⦿ I will not need to reintegrate data to this data source, and the ability to add entries one at a time later on will suffice.

◯ I want the ability to reintegrate new or change data to this data source.

Set up a field or combination of fields that will be able to uniquely identify a data entry between updates. Choose something that is not likely to change between updates.

Unique Key: [ TITLE ]       [ <- ]

Data Source Fields:
DATA
TITLE

[ <Back ] [ Next> ] [ Cancel ] [ Help ]

Fig. 36

The Presentation Template dictates how data from the data source will be displayed to the user in the Atomica window.

The default template will show all fields to the user, and you will be able to change the order, font size, and other parameters later on from the data source's properties.

The template creator will allow you to generate a more complicated template up front, using different colored text, bulleted lists, and other graphic elements.

Which presentation template would you like to use?
◉ Use a default template that includes all fields.
○ Run the Template Creator to generate a more detailed template.

[<Back] [Next>] [Cancel] [Help]

Fig. 45

Fields:
DATA
TITLE

Match string from Company
[TITLE]

Fields:
HTML
KEY
PERFORMANCE
PORTFOLIO
PREFERENCES
PRLTITLE
RISK

To string from DS_CustProfile
[TITLE]

Note: to build the string for matching, you can copy field names from the lists on the left, or type free text into the text boxes.

Allow variations in:
☑ Capitals / Lowers case  ☑ Common words  ☐ Word form
☑ Punctuation  ☑ Word order  ☑ Accented characters OK   Cancel   Help

Fig. 51

Run on the following days:
- ● Days of the weeks
  - ☑ Sunday ☑ Monday ☑ Tuesday ☑ Wednesday
  - ☑ Thursday ☑ Friday ☑ Saturday
- ○ Day of the month
  - [ 1 ]

Time of day
Starting Time: [ 1:00:00 AM ]  [ Once a day ▽ ]

Error Notification E-Mail Addresses:
[ notify@company.com ]  [ Test ]
To notify more than one person, separate E-Mail addresses with semicolon (;)

[ OK ]  [ Cancel ]  [ Help ]

Fig. 61

Admin Help

Groups | Users

⊞ EVERYONE
⊞ Account Operators
⊞ Administrators
⊞ Backup operators
⊞ Bedrock
⊞ Cert Publishers
⊞ Content
⊞ Demo
⊞ DEV General Permissions:

| | Create DS's | Modify Topics | Admini. |
|---|---|---|---|
| General | Deny | Deny | Deny |

Per Data Source Permissions:

| Data Source | Read | Write | Delete |
|---|---|---|---|
| ACCUWEATH... | Deny | Deny | Deny |
| acronim test | Deny | Deny | Deny |
| AHD 4 Abbr | Deny | Deny | Deny |

SYSTEM FOR PROCESSING AT LEAST PARTIALLY STRUCTURED DATA

REFERENCE TO COMPUTER PROGRAM LISTING APPENDIX

A Computer program listing appendix is submitted herewith on one compact disc and one duplicate compact disc. The total number of compact discs including duplicates is two. The files on the compact disc are software object code and accompanying files for carrying out the preferred embodiment of the invention. Their names, dates of creation, directory locations, and sizes in bytes are: ATOMICA.HEX of Oct. 30, 2001 located in folder \APPENDIX and of length 284, 508, 561 bytes. The material on the compact discs is incorporated by reference herein.

FIELD OF THE INVENTION

The present invention relates to apparatus and methods for accessing and organizing information.

BACKGROUND OF THE INVENTION

There are many publications describing various systems for accessing and organizing information.

One such system is the information repository system and method including data objects and a relationship object described in U.S. Pat. No. 6,263,341 B1 to Smiley. Smiley describes a data model for an information repository, which models data as objects, and also describes the relationships or interdependencies between the data, their physical storage or access information and rules of methods of accessing the data.

The disclosures of all publications mentioned in the specification and of the publications cited therein are hereby incorporated by reference.

SUMMARY OF THE INVENTION

The present invention seeks to provide an improved system for processing at least partially structured data.

There is thus provided, in accordance with a preferred embodiment of the present invention, a method for comparing a population of terms in a term repository including standardizing each term within the population of terms based on at least one standardization rule, and comparing at least a pair of terms including determining a match between the terms if, once standardized, they are substantially identical.

Further in accordance with a preferred embodiment of the present invention, each term includes an alphanumeric sequence.

Still further in accordance with a preferred embodiment of the present invention, the method also includes accepting a user's definition of at least one standardization rule from among a plurality of standardization rules.

Additionally in accordance with a preferred embodiment of the present invention, at least one standardization rule assumes insignificance, for the purposes of the comparing step, of a corresponding at least one term attribute.

Still further in accordance with a preferred embodiment of the present invention, at least one term attribute includes at least one of the following group: lower/upper case, presence/absence of diacritical marks, presence/absence of punctuation, and morphological conjugation.

Further in accordance with a preferred embodiment of the present invention, the comparing step includes groupwise comparison of a first group of terms and a second group of terms.

Still further in accordance with a preferred embodiment of the present invention, at least one standardization rule assumes insignificance, for the purposes of the comparing step, of a corresponding attribute of a group of terms.

Additionally in accordance with a preferred embodiment of the present invention, the at least one attribute of a group of terms includes the order in which the terms appear within the group.

Further in accordance with a preferred embodiment of the present invention, the at least one attribute of a group of terms includes presence/absence of terms assumed to be insignificant for purposes of the comparison step.

Still further in accordance with a preferred embodiment of the present invention, the method also includes using a defined distance function to compute the extent to which each term, after standardization, deviates from the same term before standardization.

Also provided, in accordance with another preferred embodiment of the present invention, is a system for processing at least partially structured data including a topic repository, a topic repository populator operative at least partially automatically to employ structure in at least partially structured data to organize the data in association with the topic repository to facilitate access to the data by topic, and a topic oriented user interface employed by a user to access the data in association with the topic repository by topic.

Further provided in accordance with another preferred embodiment of the present invention, for use in a system for processing at least partially structured data including a topic repository and a topic oriented user interface employed by a user to access the data in the topic repository by topic, is a topic repository populator operative at least partially automatically to employ structure in at least partially structured data to organize the data in the topic repository to facilitate access to the data by topic.

Additionally provided, in accordance with another preferred embodiment of the present invention, is a method for processing at least partially structured data including at least partially automatically employing structure in at least partially structured data to organize the data in association with a topic repository to facilitate access to the data by topic, and employing a topic oriented user interface to access the data in association with the topic repository by topic.

Further provided, in accordance with another preferred embodiment of the present invention, for use in a method for processing at least partially structured data including a topic repository and a topic oriented user interface employed by a user to access the data in the topic repository by topic, is a step for at least partially automatically employing structure in at least partially structured data to organize the data in the topic repository to facilitate access to the data by topic.

Also provided, in accordance with another preferred embodiment of the present invention, is topic server apparatus including a topic extractor operative to automatically prepare at least one data source, the data source including a multiplicity of data entries, for topic-based retrieval, by automatically extracting a multiplicity of topics from the data entries such that each data entry is assigned to at least one topic, a disambiguator operative to automatically rank the relevancy of each of the multiplicity of topics to a given query including defining at least one most relevant topics, and a data accessor operative to automatically access at least some of the data entries assigned to at least one of the most relevant topics.

Also provided, in accordance with another preferred embodiment of the present invention, is an assembly of intercommunicating topic servers, each topic server including a topic extractor operative to prepare at least one data source, the data source including a multiplicity of data entries, for topic-based retrieval, by extracting a multiplicity of topics from the data entries such that each data entry is assigned to at least one topic, a disambiguator operative to rank the relevancy of each of the multiplicity of topics to a given query including defining at least one most relevant topics, and a data accessor operative to access at least some of the data entries assigned to at least one of the most relevant topics, wherein each topic server includes a topic server intercommunicator operative to receive a user's query, to present the user's query to at least one additional topic server, and to receive at least one data entries assigned to at least one topic extracted by the at least one additional topic server and ranked by the at least one additional topic server as relevant to the user's query, from at least one data source associated with the additional topic server.

Further in accordance with a preferred embodiment of the present invention, the apparatus also includes a data entry unifier operative to unify data entries by linking a plurality of data entries to a particular topic such that, in topic-based retrieval, all of the plurality of data entries are retrieved responsive to a user's selection of the particular topic.

Still further in accordance with a preferred embodiment of the present invention, the topic extractor is operative to extract from each data entry at least one of the following group of data entry identifying characteristics: a display title, short description, unique key, and a plurality of key titles each serving as an access route to the data entry.

Further in accordance with a preferred embodiment of the present invention, the apparatus also includes at least one at least partially structured data sources each of the at least partially structured data sources including a multiplicity of separately accessible data entries each including a uniform set of at least one fields.

Still further in accordance with a preferred embodiment of the present invention, the data sources include at least a first data source including a first set of at least one fields and a second data source including a second set of at least one fields, different from the first set of at least one fields.

Also provided, in accordance with another preferred embodiment of the present invention, is apparatus for automatically generating an information retrieval system for retrieval of information from at least one at least partially structured data sources, the apparatus including rule input apparatus accepting from a user at least one data source-specific topic-generation rules corresponding respectively to at least one at least partially structured data sources, and a topic generator operative to employ the rules corresponding to each individual data source from among the at least one data sources to generate at least one topic for each data entry within that individual data source.

Further in accordance with a preferred embodiment of the present invention, the apparatus also includes a unifier operative to assign at least one data entry to a topic generated on behalf of another data entry.

Still further in accordance with a preferred embodiment of the present invention, the topic server intercommunicator is operative to receive, from the disambiguators of at least one additional topic servers, a relevancy ranking for more than one topics, and to select, from among the more than one topics, a most relevant topic over all of the at least one additional topic servers.

Also provided, in accordance with another preferred embodiment of the present invention, is a data retrieval system including a first plurality of data sources storing a multiplicity of data entries, a second plurality of topic repositories storing topic information characterizing the multiplicity of data entries, and a third plurality of topic servers associated with the second plurality of topic repositories and performing, responsive to a topic-defining query, topic-based retrieval of selected data entries from among the multiplicity of data entries based on the topic information.

Further in accordance with a preferred embodiment of the present invention, at least some of the data entries in the data sources are copied into at least one of the topic repositories.

Still further in accordance with a preferred embodiment of the present invention, less than all of the data entries in the data sources are copied into at least one of the topic repositories.

Additionally in accordance with a preferred embodiment of the present invention, a decision is made on whether to copy at least one data entry into at least one topic repository based on at least one of the following data entry characteristics: volume, frequency with which the data entry is anticipated to change, and security policy protecting access to the data entry.

Further in accordance with a preferred embodiment of the present invention, the apparatus also includes a plurality of data sources storing and providing the at least partially structured data, and an access controller operative to selectively assign, to various users, permission to access data originating from various of the plurality of data sources.

Further in accordance with a preferred embodiment of the present invention, at least one topic server intercommunicator is also operative to combine at least one data entries provided by at least one additional topic server with at least one data entries accessed by another topic server, thereby to generate a combined response to the user's query which includes data entries associated with more than one topic server.

The following terms used in the specification and claims include the following scopes of definition:

Data Source: A repository of data that the system must make available for retrieval. The term is also used to indicate the internal system object that represents a Data Source. Each Data Source is comprised of at least one Data Entry.

Data Entry: The term is also used to indicate the internal system object that represents a Data Entry. An element of at-least-partially structured data that represents a unique object to a Data Source. The term is also used to indicate the internal system object that represents a Data Entry. Each Data Entry is comprised of at least one Data Field.

Data Field: The fundamental unit of data in the system, comprised of a Name and a Value.

Strong (or Special) Unification: Unification setting that indicates that two Data Sources are very likely to contain entries for the same topic. For example, 2 Data Sources that list public companies. Special rules may be set governing when entries from these 2 Data Sources should be unified to each other. For example, when the value in the TCKR field of one Data Source matches the value in the SYMBOL field of the other.

Internal Unification: Unification within a Data Source. For example, an Acronyms Data Source may be internally unified, so that the entry [BTW—Back to Work] is unified with the entry [BTW—By the Way] from the same Data Source. These two entries will be displayed on the same tab for the same topic.

Title Based Unification: Unification based on the titles of entries

Statistical Unification: Unification based on overlap of significant words or phrases between entries.

Outsource Key (or Foreign Key): The identifier of a record. Standardize: Determine a common form of a word. For example "bosses" may standardize to "boss." "Épées," may be converted in steps to "épées," "epees" and "epee."

At least partially structured data: Data including at least one data entry or record having defined therewith at least one field and typically a plurality of fields. Typically, there are a plurality of data entries, each having the same fields. At least some fields typically include free, i.e., unstructured text.

Presentation template: Information that determines how entries in the data source will be displayed to the end user.

Short Description Template: A set of rules for determining the Short Description of entries of a Data Source. For example, the Short Description Template "[TEAM]: [POSITION]" would create a Short Description from the data in the fields TEAM and POSITION, separated by a colon and space (e.g., Giants: QB).

Outsource Key Template: A set of rules for determining the Outsource Key of entries of a Data Source.

Display Title Template: A set of rules for determining the Display Title of entries of a Data Source.

Key Title Template: A set of rules for determining the Key Title of entries of a Data Source.

Triggers Template: A set of rules for determining the Triggers of entries of a Data Source.

Hitlist: A list of the candidate Topics returned by the Disambiguation Engine in response to a query. For example, the Hitlist on the lookup of "Washington" would probably include George Washington, Washington D.C., Washington Redskins, etc.

Focus Word: The word upon which the user requested the lookup. In the preferred embodiment, the word upon which the user Alt-clicked.

Alt-Click: Holding the [Alt] key while clicking on a word.

Stopword: A very common word that is often disregarded by some text analysis functions. For example, "of", "and," and "the."

Unique Key (Outsource Key): A unique identifier for entries in a Data Source. This is generally used when updating a Data Source.

Title, Short Description and Trigger computation: Each of these internal system elements is computed from Data Fields in a single Data Entry. The choice, sequence and method of combining the Data Fields is determined by the user on a per-Data-Source basis, and stored in the Topic Repository.

Title: A title is a data element, which is derived from and represents a data entry. Each data entry has two kinds of titles, triggers and display titles. A "display title" is a title which is displayed to represent the data entry. A "trigger" is a title which is not a display title and comprises a sequence of words, optionally with punctuation, which if keyed in by a user triggers access to a particular data entry and/or is used for unification of data entries.

Template: A set of rules for computing a display title or trigger from a data entry.

A topic is a category with which a group of at least one and typically many data entries is associated. A Topic may be any person, place, thing, organization, idea, word, phrase, etc. It is an item that an end-user is likely to view as having a distinct and relevant identity. For example, Blockbuster Video may include the following Topics in its Enterprise Topic Repository: Each customer, employee, and supplier; Each acronym or jargon phrase used within the company or industry; Each company policy or benefit (e.g., "Sick Days," "401 K"); Each movie; Each movie category and sub-category; Each contributor to movies (each actor, producer, etc.)

A Trigger is also termed herein a "keytitle". For example, "Mark Twain" and "Samuel Clemens" are both keytitles for the same concept.

Ordered keytitles: Appear in the context in full, and in the same order in which they appear in the database:
 flea market
 in behalf of
 Los Angeles
 unordered keytitle An unordered keytitle is actually a list of words, of which only the first is typically required to appear in the context.

Unordered keytitles are used mainly for people names:
 Clinton William Jefferson Bill W. J.
 Elizabeth II Queen Unification: Data Entries are associated with Topics. For example, there are Bill Clinton Data Entries from various different Data Sources. These Data Entries are "Unified"—they are associated with the same Topic: President William Jefferson Clinton.

The Smart Data is used to help in Unification. For example, the Jane Seymour alive today is probably not the same Jane Seymour that died in the Sixteenth Century, but the Cal Ripken Data Entry from one Data Source is probably related to the same topic as the Calvin Edward Ripken Jr. Data Entry from a different Data Source, since the two Data Entries share Last Name, Birth Date, Birth Place, and Vocation.

Unification also uses fuzzy matching algorithms. For example, it compares the text of Data Entries, adding points for each number or capitalized phrase that matches between the Data Entries, and deducting points whenever a number of capitalized phrase does not match.

Optionally, unification settings are provided and the publisher can alter unification settings that govern how each Data Source unifies with other Data Sources. For example, it may be desired that the Unification Engine should not attempt to unify entries from a "cities" Data Source with entries from a "companies" Data Source. Similarly, it may be desired that the Unification Engine should not alter the word form of an Acronyms Data Source, instead unifying only on the basis of an exact match. For example, the engine would not unify the acronym 'SOS' with the word 'so'. Another example is that the Unification Engine can be set to unify two "companies" Data Sources on the basis of matching Ticker Symbol and similar company name.

A tool is also provided to allow an editor to manually change unifications.

Disambiguation: Disambiguation is the process of matching the user's lookup words to the Key Titles of the Topics in the Topic Index. The goal of Disambiguation is to select the Topic that appears to be what the user requested, giving the user's lookup words, surrounding words, the larger context, the user's preferences, and other information that the Disambiguation Engine might have learned about the user.

There are two types of Key Title:
 An Ordered Key Title: The user's lookup words must exactly match the Key Title (other than capitalization, which may vary). For example, "Cats In The Cradle" is an Ordered Key Title to the song of that name. The Disambiguation Engine will only select the Topic associated with that song if the user's query exactly matches "Cats In The Cradle."

An Unordered Key Title: The first word of the Unordered Key Title is a required word. If the user's lookup words do not include this required word, than the Disambiguation Engine will not return this Topic. The other words in the Unordered Key Title are extra credit words, and matching those words increases the score for that Key Title—but only if the required word also appeared in the user's lookup words. For example, "Clinton President Bill William Jefferson" is an Unordered Key Title for the Bill Clinton Topic, and "Clinton Hillary" is an Unordered Key Title for the Hillary Clinton Topic. If the user's lookup words are "Hillary Clinton," the Disambiguation Engine will select the Hillary Clinton Topic. If the user's lookup words are "President Clinton," the Disambiguation Engine will select the Bill Clinton Topic. If the user's lookup words include "Hillary," or "President" but do NOT include the required word Clinton, the Disambiguation Engine will not select either of the above Topics.

Other factors affecting Disambiguation include:

Key Title weight—Currently, Key Titles associated with the Bill Clinton Topic have higher weights than Key Titles associated with other Clintons. So if the user does a lookup with just the single word "Clinton," the Disambiguation Engine will select the Bill Clinton Topic.

Context—If the user is performing a lookup from a sports Web site, than the Disambiguation Engine will slightly favor Topics associated with sports. The Disambiguation Engine recognizes sports sites both words inside the document, from the document's title and meta-tags, and from the URL (e.g., contains any of the following strings "cnnsi," "espn," "sports," "nfl," etc.) Thus, the Disambiguation Engine is likely to return different results for "Nashville," or "Jazz" from sports sites than from music sites. Also, if other football terms appear in the same context, this is used as an indication that Tennessee is referring to a football team.

User preferences—User preferences can be implicit or explicit. The user may explicitly set options declaring a preference for sports, or the system may track usage to determine the user's preference for sports. Also, the user may have accessed the system through a corporation, syndicator, or distributor associated with sports. A corporate user at a pharmaceutical company will be viewed as having different preferences than a consumer accessing the system through ESPN's Web site.

Retrieval: After the Disambiguation Engine determines which Topic to display, the Retrieval Engine retrieves the Data Entries associated with that Topic. The Retrieval Engine then creates an Output Page appropriate for the user's display mechanism. If the display mechanism is a browser interface, the Output Page is an HTML document. The Output Page differs depending on whether the display mechanism is an Internet Explorer control, Netscape Navigator, Palm Pilot, WAP device, etc. In some cases, the Output may be an audio file created by speech synthesis, or by actually recording audio for specific Topics.

Publishing: Topic extraction and, optionally, unification. Unification Families—Data sources are organized into families, such as People, Places, or Things. Data sources will only unify with other data sources in the same family. This helps avoid obviously false unifications, such as between a person (Sarah Widget), and an appliance (Super Widget Holder).

BRIEF DESCRIPTION OF THE DRAWINGS AND APPENDICES

The present invention will be understood and appreciated from the following detailed description, taken in conjunction with the drawings and appendices in which:

FIG. 1 is a simplified functional block diagram of a system for processing semi-structured data to facilitate information retrieval by a population of end-users;

FIG. 4 is a simplified flowchart illustration of a unification process performed by the unification block in the topic server of FIG. 2A;

Figure 2A:
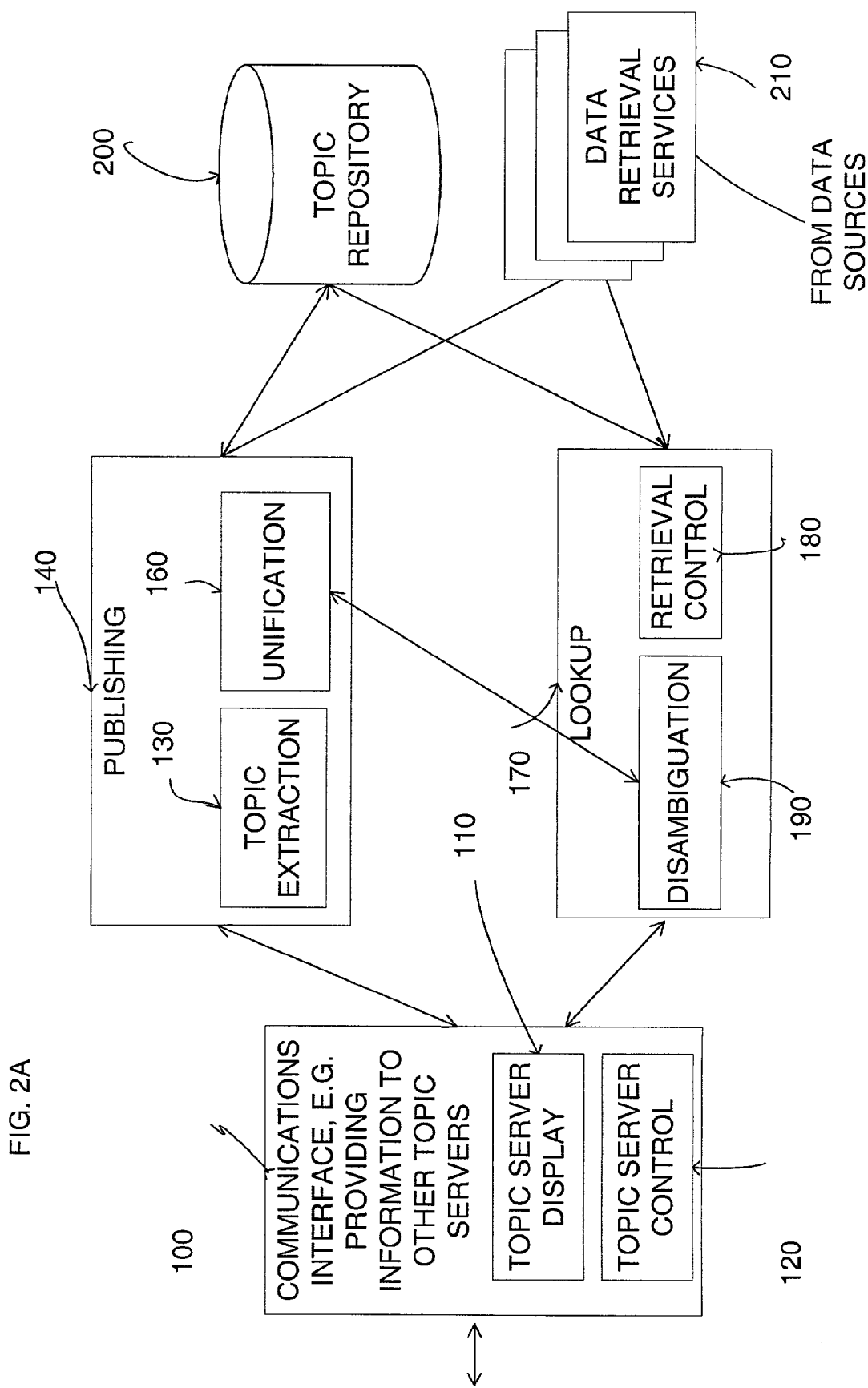
FIG. 2A is a simplified functional block diagram of the topic server of FIG. 1.
Figure 2B:
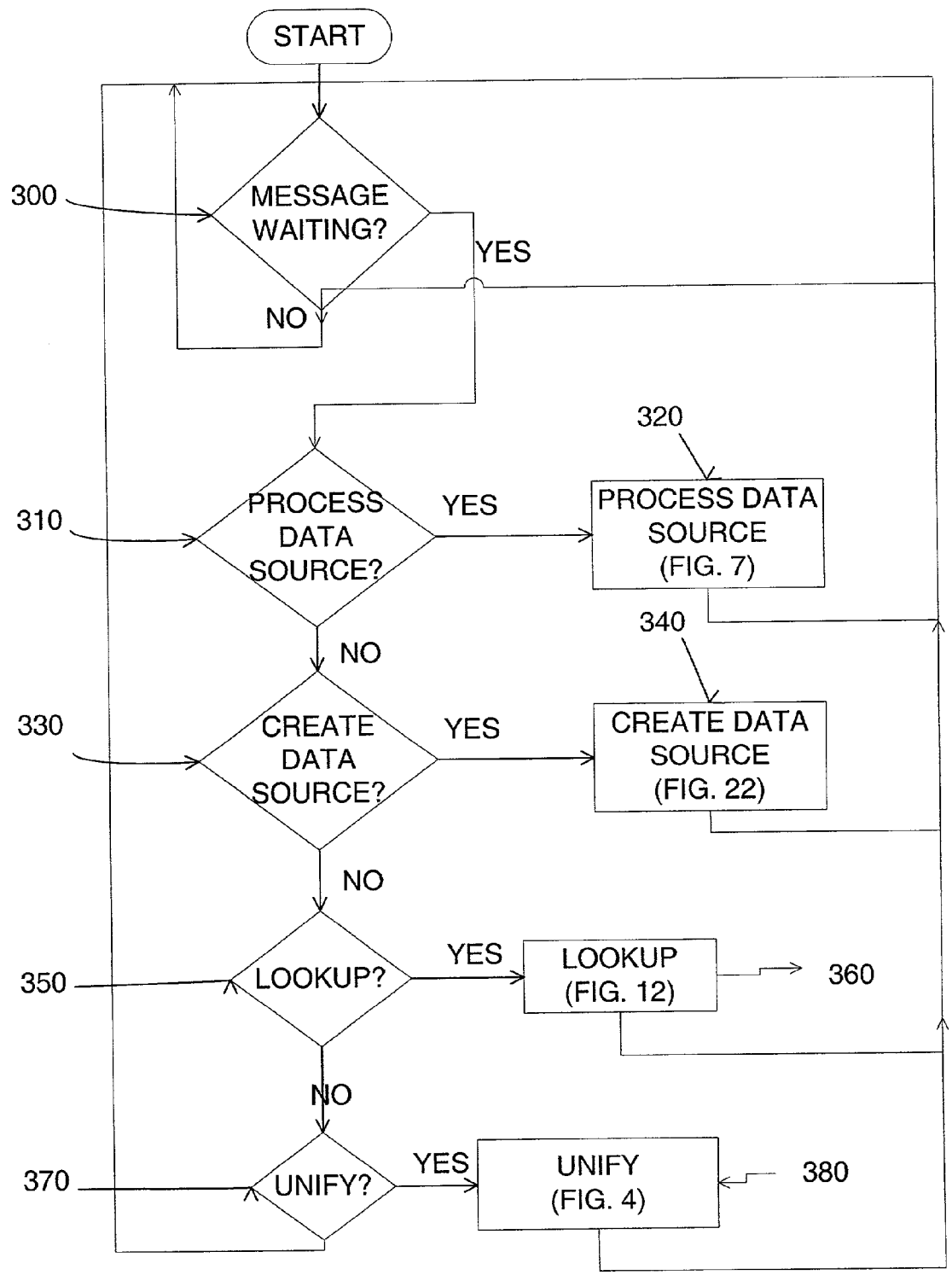
FIG. 2B is a simplified flowchart illustration of a preferred method of operation for the topic server control block of FIG. 2A.
Figure 5A:
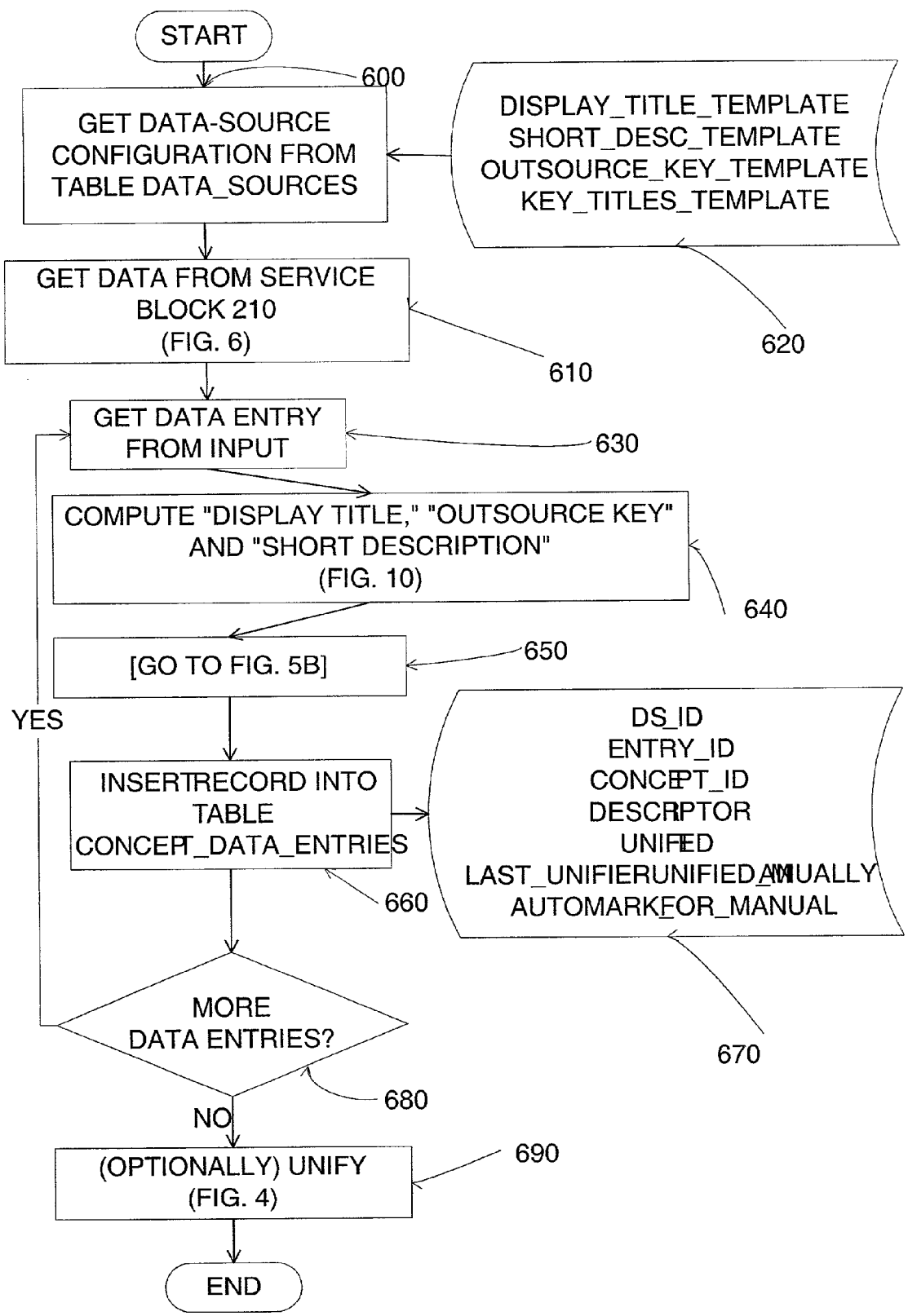
Figure 5B:
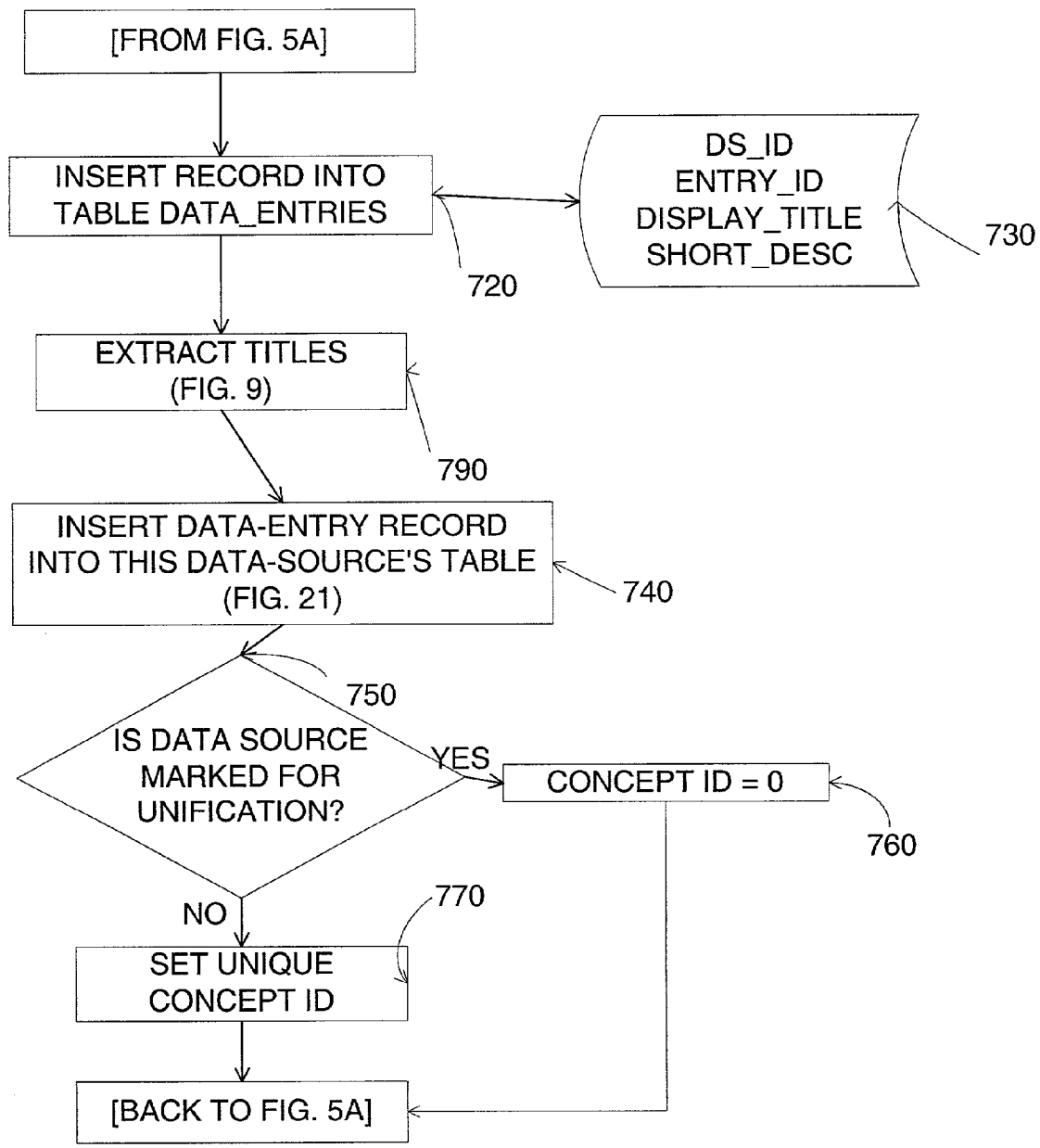
Figure 6:
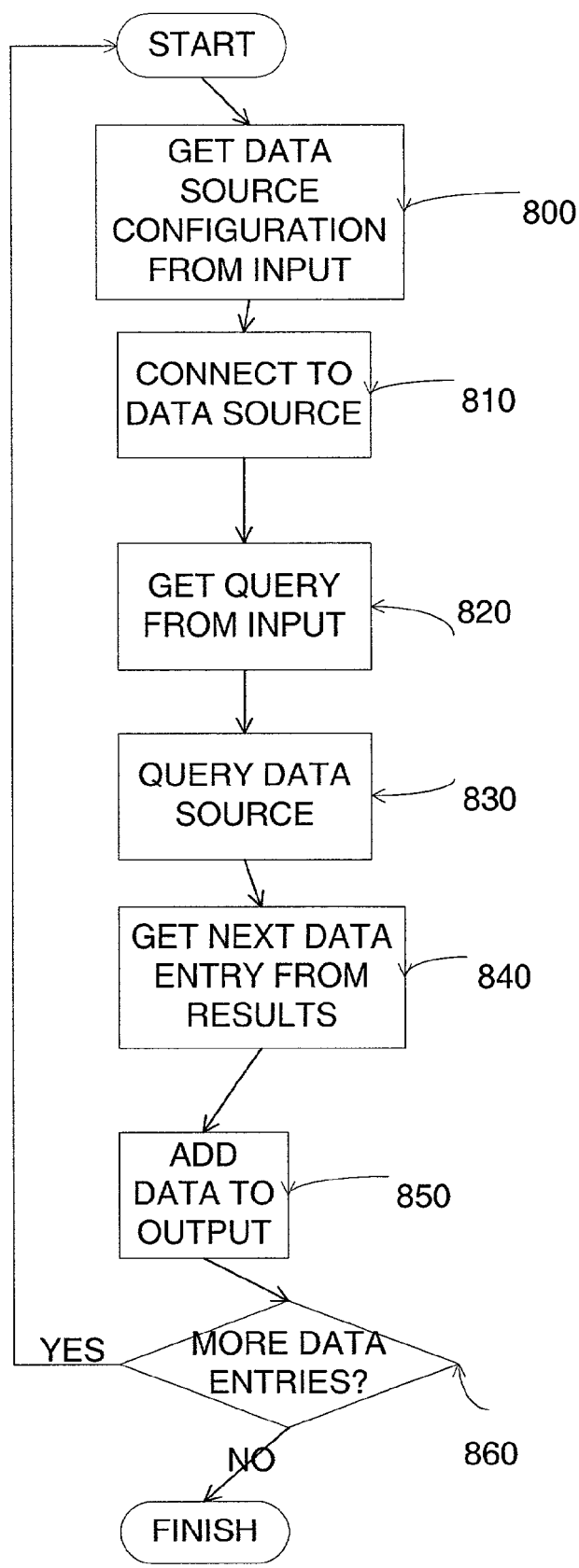
Figure 7:
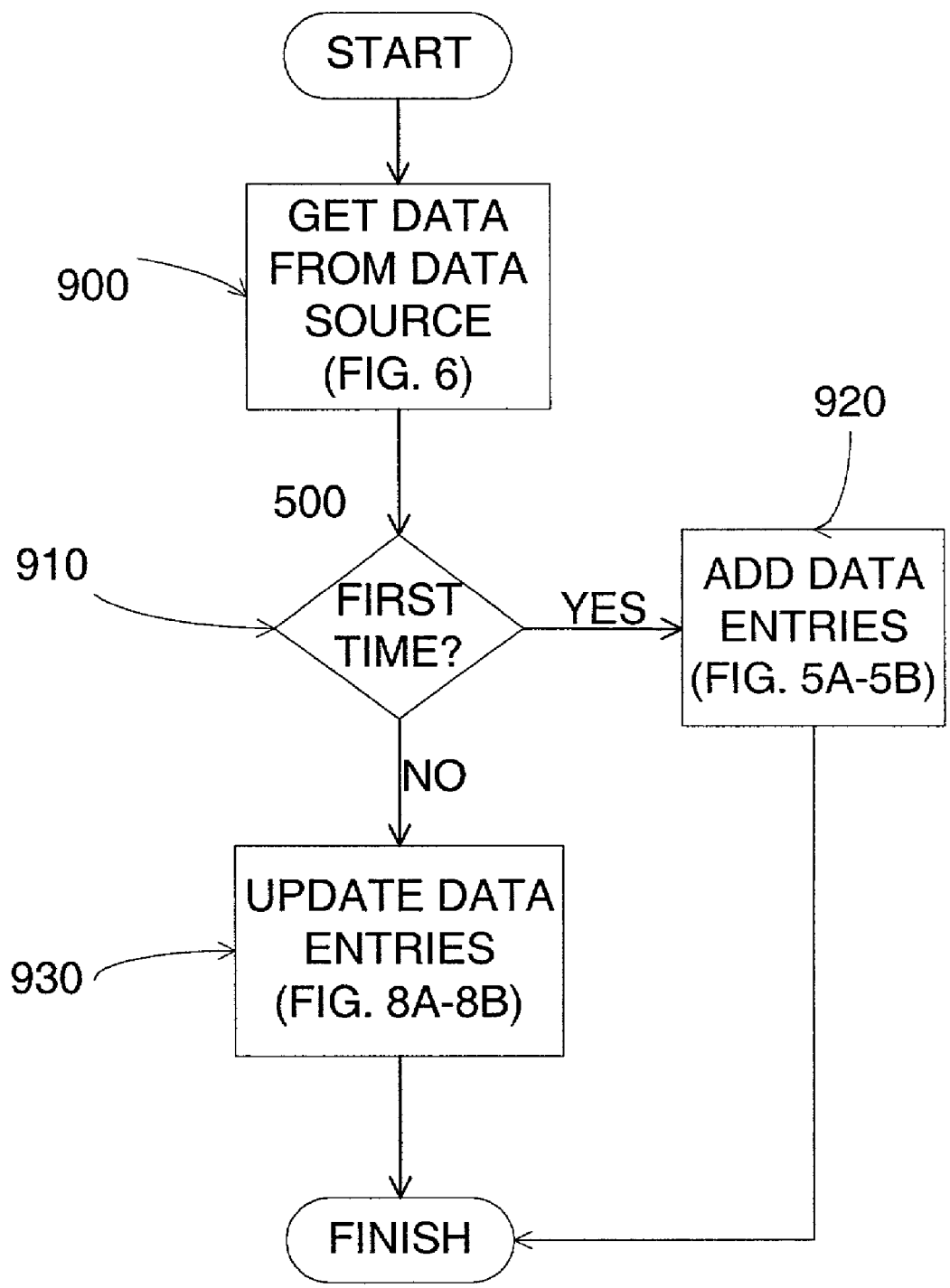
Figure 8A:
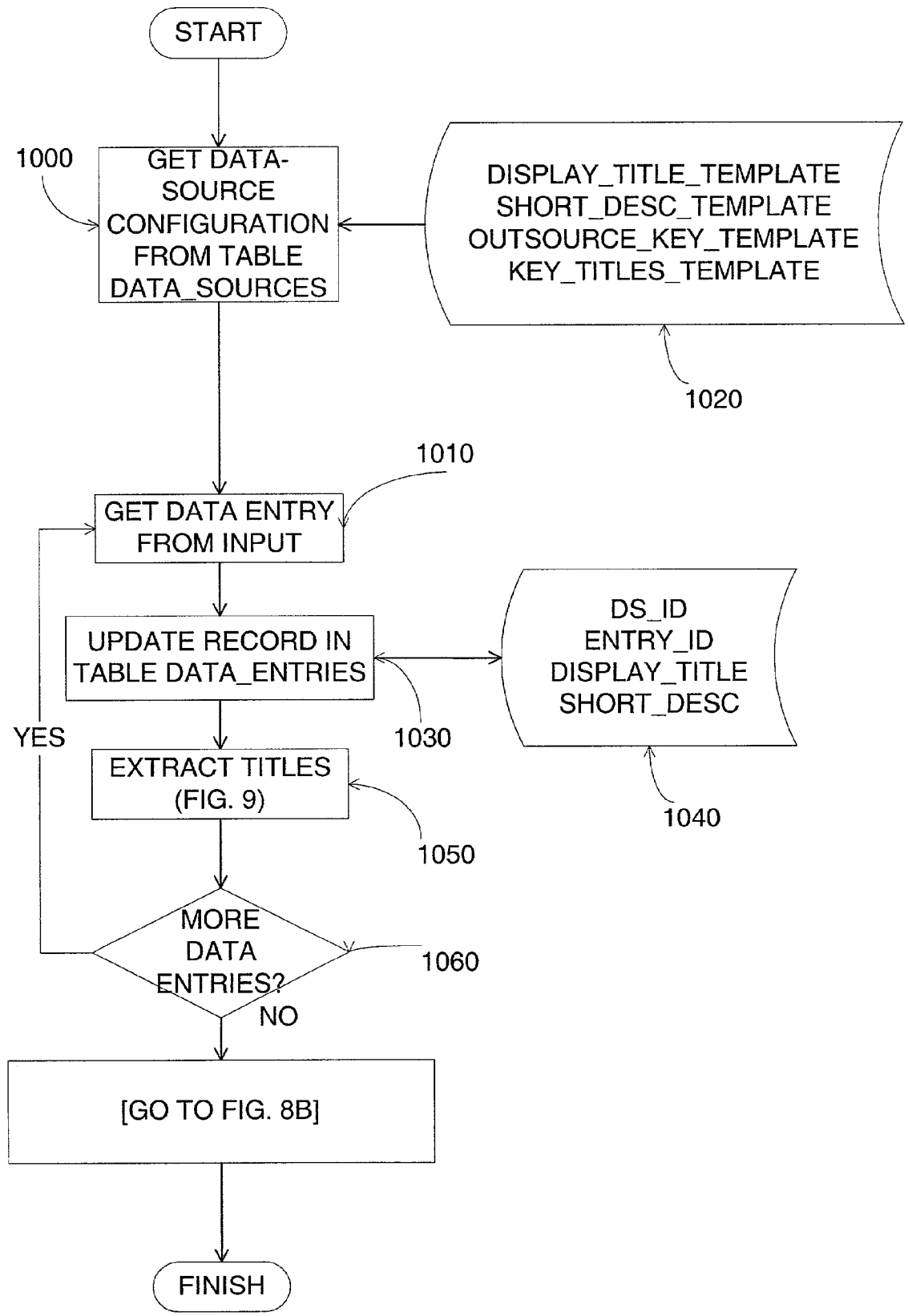
Figure 8B:
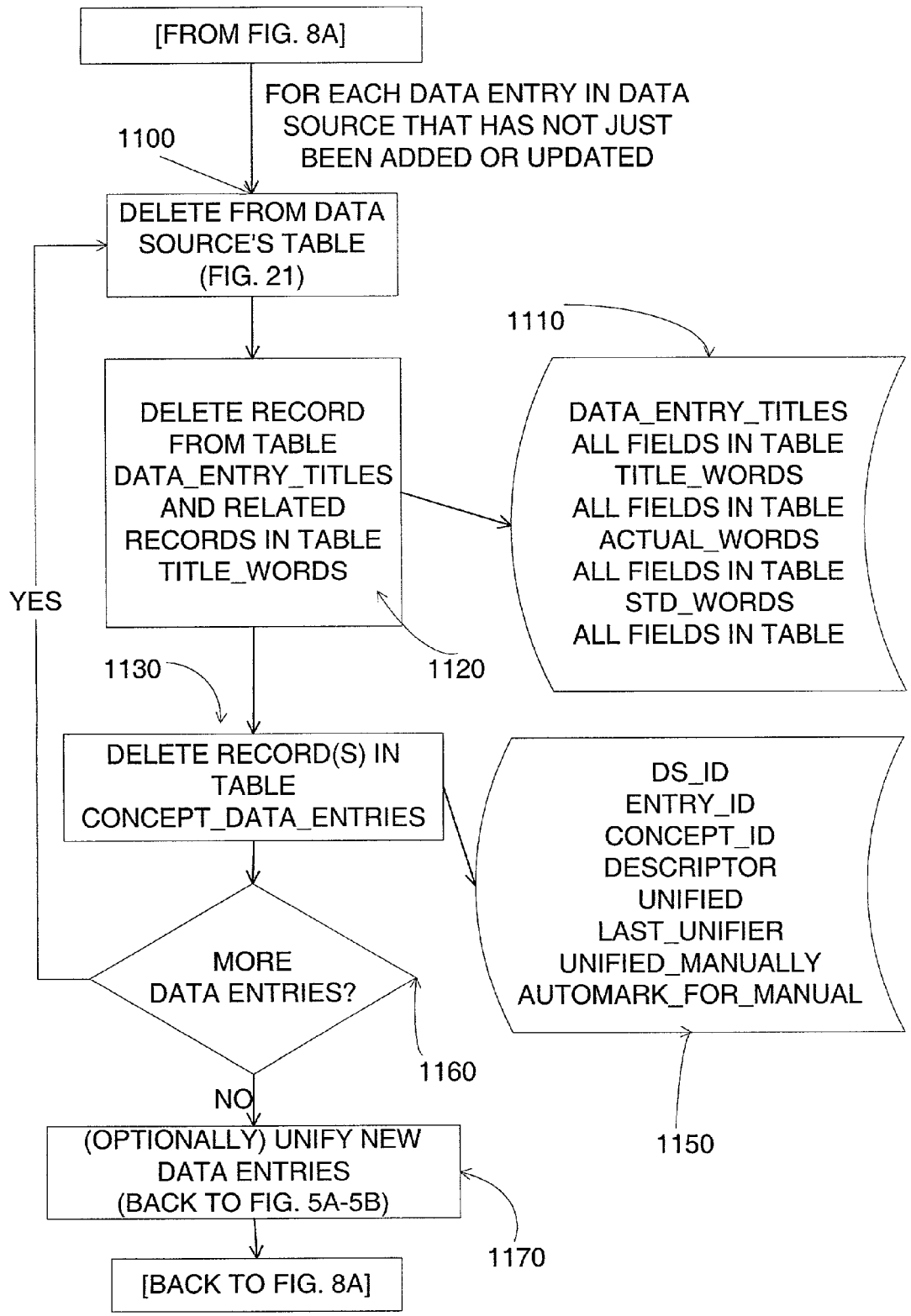
Figure 9:
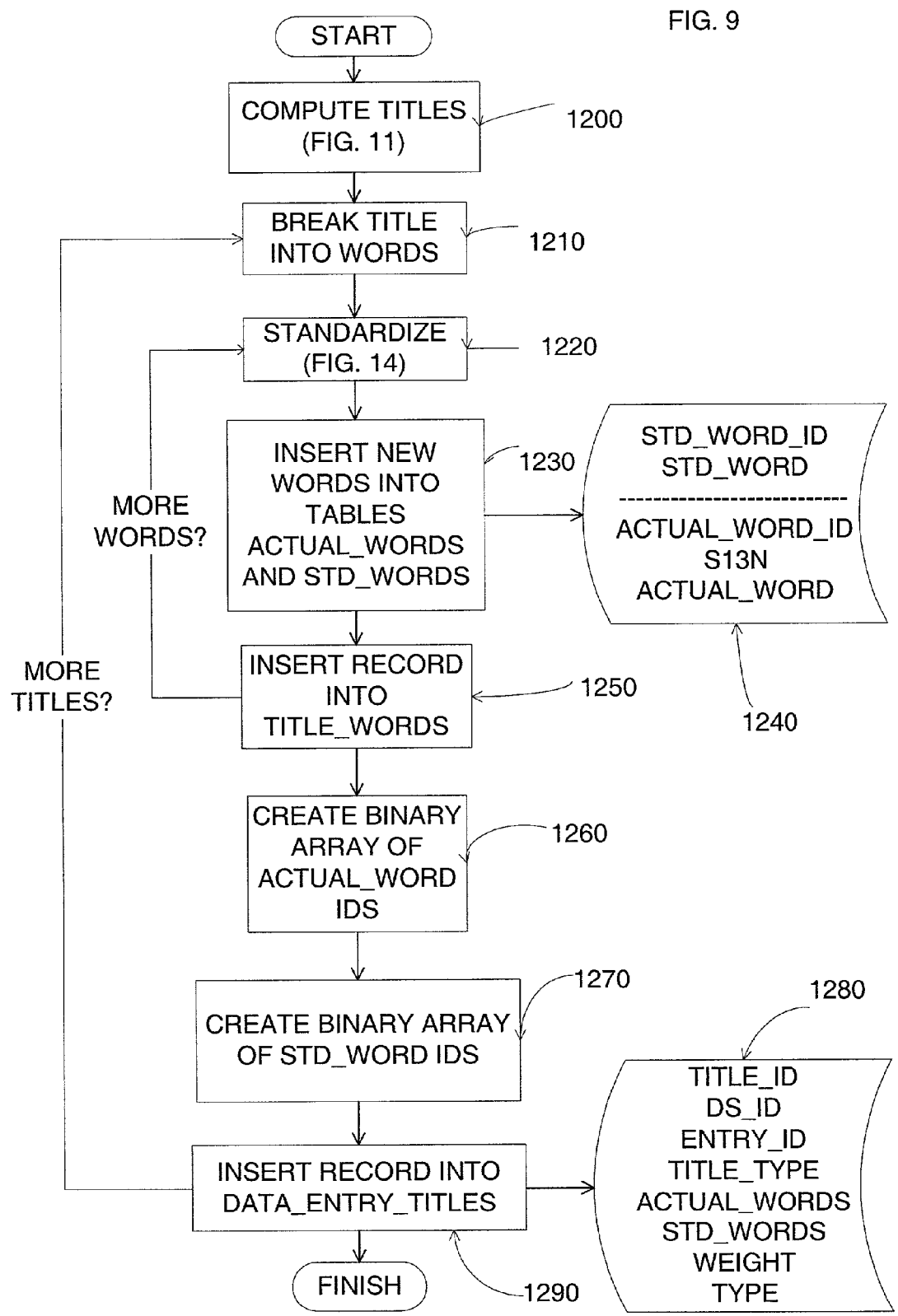
Figure 10:
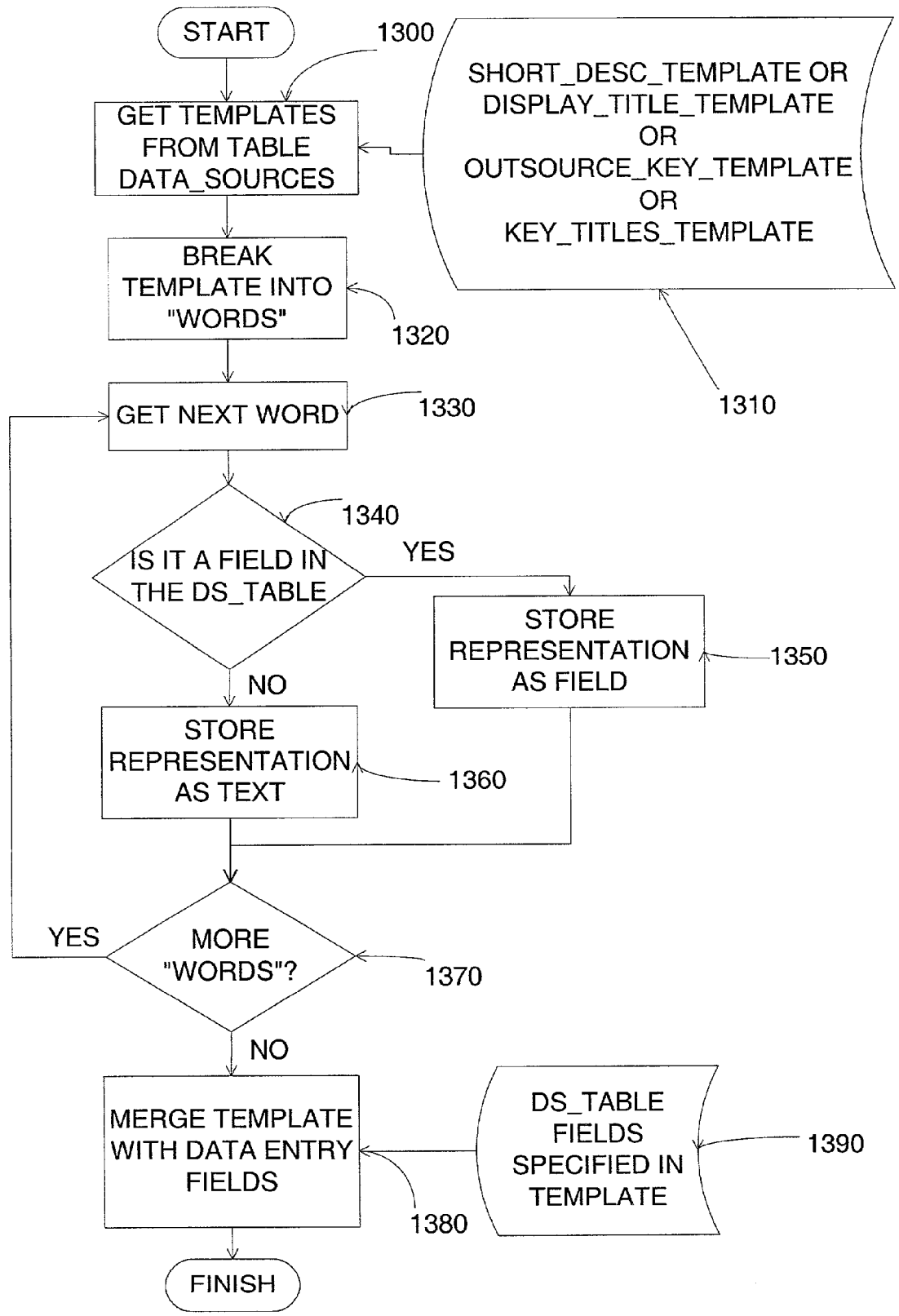
Figure 11:
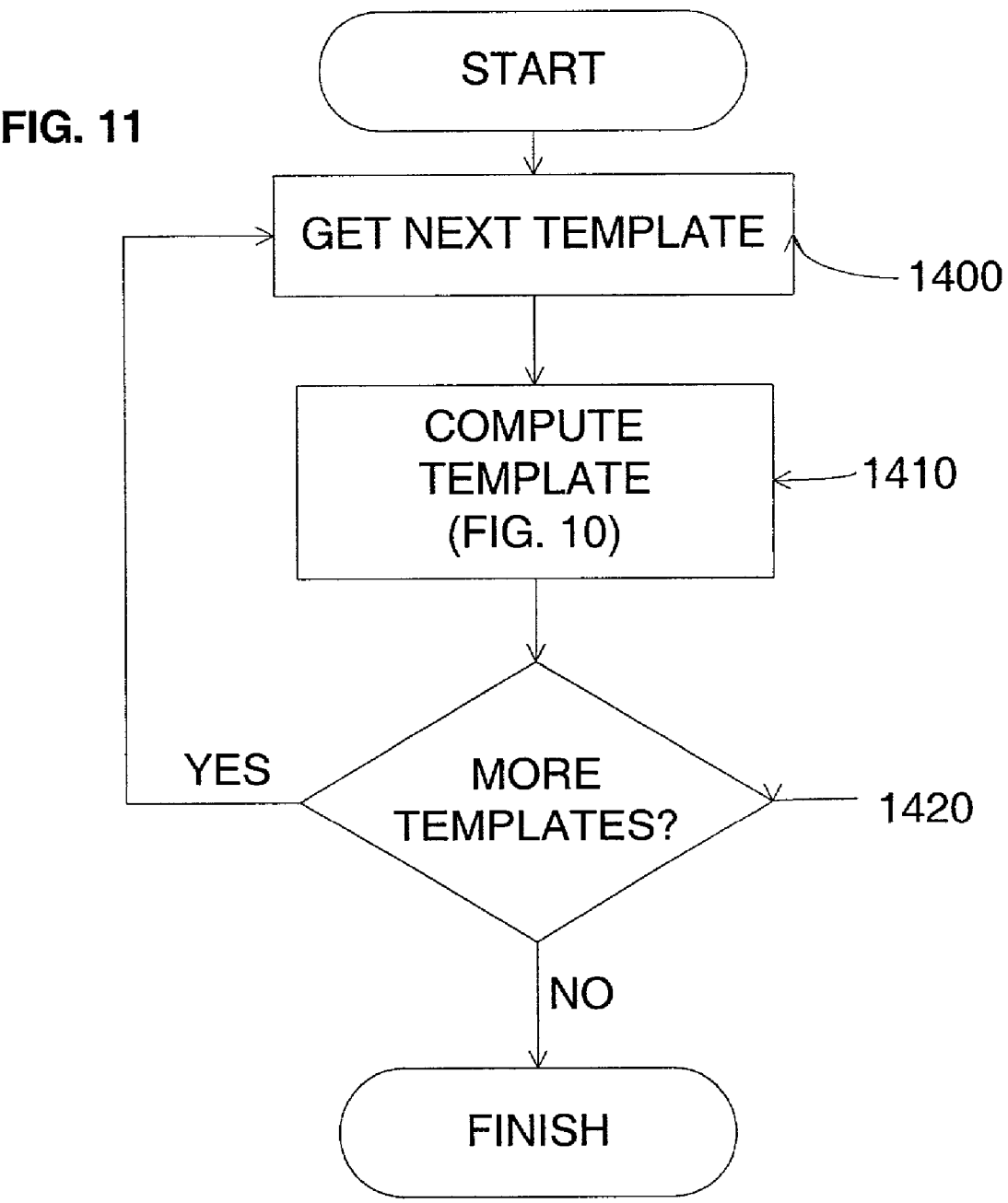
Figure 12A:
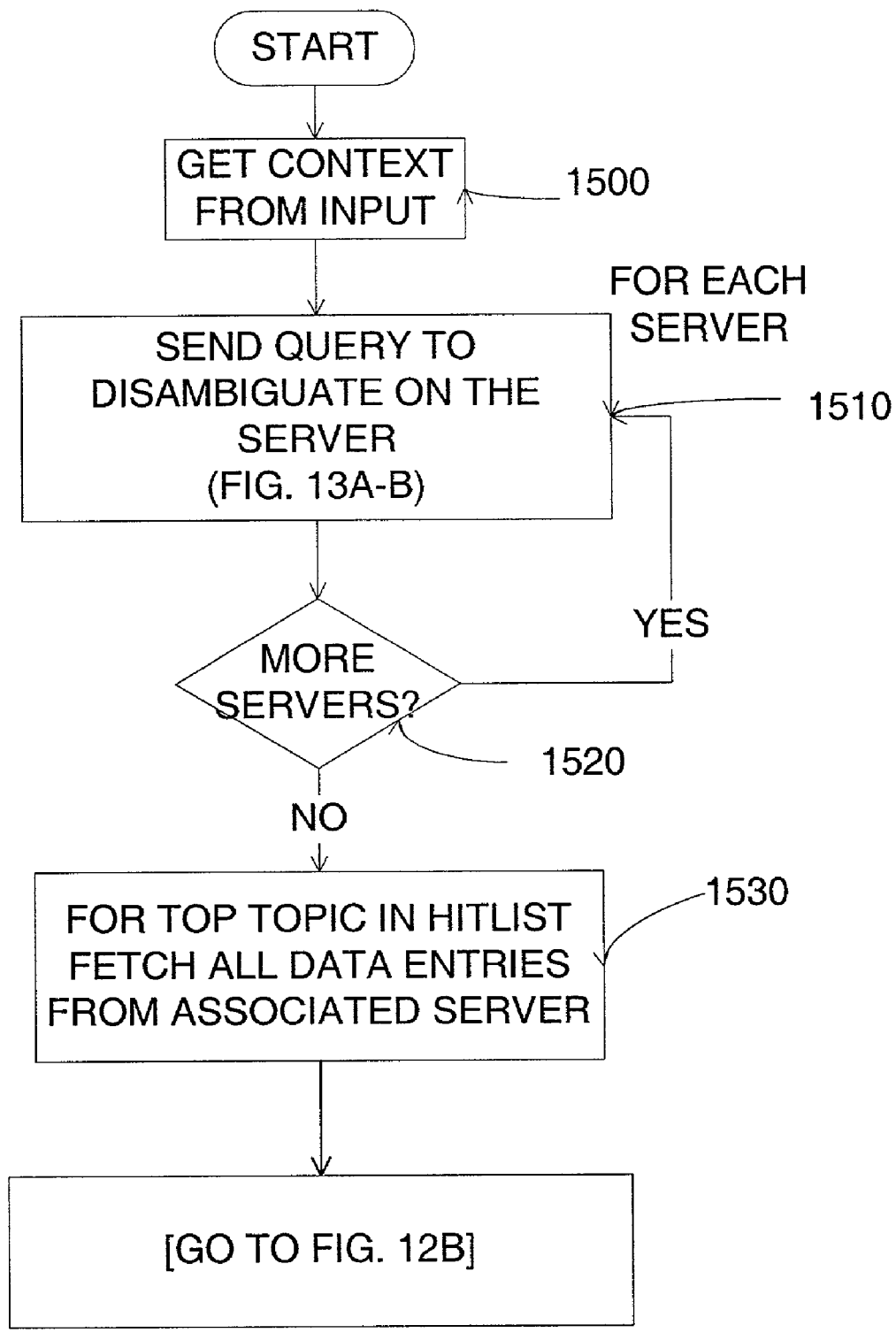
Figure 12B:
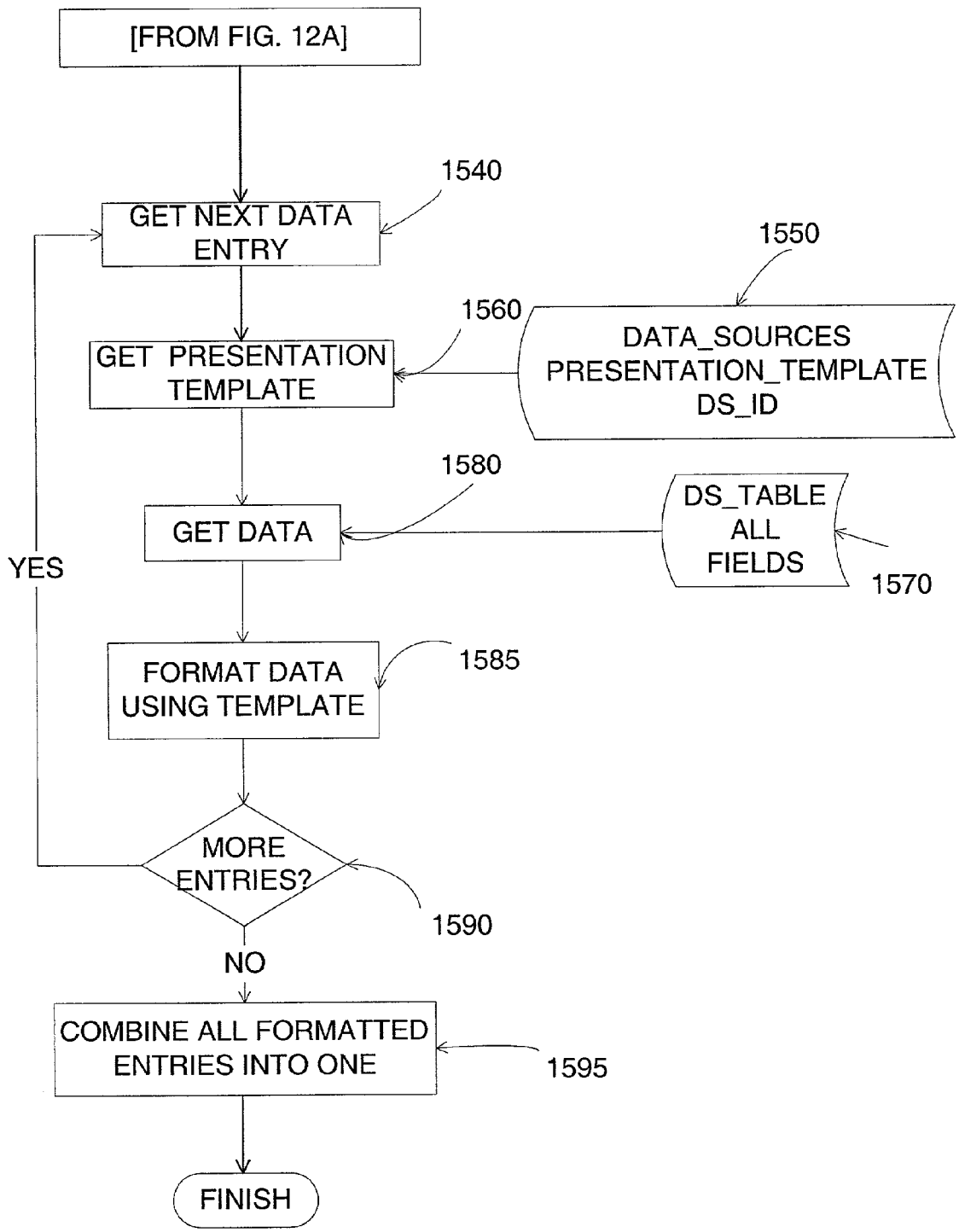
Figure 13A:
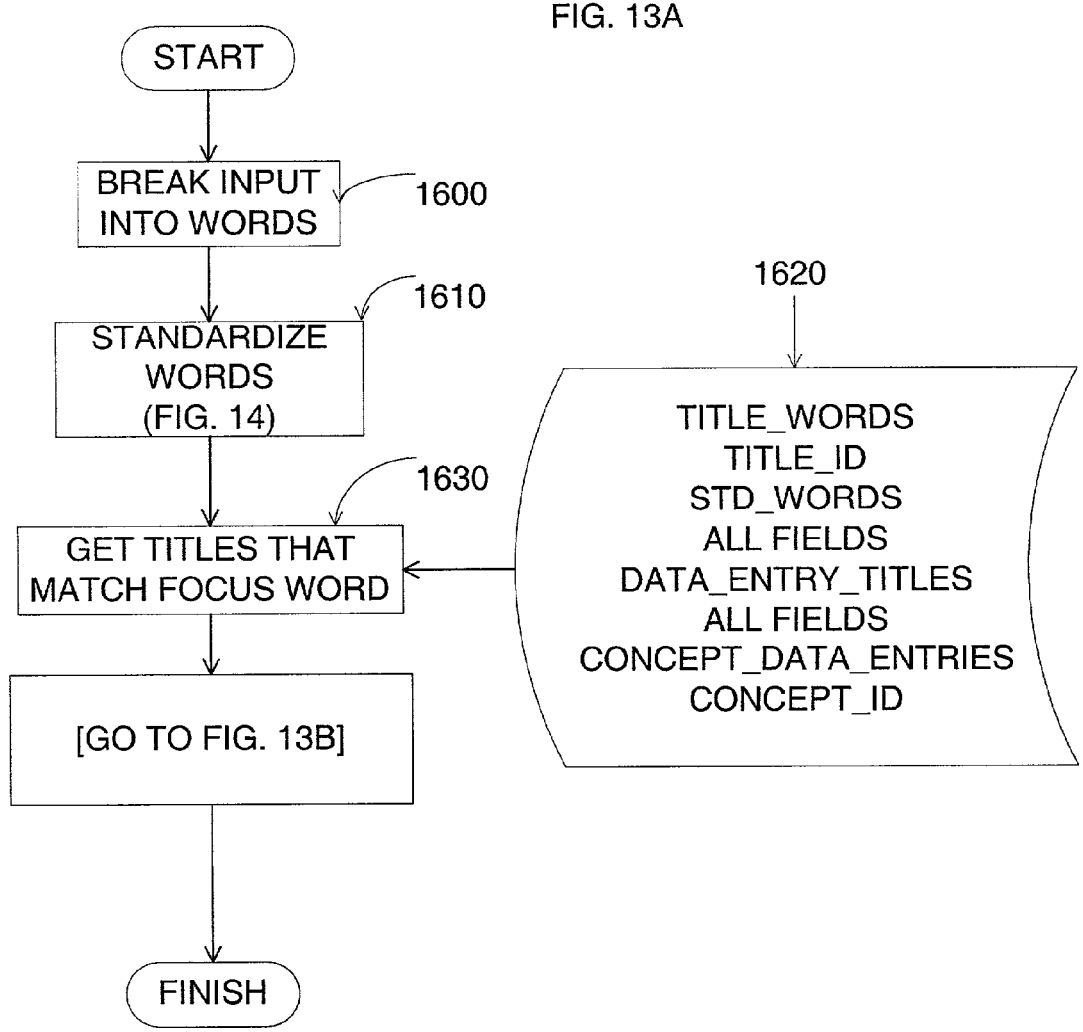
Figure 13B:
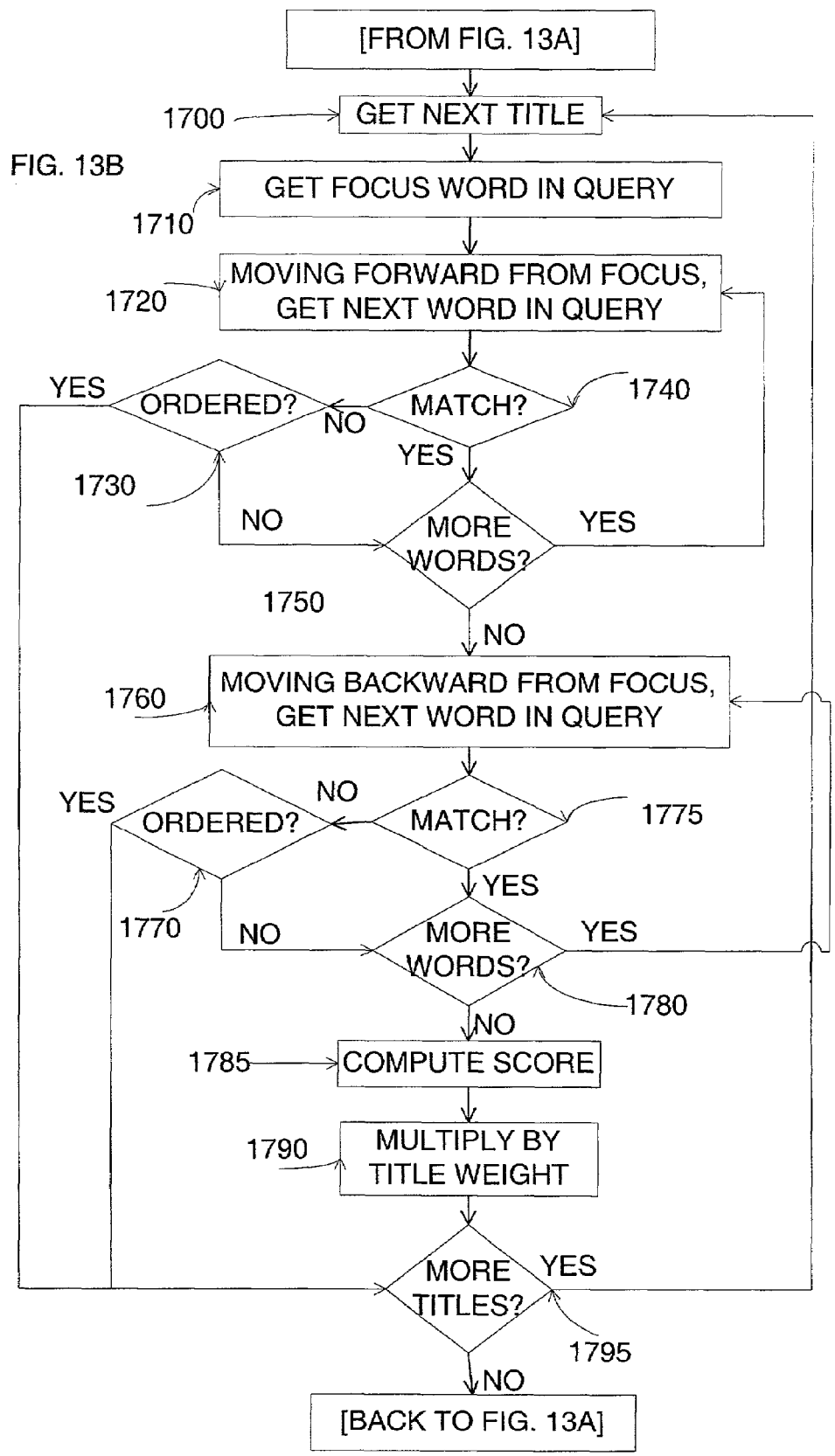
Figure 14:
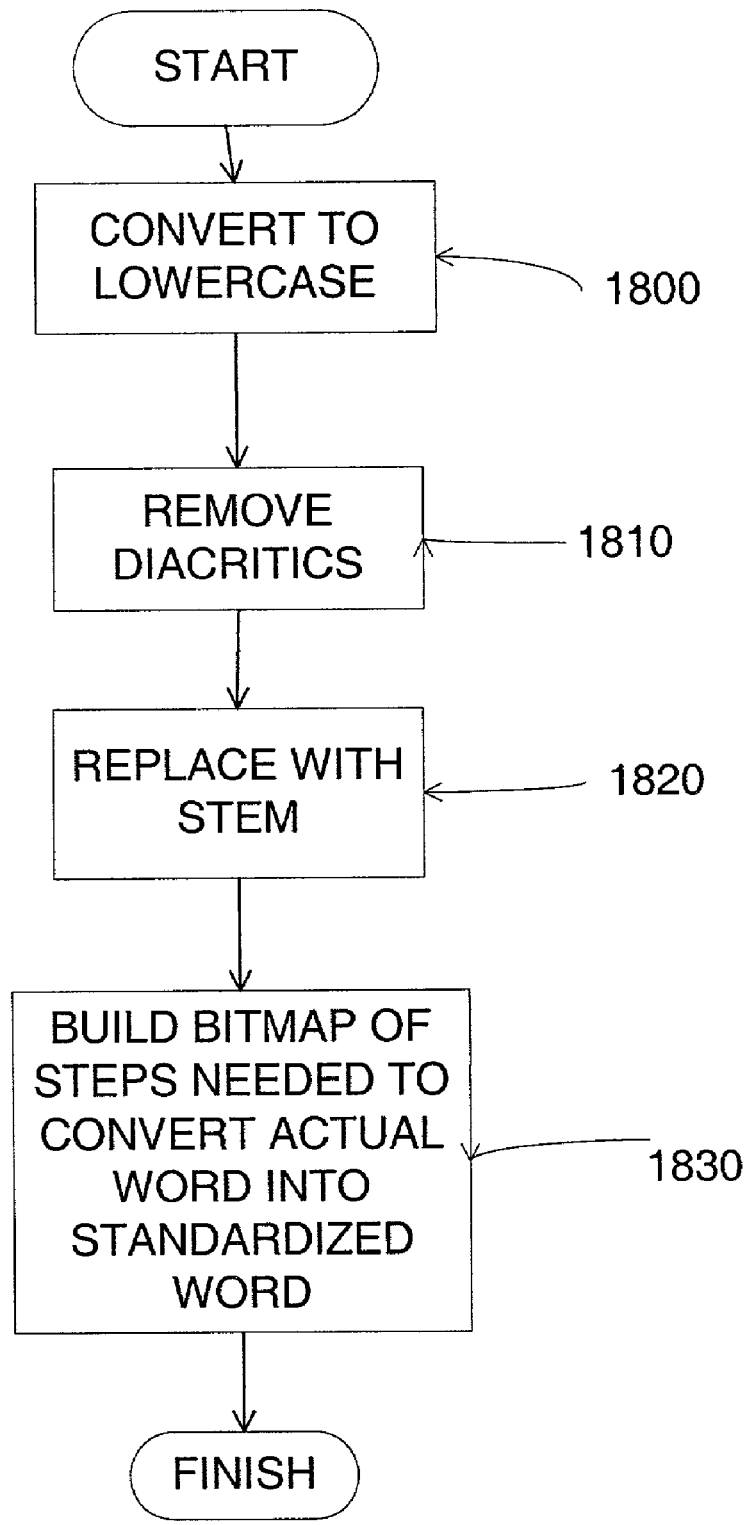
Figure 15:
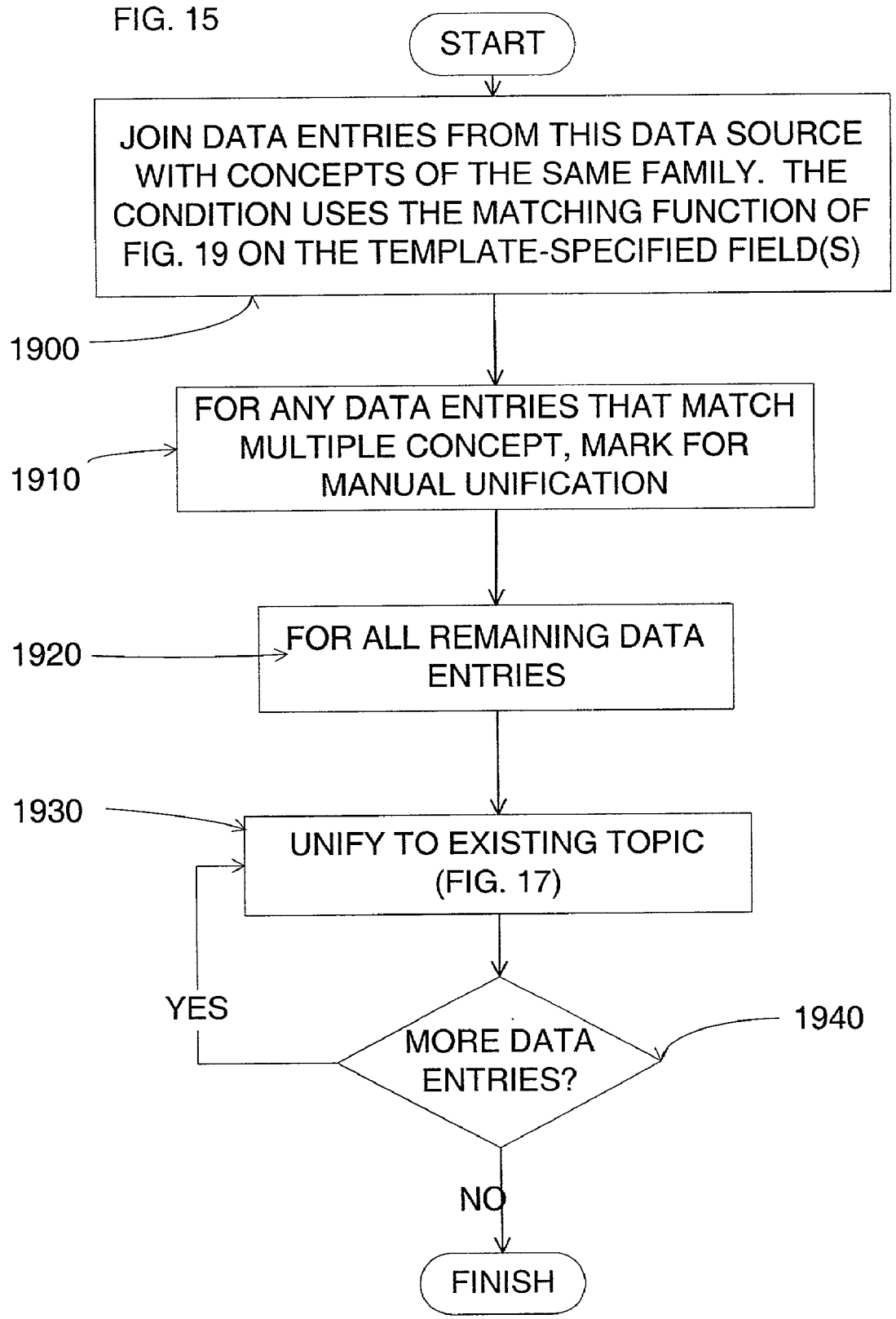
Figure 16:
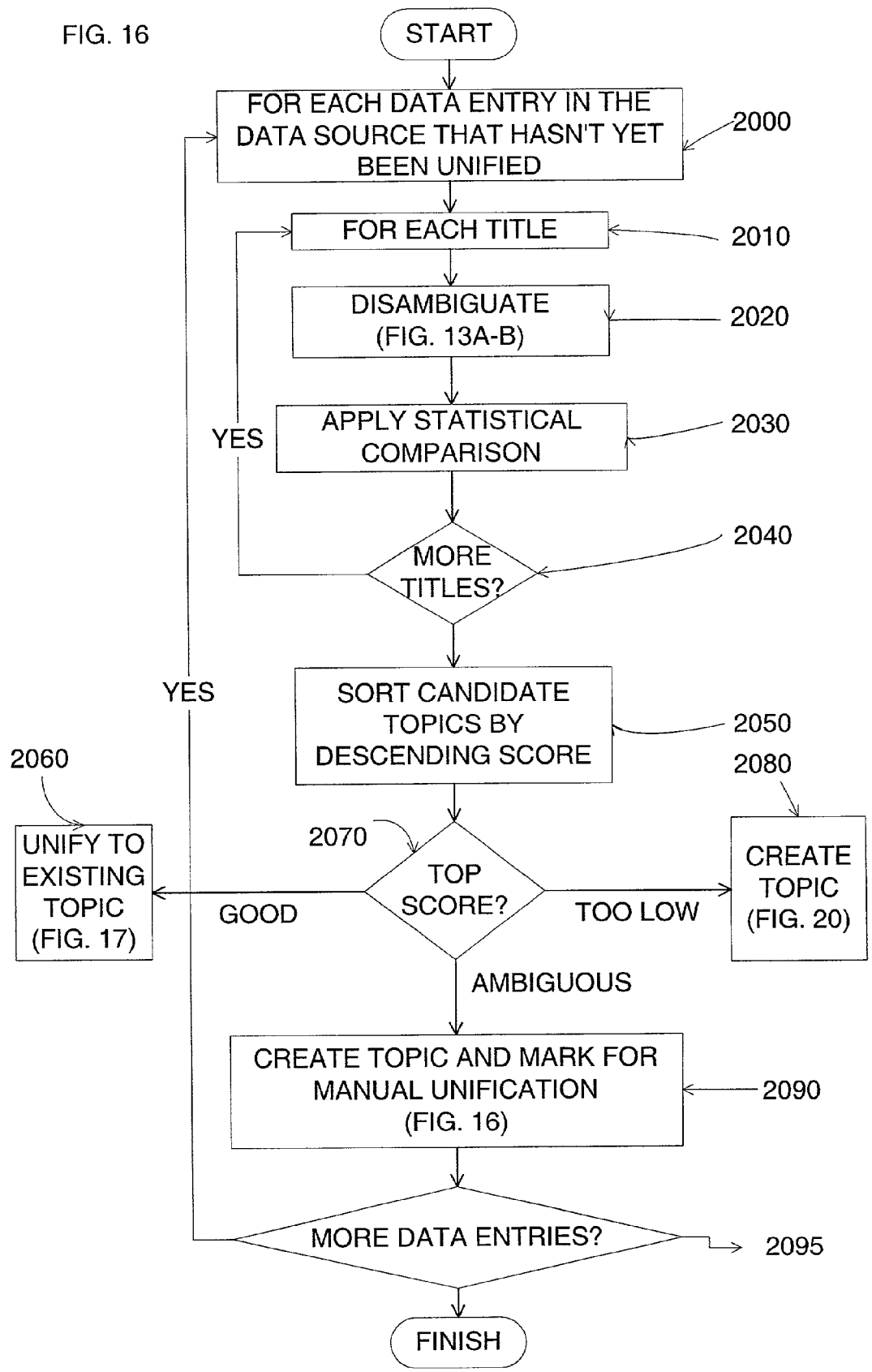
Figure 17:
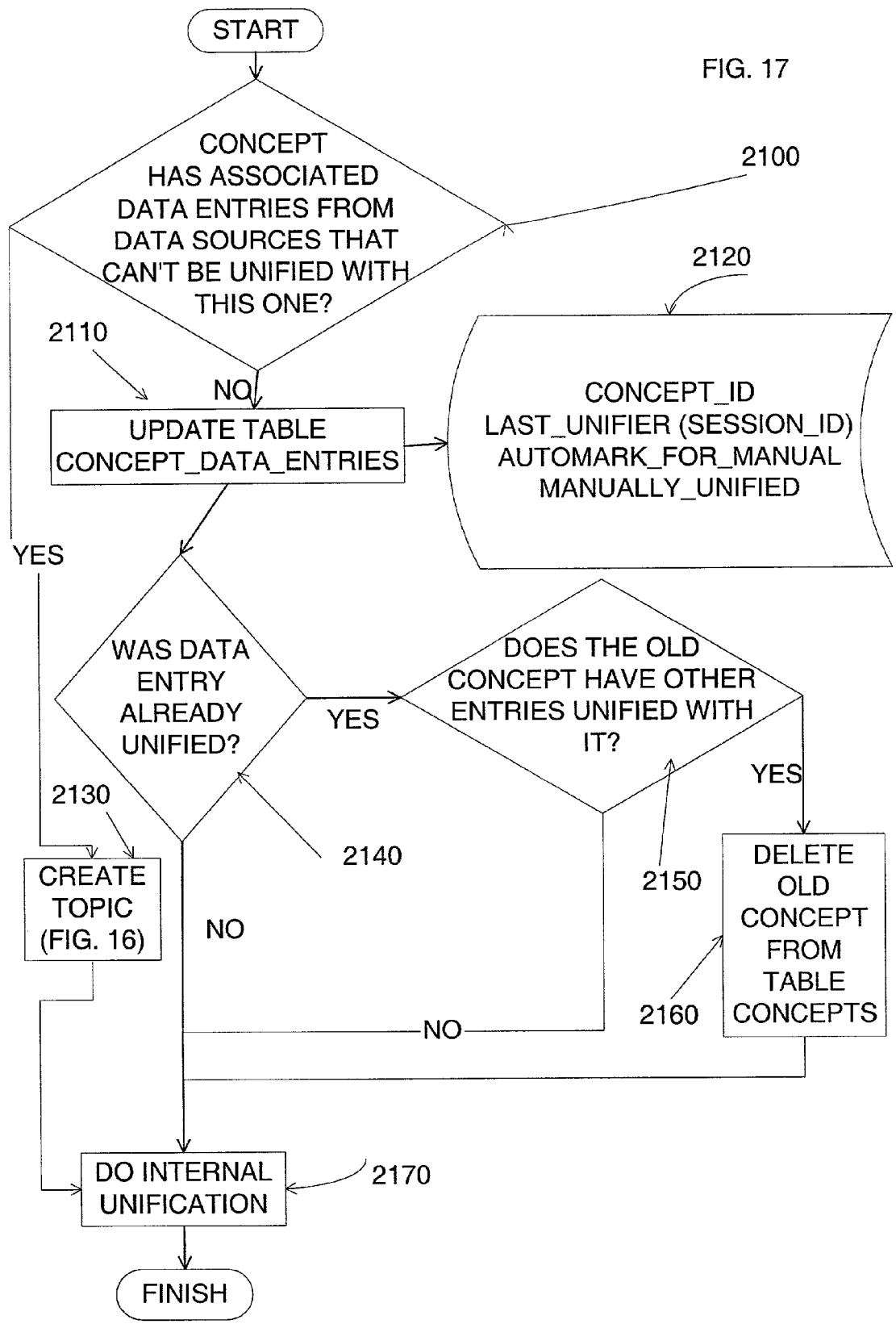
Figure 18:
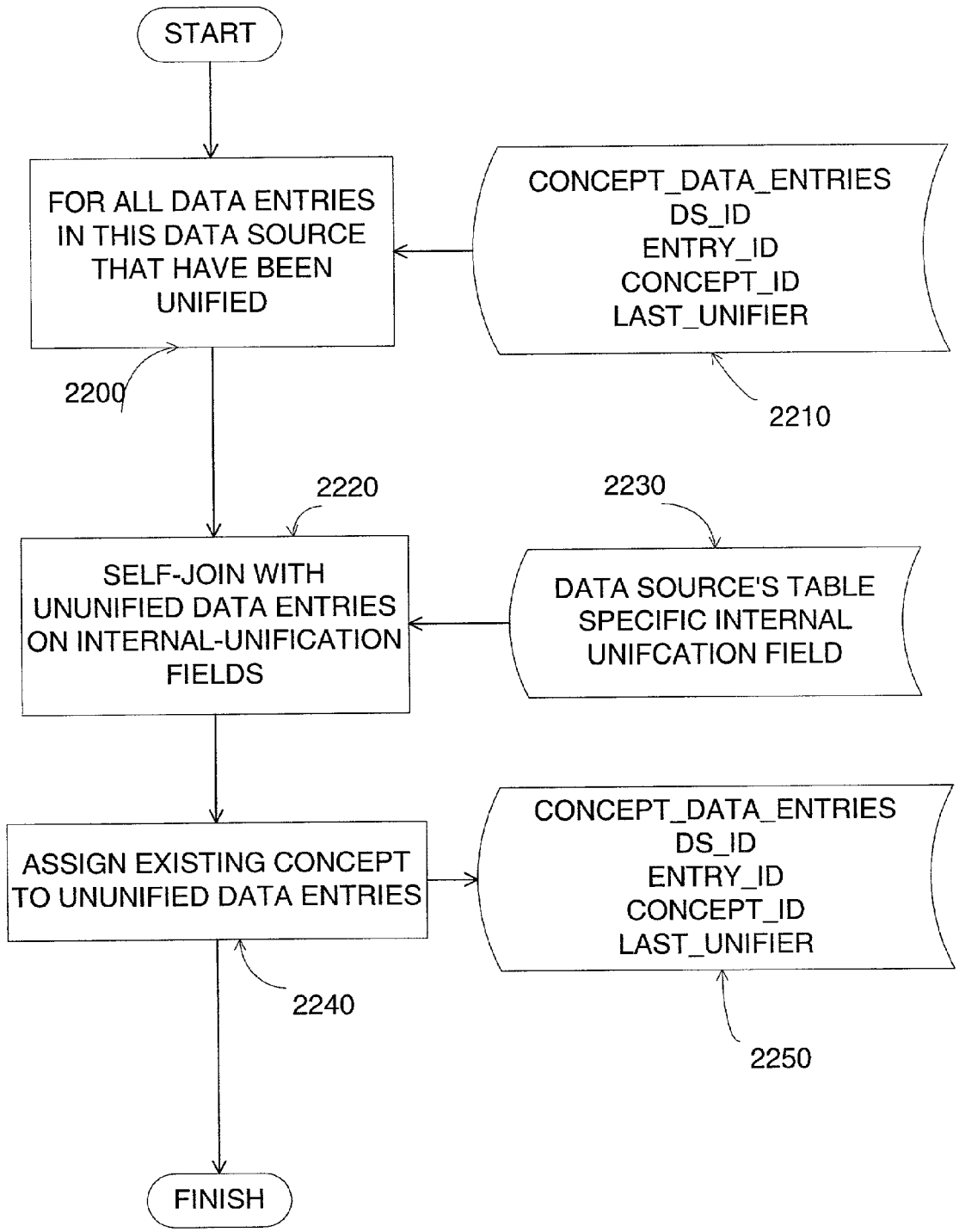
Figure 19:
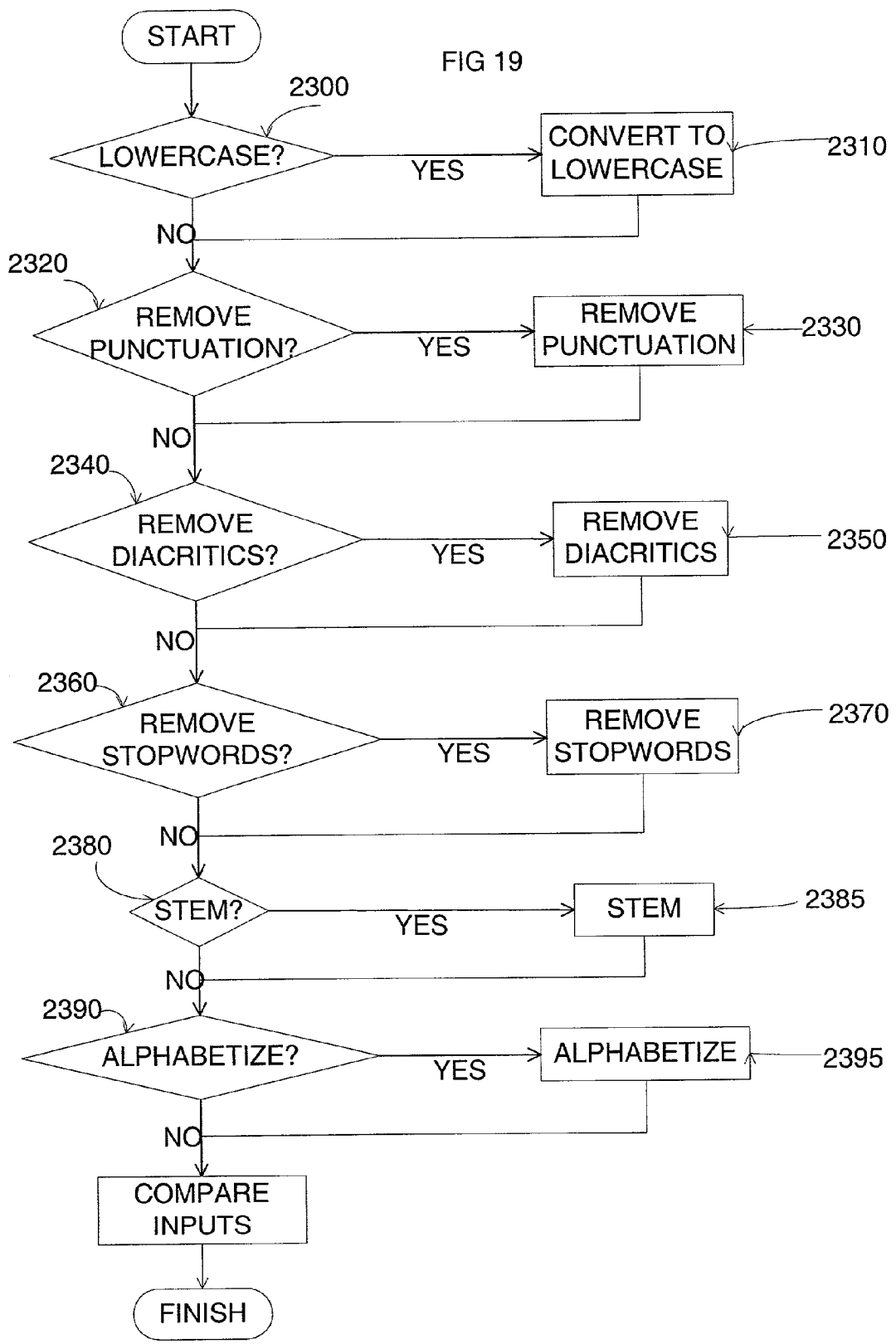
Figure 20:
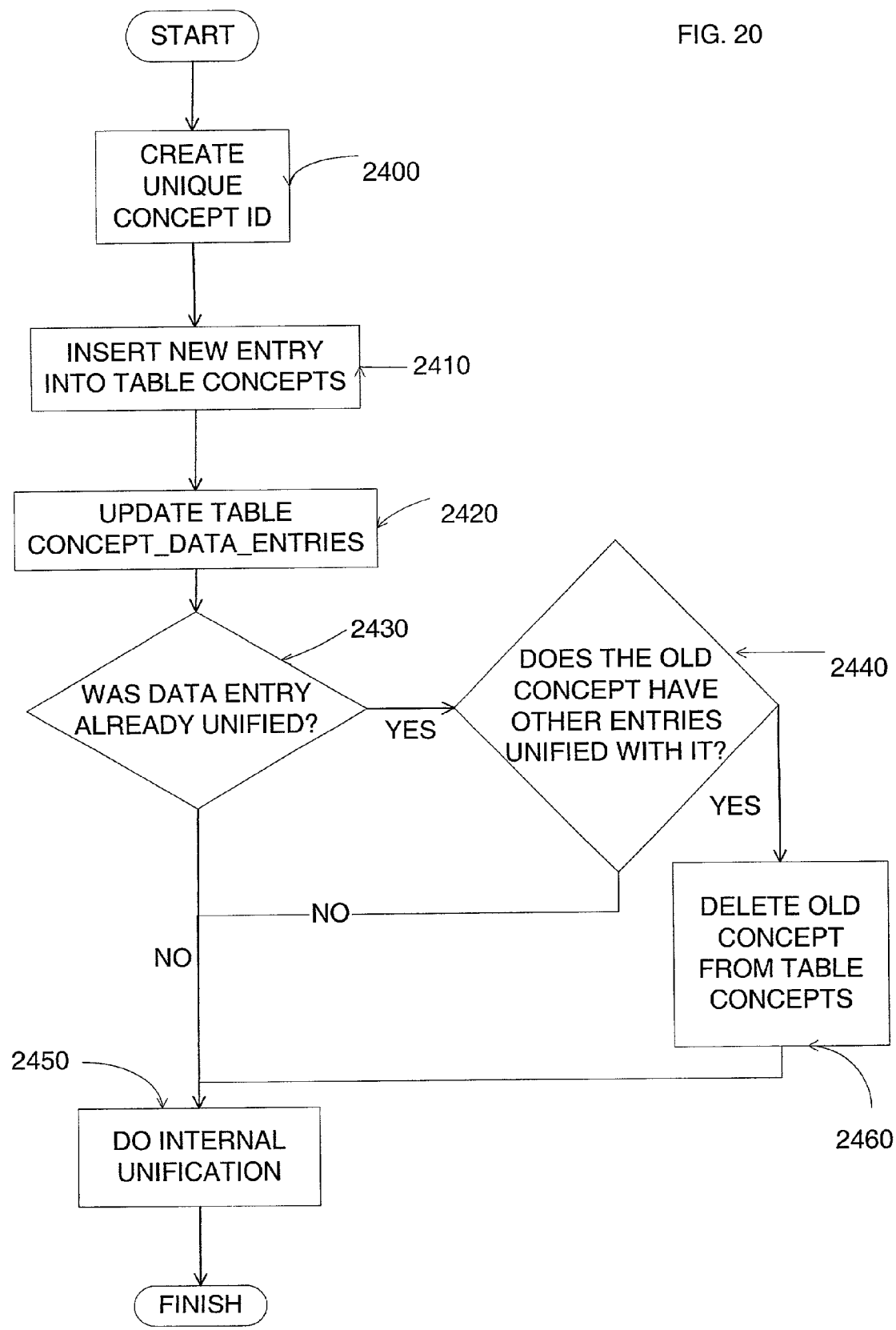
Figure 21:
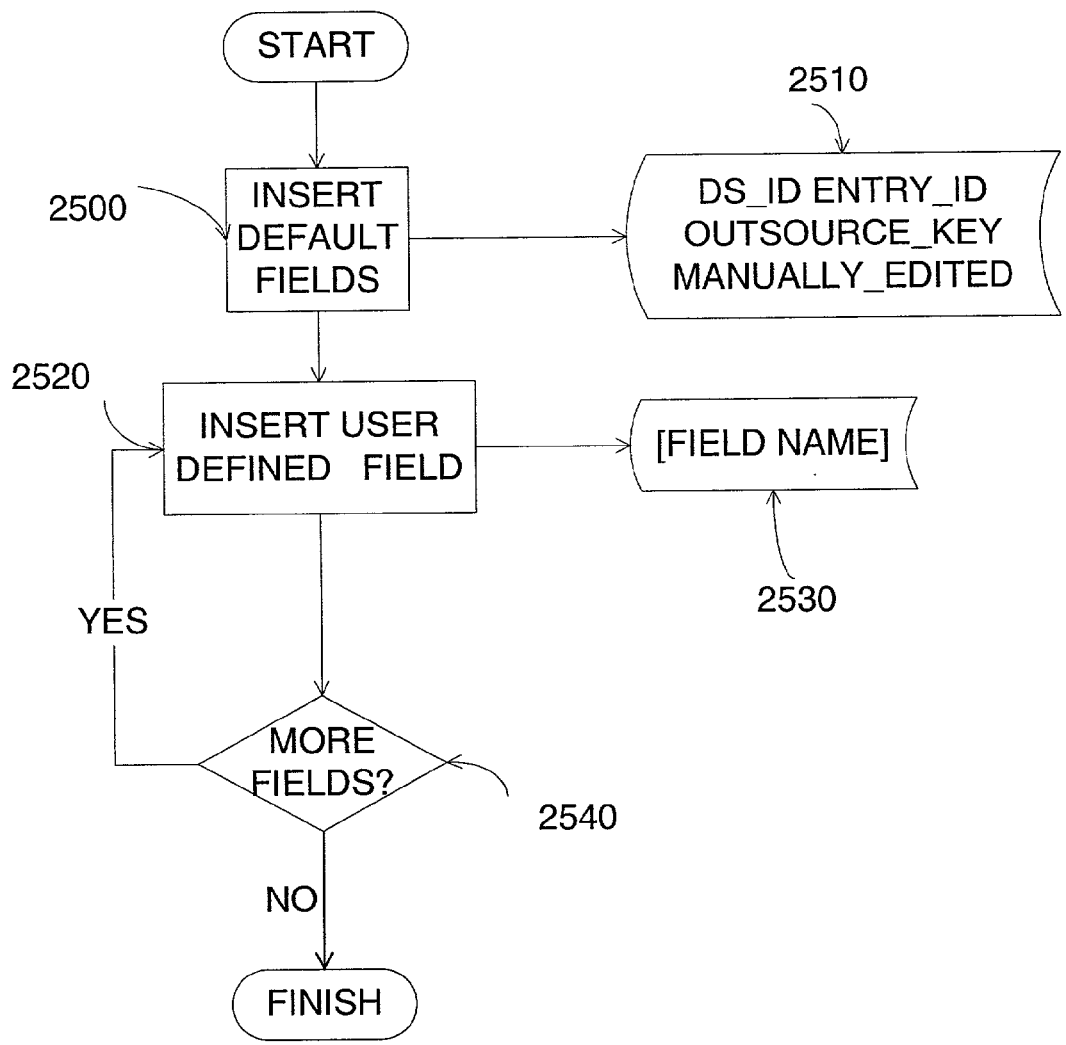
Figure 22:
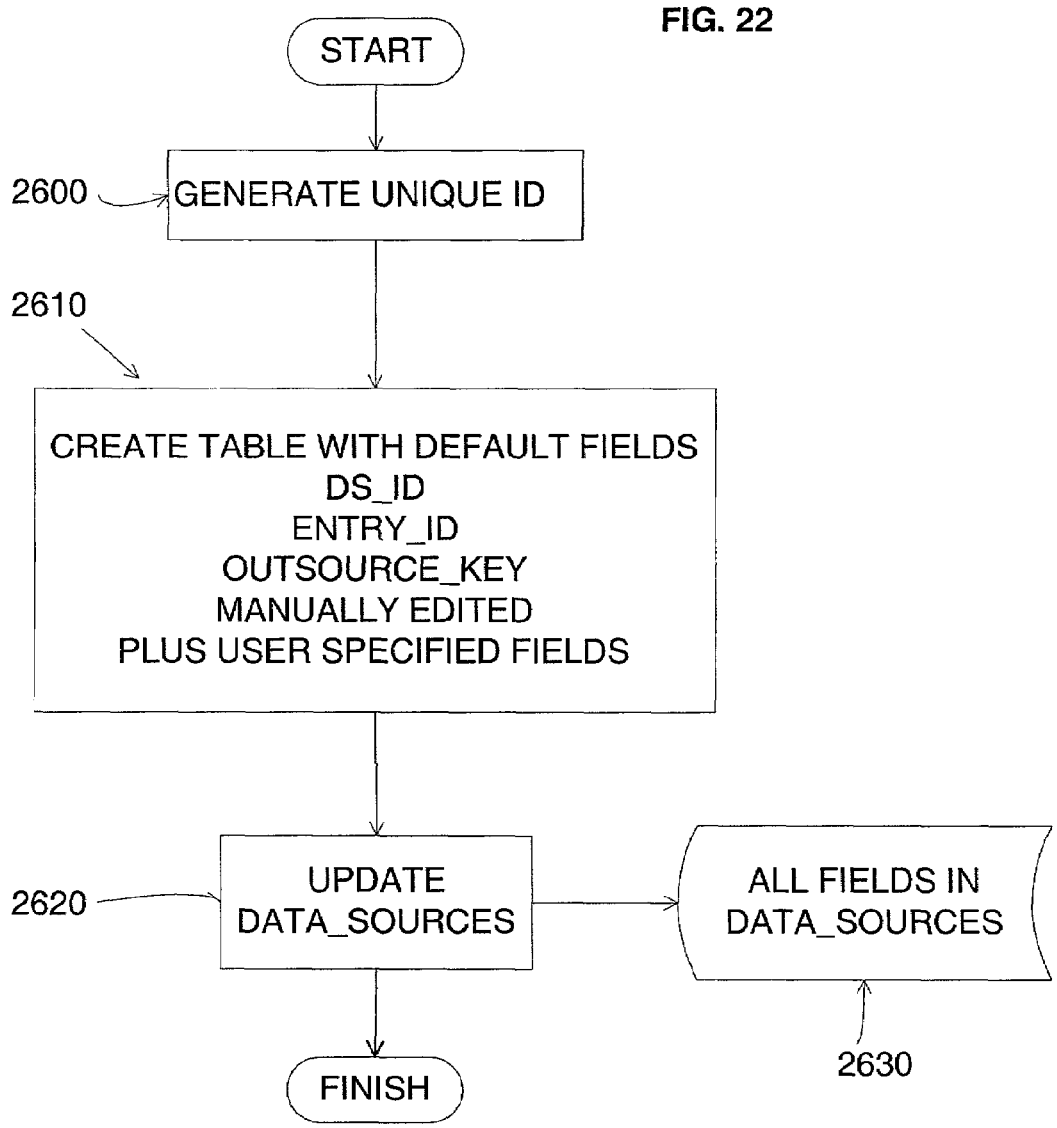
Figure 23:
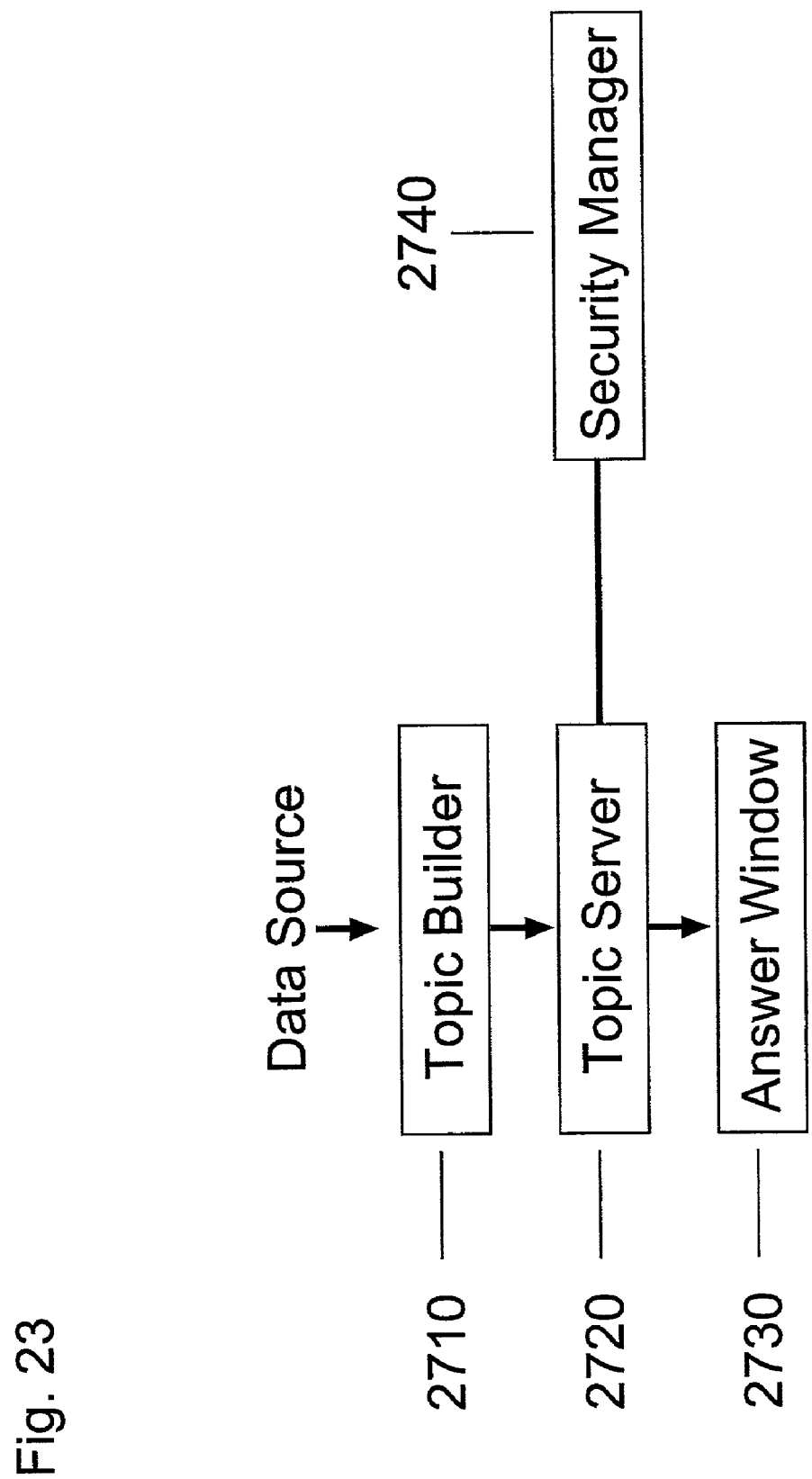
Figure 64:
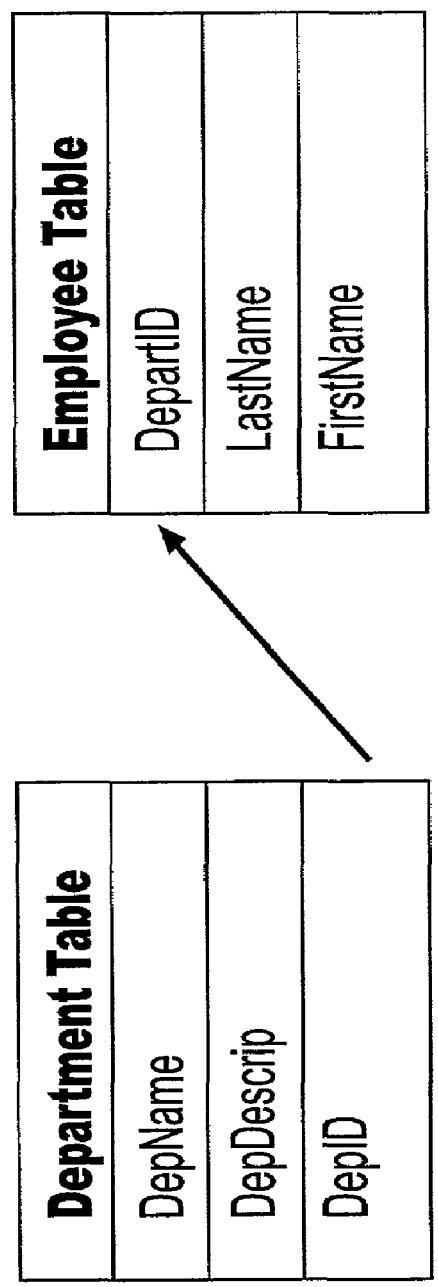
Figure 65:
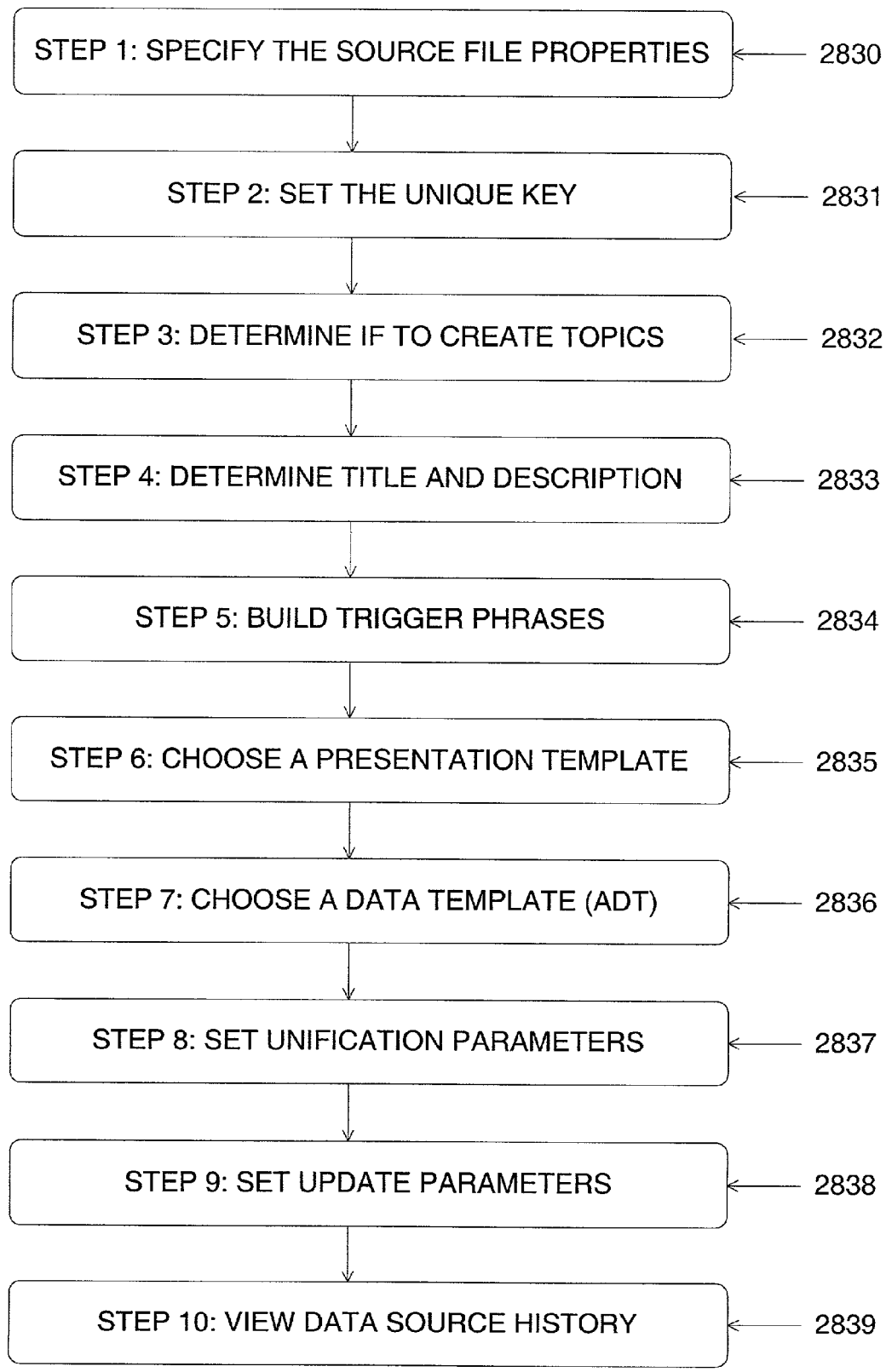
Figure 66:
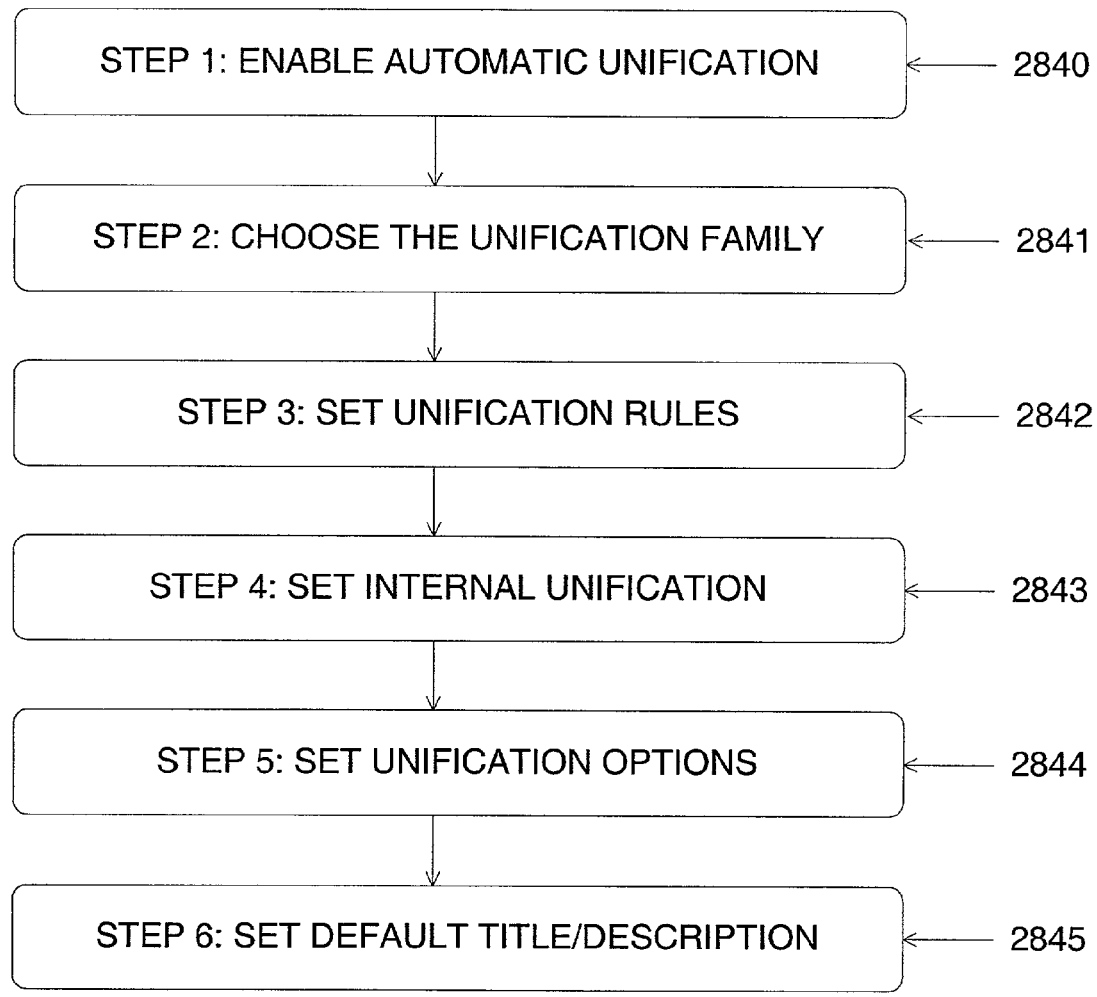
Figure 67:
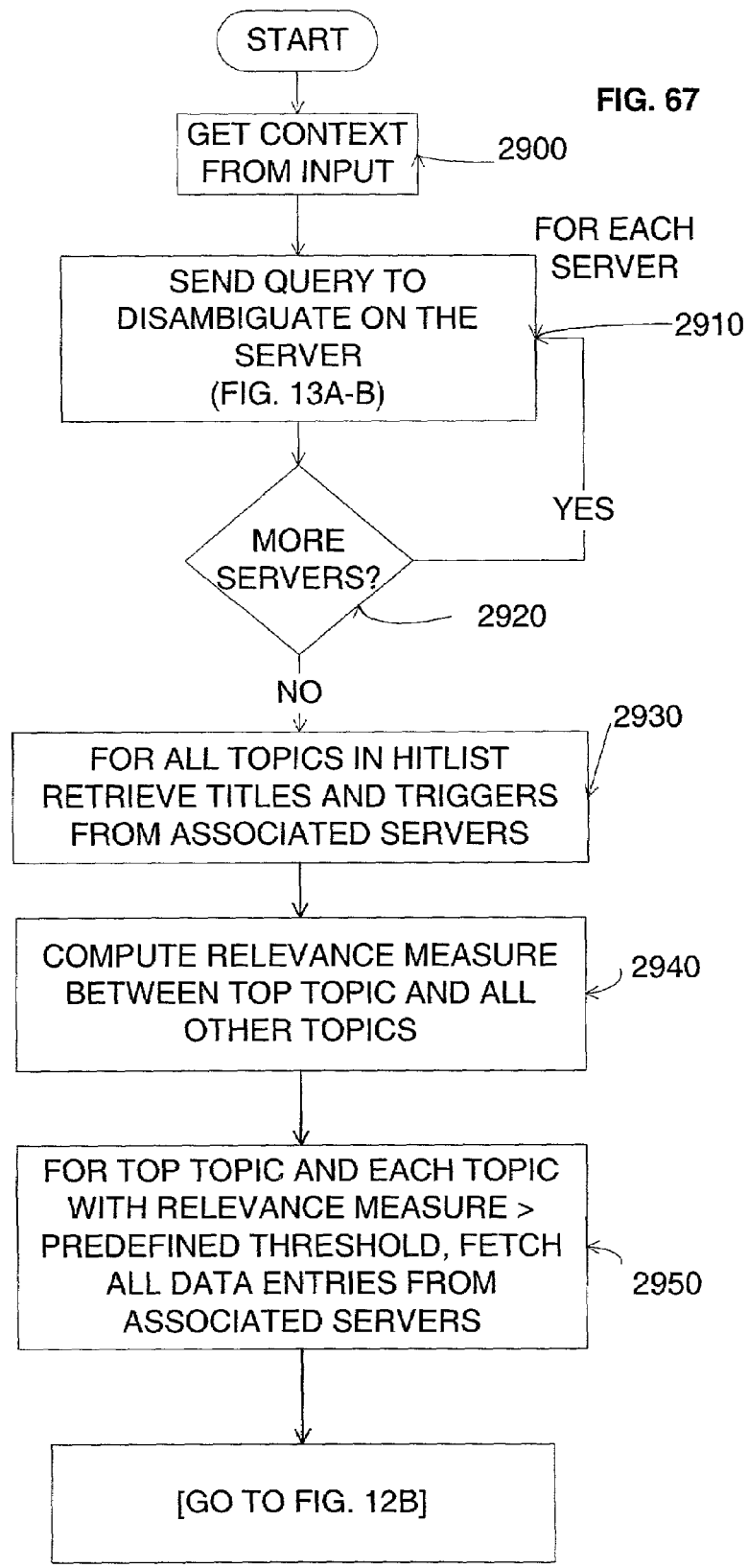
Figure 68:
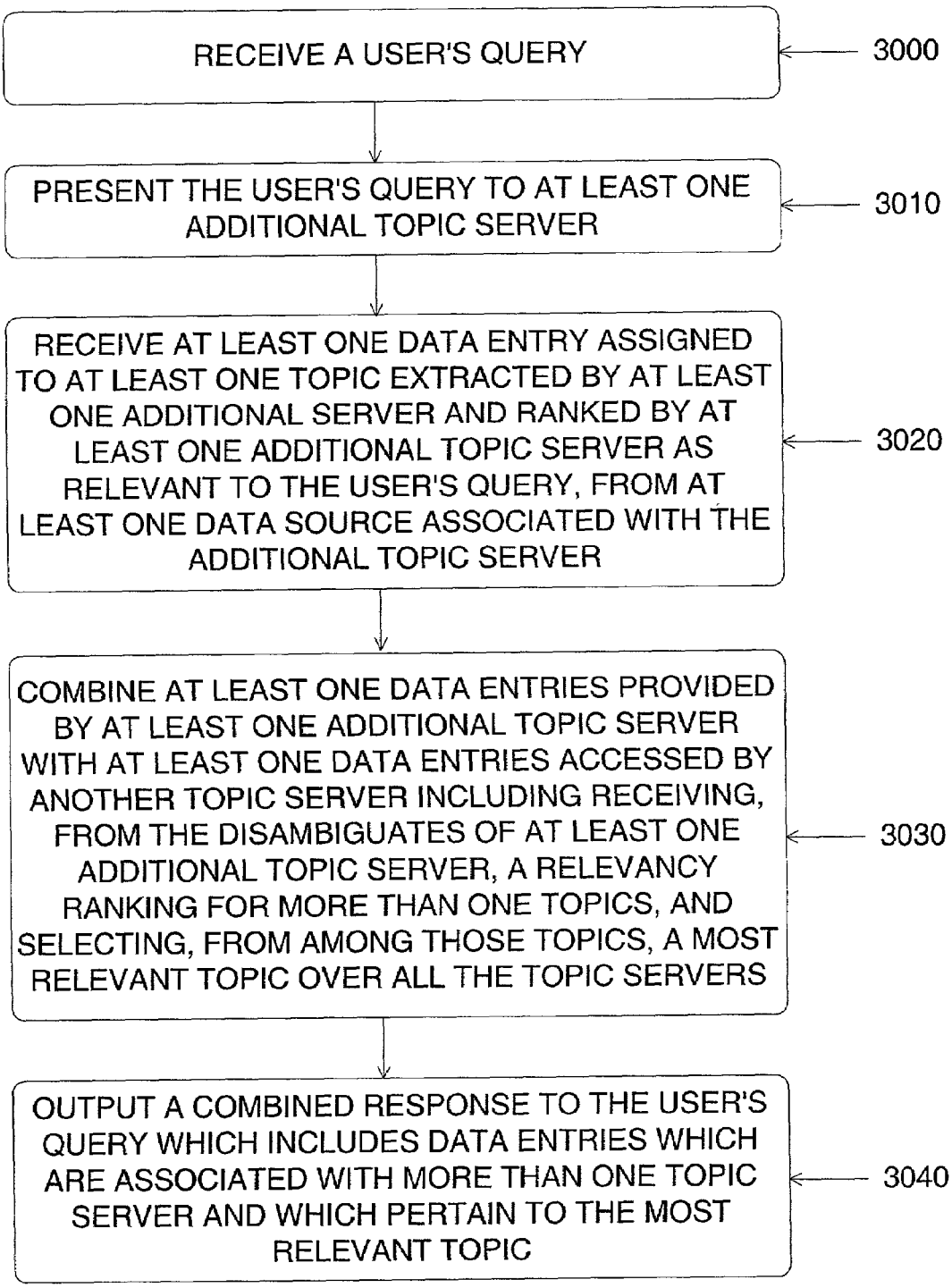

FIGS. 5A–5B, taken together, form a simplified flowchart illustration of a preferred method for performing the "add data entry" step in the method of FIG. 7, typically performed by the topic extraction unit of FIG. 2A except for a unification step performed by the unification unit of FIG. 2A;

FIG. 6 is a simplified flowchart illustration of a preferred method for performing the "get data from services block" step of FIG. 5A;

FIG. 7 is a simplified flowchart illustration of a preferred method for performing the data source processing step in FIG. 2B;

FIGS. 8A–8B, taken together, form a simplified flowchart illustration of a preferred method for performing the "update data entries" step in the method of FIG. 7 typically performed by the topic extraction unit of FIG. 2A except for a unification step performed by the unification unit of FIG. 2A;

FIG. 9 is a simplified flowchart illustration of a preferred method for performing a title extraction step (also termed herein the "trigger extraction step" performed in the course of carrying out the new data entry processing method of FIGS. 5A–5B and the data entry updating method of FIGS. 8A–8B;

FIG. 10 is a simplified flowchart illustration of a preferred method for performing the template computation step of FIG. 11;

FIG. 11 is a simplified flowchart illustration of a preferred method for performing the title computation step of FIG. 9;

FIGS. 12A–12B, taken together, form a simplified flowchart illustration of a preferred method for performing the lookup step of FIG. 2B;

FIGS. 13A–13B, taken together, form a simplified flowchart illustration of a preferred method for performing a disambiguation step performed in the course of carrying out the lookup method of FIGS. 12A–12B;

FIG. 14 is a simplified flowchart illustration of a preferred method for performing a word standardization step performed in the course of carrying out the trigger extraction method of FIG. 9 and the disambiguation method of FIGS. 13A–13B;

FIG. 15 is a simplified flowchart illustration of a preferred method for performing strong unification of topics useful in performing the unification method of FIG. 4;

FIG. 16 is a simplified flowchart illustration of a preferred method for performing trigger-based unification of topics useful in performing the unification method of FIG. 4;

FIG. 17 is a simplified flowchart illustration of a preferred method for performing unification of a data entry with an existing topic, useful in performing the strong and trigger-based unification methods of FIGS. 15 and 16;

FIG. 18 is a simplified flowchart illustration of a preferred method for performing internal unification useful in performing the unification method of FIG. 4;

FIG. 19 is a simplified flowchart illustration of a preferred method for matching groups of terms to one another, useful in performing the strong unification method of FIG. 15;

FIG. 20 is a simplified flowchart illustration of a preferred topic creation method useful in performing the trigger-based unification method of FIG. 16; and FIG. 21 is a simplified flowchart illustration of a preferred method for performing the data entry record insertion step of FIGS. 5A–5B;

FIG. 22 is a simplified flowchart illustration of a preferred method for performing the data source creation step of FIG. 2B;

FIG. 23 is a simplified functional block diagram of a preferred information retrieval system typically operative to organize data sources, screen irrelevant information and present the information in an intuitive format;

FIG. 24 is a simplified illustration of a data entry having several fields;

FIGS. 25–63 are screenshots which together form a preferred user interface for the topic builder of FIG. 1;

FIG. 64 is a diagram describing an association between two data entries respectively residing in a 'department' table and in an "employee" table;

FIG. 65 is a simplified flowchart illustration of a preferred method for integrating a new data source, operative in accordance with a preferred embodiment of the present invention;

FIG. 66 is a simplified flowchart illustration of a preferred method for advanced unification, operative in accordance with a preferred embodiment of the present invention;

FIG. 67 is a simplified flowchart illustration of a first preferred method of operation for the communications interface block 100 in FIG. 2A, in a "distributed topic servers" embodiment of the present invention in which an assembly of intercommunicating topic servers is provided; and FIG. 68 is a simplified flowchart illustration of a second preferred method of operation for the communications interface block 100 in FIG. 2A, in a "distributed topic servers" embodiment of the present invention in which an assembly of intercommunicating topic servers is provided.

Also attached herewith is a CD-ROM appendix which aids in the understanding and appreciation of one preferred embodiment of the invention shown and described herein.

DETAILED DESCRIPTION OF PREFERRED EMBODIMENTS

A portion of the disclosure of this patent document, which includes a CD-ROM appendix, contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIG. 1 is a simplified functional block diagram of a system for processing semi-structured data to facilitate information retrieval by a population of end-users. As shown, a plurality of clients 10 typically includes at least one topic builder 20 also termed here in "populator" and "publisher suite" and at least one look-up clients 30. A description of a preferred implementation of topic builder 20 including a preferred user interface for topic builder 20 is described hereinbelow with reference to FIGS. 25–63.

The look-up clients may comprise at least one web client 40, at least one alt-click client 50 and/or at least one personal digital assistant (PDA) 60 and/or any other wired or wireless device capable of receiving data from a server and displaying it. A "look-up client" typically comprises software that communicates with a server such as topic server 70 of FIG. 1, and is operative to send an information need to the server, receive a response from the server and display that response to the user. An "alt-click" client typically comprises software that takes input from text displayed on a screen which is indicated by the user using a suitable screen-area identification method such as an alt-click mouse operation.

Copending U.S. patent application Ser. No. 09/127,981 entitled "Computerized Dictionary and Thesaurus applications" describes a preferred method of implementing the "alt-click" client 50 of FIG. 1 and is hereby incorporated by reference. The method described in U.S. Ser. No. 09/127,981 may be used to identify at least one word on the screen and additionally to identify at least one word appearing in the vicinity of a word which was identified on the screen by a process of selection or "alt-clicking".

Copending U.S. patent application Ser. No. 09/374,478 entitled "Web-based information retrieval" is hereby incorporated by reference. U.S. Ser. No. 09/374,478 describes a preferred method for using an "alt-click" client 50 to obtain information from a database and for additionally retrieving this information from a host computer residing on a network such as the Internet. Information returned typically relates to the at least one transmitted word transmitted by a client such as an "alt-click" client. Additionally, the information returned may comprise advertising data or promotional data relevant to the user query.

The topic builder 20, also termed herein the "publisher interface", typically comprises a user interface to, or client for, a topic building process performed by the topic servers 70 of FIG. 1. A preferred user interface is described herein with reference to the screenshots of FIGS. 25–63.

The system of FIG. 1 comprises at least one topic servers 70 each of which is typically associated with a corresponding topic warehouse 80, also termed herein a "topic repository". A topic server 70 and topic repository 80 may coexist on the same physical machine as clients 10. Alternatively, the various elements may exist on separate physical machines which communicate via a network.

It is appreciated that each topic server 70 may define separate access rights for each individual user accessing the Topic Server and/or the Data sources contained in or associated with the corresponding Topic Repository 80. Some Data Sources may have no access right allowing full access to the public, while other Data Source may be restricted to individual users and/or groups of users. Users accessing a Topic Server or Data sources without proper credentials are typically not allowed access to Topics and/or Data Entries that are restricted to the user.

Typically, each topic repository 80 is stored as a relational database, such as Oracle, providing database functions such as term searches. The topic repository stores all information regarding topics derived from the data sources including rules for topic extraction, the topics which have been extracted, and the assignment of data entries to topics. Also included typically in each topic repository is information regarding how to access the data sources. Optionally, a topic repository may include duplicates of data stored in the data source, which data is desired to be locally available. Examples of data which may be duplicated in the topic repository include data which is relatively compact, relatively often used and relatively infrequently changed.

Each topic repository 80 typically comprises a set of tables containing topic information. The following table is a simplified description of a suitable set of tables and, for each table, of fields included therein.

| | |
|---|---|
| ACTUAL_WORDS | holds all the actual words found in the key titles |
| actual_word_id | |
| S13N | bitset of types of standardization done to the word |
| actual_word | |
| APP_PARAM | miscellaneous parameters which the application needs to connect to the database and run certain processes |
| user_name | |
| password | |
| host_name | |
| port_number | |
| db_sid | |
| ua_user_name | |
| ua_password | |
| ua_host_name | |
| ua_port_number | |
| ua_db_sid | |
| TABLESPACE_DATA_NAME | name of tablespace for table create statements |
| TABLESPACE_INDEX_NAME | name of tablespace for creating indexes |
| dtd | dtd which describes all the XML used to pass information back and forth |
| LOG_LEVEL | used in debugging |
| LOG_PATH | used in debugging |
| TTSRV_SERVER_IP | |
| TTSRV_PORT_NUMBER | |
| SERVICES_SCHEMA_NAME | |
| SERVICES_SCHEMA_PASSWORD | |
| UPDATE_FILE_ROOT_DIR | path of file used for scheduled updates |
| SCHEDULER_LOG_FILE_NAME | location of log file for scheduled updates |
| SCHED_UPDATE_COMMAND | name of Perl script used in scheduled updates |
| SMTP_SERVER | where to send e-mail from |
| SENDER_EMAIL_ADDRESS | |
| CATEGORIES | categories are used to create tab names and sort data sources by tab |
| category_id | |
| name | |
| priority | where the tab should appear in relation to other categories |
| CONCEPT_DATA_ENTRIES | connection table between data entries and concepts |
| ds_id | |
| entry_id | |
| concept_id | |
| descriptor | not used |
| unified | |
| last_unifier | session_id of unification session that unified this entry |
| unified_manually | yes/no if this entry was unified manually |
| automark_for_manual | yes/no if this entry was marked by automatic unification as ambiguous |
| CONCEPTS | pool of all existing concept_ids |
| concept_id | |
| UPDATED | |
| DATA_ENTRIES | pool of all existing data entries along with their display titles and short descriptions |
| ds_id | |
| entry_id | |
| display_title | |
| short_desc | |
| use_display_title | yes/no if this display title has been manually edited and should be used no matter what priority |
| use_short_desc | yes/no if this short description has been manually edited and should be used no matter what priority |
| DATA_ENTRY_TITLES | contains all the key titles |
| title_id | |
| ds_id | |
| entry_id | |
| weight | |
| title_type | ordered/unordered |
| ACTUAL_WORDS | bitwise representation of all the actual word ids of the words in the title |
| STD_WORDS | bitwise representation of all the standard word ids of the words in the title |
| NUM_WORDS | number of words in the title |
| manually_edited | |
| live_status | |
| DATA_SOURCES | properties of the data source |
| ds_id | |
| name | name displayed in Topic Builder |
| ds_type | Standard or Conceptless |
| table_name name of the | |
| DS_TABLE | |
| pres_template | presentation template for displaying data in the client |
| category_id | |
| intra_cat_priority | if there is more than one data source in the category this priority determines which one's information is displayed |
| concept_type | Old was used for statistical unification |
| short_desc_template | template of which fields/text should be used to create short description |
| display_title_template | template of which fields/text should be used to create display title |
| outsource_key_template | template of which fields/text should be used to create the unique key by which data entries can be referenced by the user |
| key_titles_template | template of which fields/text should be used to create key titles |
| display_title_rank | this rank determines whether the display title from an entry from this data source becomes the displaytitle of its topic |
| short_desc_rank | this rank determines whether the short description from an entry from this data source becomes the display title of its topic |
| spell_check | |
| entries_dtd | description of expected XML to be used for update of entries |
| last_update | date when the data source properties were last updated |
| DATA_TEMPLATE | template for displaying external data |
| TEMPLATE_UPDATE | last date on which the data template was updated |
| updatenow_source | whether update should be done from a file or a service |
| update_sourcefile | path of source file to be used in update |
| update_service_info | XML describing service parameters |
| schedule_state | set for scheduled up dates |
| schedule_frequency | how often scheduled updates should run |
| schedule_emails | if e-mail should be sent when scheduled updates fail and to whom |
| unification_state | if data source is set for automatic unification |

-continued

| | |
|---|---|
| UNIFICATION_FAMILY_NAME_KEY | unification family to which the data source belongs |
| allow_affiliated | yes/no if entries can be unified to more than one topic |
| Remove_Old_Entries | during update remove entries that are not found in the update file |
| Add_New_Entries | during update add entries that are only found in the update file and not in the existing table |
| Update_Manually_Edited_Entries | change the content of manually edited entries during update |
| UNIFICATION_SETTINGS | XML containing settings for statistical and internal unification |
| STATISTICAL_POSSIBLE | yes/no if data source has settings for statistical unification |
| UPDATE_LISTFIELD | yes/no if listfield connections should be recalculated during update |
| HISTORY_LOGS | keeps track of actions performed to DS_TABLES |
| ds_id | |
| from_time | |
| to_time | |
| task_type | list of types is found in the logged_task_types table |
| log_text | what happened during the action |
| is_scheduled | |
| LISTFIELDS | related data source definitions |
| listfield_id | |
| listfield_name | |
| from_ds_id | parent |
| to_ds_id | child |
| selected_fields | list of fields to be retrieved from child data source |
| FROM_FIELD_NAME | field by which the relation is defined in the parent data source |
| TO_FIELD_NAME | field by which the relation is defined in the child data source |
| DE_TO_DE | relationships between entries as defined by listfields |
| listfield_id | |
| from_ds_id | |
| from_entry_id | |
| to_ds_id | |
| to_entry_id | |
| LOGGED_TASKS_TYPES | list of tasks that are recorded in HISTORY_LOGS |
| type | |
| name | |
| sort | sets order in which logs are displayed, i.e. which tasked shown first |
| STD_WORDS | holds all the words found in the key titles after standardization |
| std_word_id | |
| std_word | |
| type | |
| TITLE_WORDS | information about all the words in all the key titles used in disambiguation |
| title_id | |
| word_index | position of the word in the title |
| actual_word_id | |
| std_word_id | |
| UA_GROUP_PERMISSIONS | stores all the permissions for users and groups |
| group_dn | LDAP name of user/group |
| resource_id | 0 for general permissions ds_id for data source specific permissions |
| permission_id | from UA_PERMISSIONS |
| user_flag | if user or group |
| UA_PERMISSIONS | list of system permissions |
| permission_id | |
| permission_name | |
| UNIFICATION_DS_PAIRS | special unification settings for pairs of data sources |
| DS_ID1 | |
| DS_ID2 | |
| UNIFY | allow unification (strong) or never unify |

-continued

| | |
|---|---|
| STATISTICAL_MATCHING | allow statistical unification which attributes to ignore when matching |
| DS1_MATCHING_STRING | template containing fields/text by which strong unification is performed |
| DS2_MATCHING_STRING | |
| UNIFICATION_FAMILIES family_name_key | list of all possible unification families |
| UNIFICATION_SESSION | keeps track of what happens during unification/parameters for the session |
| SESSION_ID | |
| DS_ID | |
| RESULT | |
| overwrite_manual | redo manual unifications |
| entries_examined | entries examined so far |
| TOTAL_ENTRIES_TO_UNIFY | total number of entries to be unified |
| complete_date | |

The topic server 70 is operative to extract data from a plurality of semi-structured data sources 90 and preferably performing one or more of the following topic-building data processing functions: data copying, data linking, topic extraction, trigger extraction, unification and/or one or more of the following look-up functions: disambiguation and lookup.

Typically, each datasource is at least partially structured in the sense that each datasource comprises a plurality of entries each including a plurality of fields. The system of the present invention is typically operative to assign at least one (typically exactly one) topic to each such entry. The topics are built by automatically processing at least a portion of the contents of each entry using publisher-defined rules.

Preferably, less than all the data in the data sources is copied into topic warehouses 80. The data sources typically comprises datasource meta-information defining data retrieval paths enabling each topic server 70 to retrieve, responsive to demand, data directly from the data source rather than storing it in its topic warehouse. This option is particularly useful for data which changes frequently or large-volume data or secured data when it is desired to retain the security policies of the data source for each attempted retrieval.

The topic server, as described in detail below, preferably performs some or all of the following functions:

"Topic extraction" comprises the identification of one or more fields within a data source 90 and creation of topic titles from those fields.

"Trigger extraction" comprises the identification of one or more fields within a data source 90 and extraction of keywords and key phrases therefrom which are useful in unification and lookup.

"Unification" comprises analyzing a set of topics to identify therewithin subsets of identical topics and collapsing the set by redefining all identical topics in each such subset as a single topic.

"Disambiguation" comprises removing ambiguity by matching a set of terms against a set of topics in a topic warehouse and computing a ranked set of matching topics. Disambiguation is useful within at least the following functions:

(a) Within Lookup—determining the most appropriate topics to be presented responsive to a user query which is typically ambiguous; and (b) Within Unification—determining sets of candidate or putative identical topics from which are culled identical topics.

"Lookup" comprises receiving a set of terms from a client, determining at least one appropriate topic to respond with, and returning all data in the topic warehouse pertaining to at least one of those topics. Typically, a few of the most appropriate topics within the topic warehouse are identified, and the lookup process comprises returning the data pertaining to the most appropriate thereof plus an indication of the "runners-up" to that most appropriate topic to allow the end-user to overrule the topic selected by the system as being most appropriate and to substitute therefor one of the runner-up topics.

EXAMPLE

A "biography" data source may comprise a collection of short biographies of each of a plurality of public figures. The biography data source is not a free text but rather is partially structured in the sense that the biography data source comprises a plurality of entries corresponding to the plurality of public figures and at least one of the following fields exists for each entry: lastname, firstname, biographyinfo. Another data source may comprise a concise encyclopedia. Each entry in the encyclopedia typically comprises the following fields: title, text.

The biography data source may comprise the following entry inter alia:
lastname: Clinton
firstname: William Jefferson
biographyinfo: Former president of the United States and former Governor. . . .

The encyclopedia may comprise the following entry inter alia:
titlefield: William Jefferson Clinton.
textfield: A Democratic president of the United States in the years. . . .

Suitable rules for building a topic for each data entry in the above two sources, based on each entry's contents typically comprise the following:
RULES FOR THE BIOGRAPHY SOURCE
a. Each topic has a title comprising the following sequence of elements:
lastname comma firstname
For example:
Clinton, William Jefferson
b. The biographyinfo field is defined as a "trigger field" of the topic.
RULES FOR THE ENCYCLOPEDIA SOURCE
a. Each topic has a title comprising a single element, titlefield. In other words, the title of each entry is the value of the "titlefield" field for that entry. For example, the title for the above Clinton entry is:
"William Jefferson Clinton",
i.e. not identical to the title for the Clinton entry in the biography data source which is:
"Clinton, William Jefferson".

Unification metadata is preferably provided which describes how to unify data from the two datasources. For this example, a suitable unification rule may be:
Compare the concatenation of values "firstname" "lastname" with the value of "titlefield". If they match, prefer the topic generated by the biography database.

Each topic server 70 typically stores the processed information in its topic warehouse 80 for retrieval responsive to client requests.

The Topic Server 70 and Topic Repository 80 of FIG. 1 typically comprises a knowledge warehousing system that provides:

One step access to concise information for specific topics in many different domains. For example—while reading an e-mail in a standard e-mail program, hold the ALT key and click on an employee's e-mail address. A window will pop up with the employee's name, picture, department, phone extension, and brief biography. Similarly, type the employee's name, or a Product ID, into a cell-phone or PDA, for concise, relevant, real-time information.

One additional click—but no additional wait for download—to view other information on the same topic. For example—click on a "Projects" tab for the employee to find a list of projects that employee has worked on. Or, click on the Inventory or Release Schedule tabs of a Product to get current status.

One interface to access a wide variety of topics originating from different databases, documents, intranets, etc. For example—the same interface that gives employee information will display weather information if the topic is "San Francisco" and a company profile and stock quote for "IBM.".

Search engines and portals provide links to documents. A first click will get the user to a list of documents related to the keywords that the user typed in. In a typical search with a standard search engine, the first click results in a list of thousands of documents. The user must then read through each choice in the hope that one additional click will display a relevant document. Frequently, this second click tries to bring up a page that is slow to load, irrelevant, in a different language, or just not there. None of these can happen in the Topic Repository in its preferred embodiment, as the Topic Repository's database contains concise, relevant information for each topic that it recognizes. Enterprise search engines and portals have the same limitations as Web search engines and portals.

Online reference tools provide reference material on topics. Some Web sites aggregate search boxes for different reference tools. However, no service exists that allows the user to request a topic and immediately display content for that topic from different static and dynamic sources. Also, no such services exist to help an enterprise or organization to retrieve concise, relevant information on a topic in a single click.

Examples of information which may be accessible using the system of the present invention include:
The ID of a product in a corporate database for a description, customers list, and competitive analysis.
The name of a customer or employee to see a picture, bio, contact information, family information, past and current projects or purchases, analysis, etc.
"San Francisco" to see the weather, description, and restaurant and movie listings for that city.
"IBM" for a company profile, stock quote, and product listings.

A method by which an organization might install, populate, and use the system of FIG. 1 may comprise the following:
Install the topic server;
Populate the topic warehouse with suitable information such as:
Products and supplies, with descriptions, customers, suppliers, and dynamically updated inventory
Employees, with name, salary, phone extension, resume, projects, address, family information, etc.
Customers, with name, company, spouse name, address, phone number, past purchases, and so on.
Glossaries, acronym lists, and so on.

Set accesses rights so that only people with Full HR privileges can see Salaries, etc.

Members of the organization can access the above information by alt-clicking on an employee name, keying in a product ID# on their cell phone, etc.

FIG. 2A is a simplified generally self-explanatory functional block diagram of an individual one of the topic servers 70 of FIG. 1.

A particular feature of a preferred embodiment of the present invention is that the topic server of FIG. 2A does not require hand-construction of a set of topics. In contrast, prior art systems generally require hand-construction of a set of topics including, for each topic, rules for analyzing a document and computing the degree of its relevance to each topic (e.g., to the extent that the document includes many references to one or more strings of characters defined as being indicative, to a varying degree, of the topic, then the document is considered relevant to the topic).

Another particular feature of a preferred embodiment of the present invention is that the system of the present invention employs a data source-specific topic-generation rule for each data entry within a particular at least partially structured data source in order to generate at least one topic for each data entry within that data source. Therefore, initially, typically, each data entry in each data source is assigned to exactly one topic which is generated according to the topic-generation rule determined (typically by the user) for that data source.

Subsequently, an internal unification process typically takes place within each data source which determines whether each data entry should be assigned to any of the topics generated on behalf of the remaining data entries. Also, a between-data source unification process typically takes place which determines whether each data entry in each data source should be assigned to any of the topics generated on behalf of any of the data entries in any other data source. The system can selectively determine e.g. as a result of a suitable user input, which data sources are to be unified by the above between-data source unification process.

Preferably, unification is performed at least partly based on the structure of the data entries rather than merely being based on comparisons of and measures of similarity applied to the texts forming the data entries. "Strong unification" of data entries under a single topic may occur on the basis of a defined similarity or identicality criterion between specific fields of the data entries. For example, two data sources may each have at least some of the same fields in their structure e.g. "firstname" and "lastname" and identicality of both of these may be the criterion for "strong unification", which obviates the necessity of comparing texts between data entries in the two data sources.

FIG. 2B is a simplified generally self-explanatory flowchart illustration of a preferred method of operation for the topic server control block of FIG. 2A. In FIG. 2B, a message is received which may be a query, also termed herein a "lookup" message, or alternatively it may be a "process data source" message received from the topic builder and instructing the topic server to prepare certain data entries in a data source, for topic-based retrieval. Alternatively, the message may be a unification message. For example, a set of data sources may have been processed, one after the other, for topic-based retrieval without having been unified, and now that all of these data sources have been processed, the user may now desire to perform a unification over all of these data sources.

Alternatively, the message may comprise a "data source creation" message instructing the topic server to create a new data source record in the topic repository into which topic data regarding that new data source is to be infused.

Figure 3:
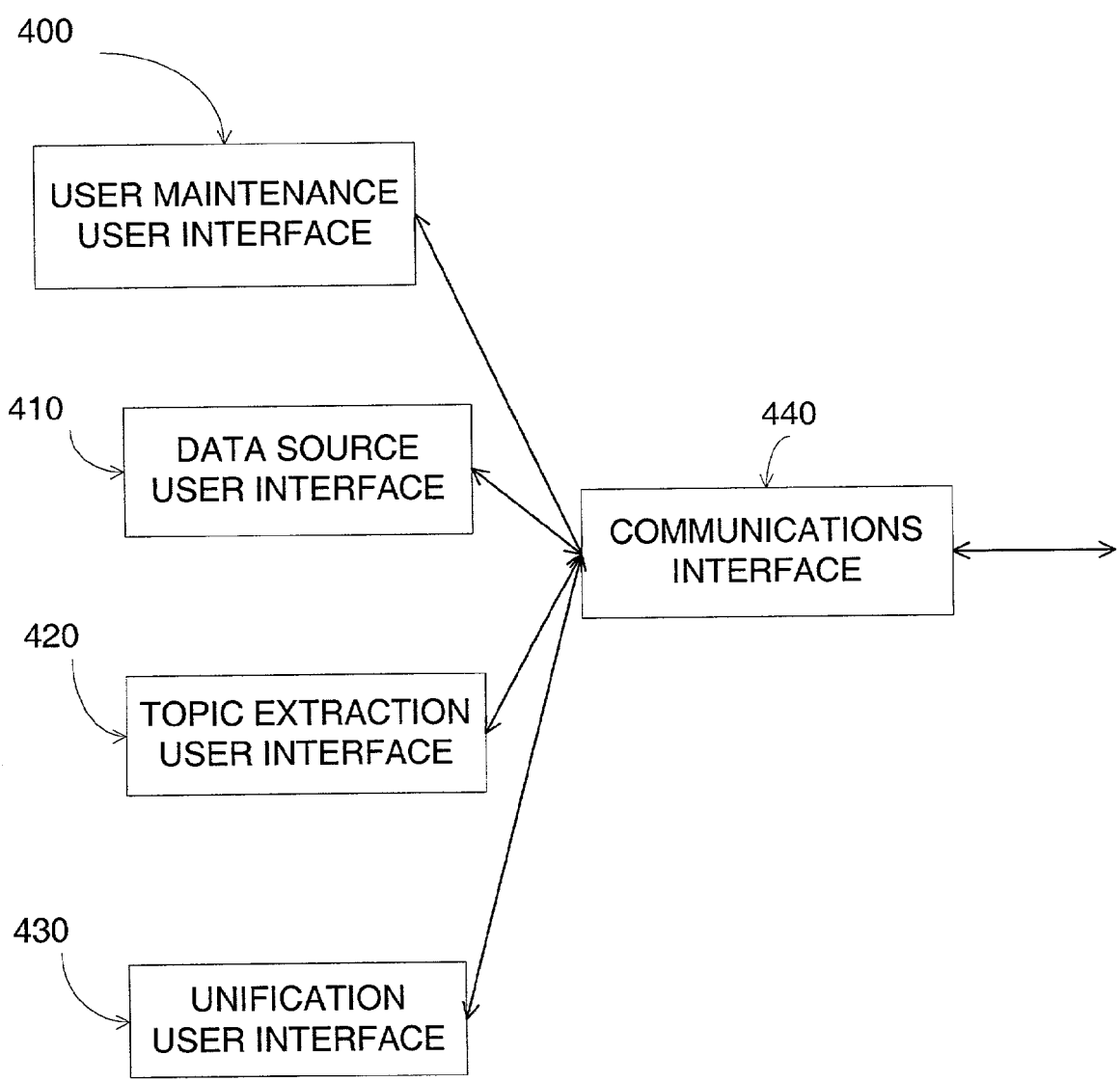
FIG. 3 is a simplified functional block diagram of the topic builder of FIG. 1.

FIG. 3 is a simplified generally self-explanatory functional block diagram of the topic builder of FIG. 1 which includes at least some of the user interface functions shown as described herein in detail with reference to FIGS. 25–63.

FIG. 4 is a simplified generally self-explanatory flowchart illustration of a unification process performed by the unification block 160 in the topic server of FIG. 2A. Internal unification is typically performed only responsive to a user instruction since internal unification is not suitable for all data sources. For example, a biography datasource is typically not internally unified since it is assumed that each data entry refers to a separate person. A telephone book may be internally unified since a single person may have more than one telephone number. Optionally, if at least one un-unified entry remains after strong unification has taken place, another attempt is made at unification, using a different unification process termed "title based" or "trigger based" and described herein with reference to FIG. 20.

FIGS. 5A–5B, taken together, form a simplified generally self-explanatory flowchart illustration of a preferred method for performing the "add data entry" step in the method of FIG. 7, typically performed by the topic extraction unit of FIG. 2A except for a unification step performed by the unification unit of FIG. 2A.

FIG. 6 is a simplified generally self-explanatory flowchart illustration of a preferred method for performing the "get data from services block" step of FIG. 5A.

FIG. 7 is a simplified generally self-explanatory flowchart illustration of a preferred method for performing the data source processing step in FIG. 2B.

FIGS. 8A–8B, taken together, form a simplified generally self-explanatory flowchart illustration of a preferred method for performing the "update data entries" step in the method of FIG. 7 typically performed by the topic extraction unit of FIG. 2A except for a unification step performed by the unification unit of FIG. 2A.

FIG. 9 is a simplified generally self-explanatory flowchart illustration of a preferred method for performing a title extraction step (also termed herein the "trigger extraction step" performed in the course of carrying out the new data entry processing method of FIGS. 5A–5B and the data entry updating method of FIGS. 8A–8B.

FIG. 10 is a simplified generally self-explanatory flowchart illustration of a preferred method for performing the template computation step of FIG. 11.

FIG. 11 is a simplified generally self-explanatory flowchart illustration of a preferred method for performing the title computation step of FIG. 9.

FIGS. 12A–12B, taken together, form a simplified generally self-explanatory flowchart illustration of a preferred method for performing the lookup step of FIG. 2B.

FIGS. 13A–13B, taken together, form a simplified generally self-explanatory flowchart illustration of a preferred method for performing a disambiguation step performed in the course of carrying out the lookup method of FIGS. 12A–12B.

FIG. 14 is a simplified generally self-explanatory flowchart illustration of a preferred method for performing a word standardization step performed in the course of carrying out the trigger extraction method of FIG. 9 and the disambiguation method of FIGS. 13A–13B.

FIG. 15 is a simplified generally self-explanatory flowchart illustration of a preferred method for performing strong unification of topics useful in performing the unification method of FIG. 4.

FIG. 16 is a simplified generally self-explanatory flowchart illustration of a preferred method for performing trigger-based unification of topics useful in performing the unification method of FIG. 4.

FIG. 17 is a simplified generally self-explanatory flowchart illustration of a preferred method for performing unification of a data entry with an existing topic, useful in performing the strong and trigger-based unification methods of FIGS. 15 and 16.

FIG. 18 is a simplified generally self-explanatory flowchart illustration of a preferred method for performing internal unification useful in performing the unification method of FIG. 4.

FIG. 19 is a simplified generally self-explanatory flowchart illustration of a preferred method for matching groups of terms to one another, useful in performing the strong unification method of FIG. 15.

FIG. 20 is a simplified generally self-explanatory flowchart illustration of a preferred topic creation method useful in performing the trigger-based unification method of FIG. 16.

FIG. 21 is a simplified generally self-explanatory flowchart illustration of a preferred method for performing the data entry record insertion step of FIGS. 5A–5B.

FIG. 22 is a simplified generally self-explanatory flowchart illustration of a preferred method for performing the data source creation step of FIG. 2B.

Reference is now made to FIG. 23 which is a simplified functional block diagram of a preferred information retrieval system typically operative to organize data sources, screen irrelevant information and present the information in an intuitive format. The system typically comprises several major components:

Topic Builder—The tool used to get databases or other data sources into the Server. The Topic Builder is used to add and modify data in the Server so the data appears as desired in the Answer Window.

Topic Server—The repository of data. The Server is designed to answer information requests quickly and accurately.

Answer Window—The interface used to access data in the Server. The Answer Window queries the Server and displays the data it receives.

Security Manager—This component controls who can view the data in the Answer Window or who can enter or update data in the Topic Builder.

The Topic Builder is now described in detail.

Data Source

A data source is a database table such as a list of employees and their contact information, or a document such as a glossary or technical specification. This is shown in FIG. 24. Data sources are the raw material that is processed by the Topic Builder, and then a representation of the data source is added to the Topic Server.

Data Entry and Data Field

All structured data sources have data entries, such as data entries 2801 and 2802. For example, each article in an encyclopedia is an entry, and each employee in an employee list is an entry.

In a database or other structured data source, each data entry has several subdivisions called fields as shown in FIG. 24.

You can use fields to let the Topic Builder know how to process the data source. In FIG. 24, you can designate the name field 2803 as the title, and you can instruct the Topic Builder to display the remaining fields under the title as a bulleted list. In this case, entry 2801 might appear in the Answer Window with the following details:

John Smith
Extension: 3345
Email: john_s
Room: 122

Topic

Topics are information snapshots comprised of data entries from various data sources that can be viewed in the Answer Window. For example, in FIG. 25, the topic 737-600 (a type of airplane) may have one entry from a Plane Registry data source, and another from a Fleet List data source.

Integration, Import, and Data Template

When you add a data source to the Topic Server, it is called integrating the data source. During integration, you tell the Topic Builder how to convert the data source entries into topics that can be viewed in the Answer Window. You must indicate which entry fields to use as the topic title, what trigger phrases should cause the topic to appear when somebody queries for them using the Answer Window, and more. There are two ways to integrate a data source:

Integration Wizard—The wizard leads the user step-by-step through basic integration. One can integrate databases or other structured resources using the import option to copy the database to the Topic Server. Or one can integrate files if they are in the required XML format.

Expert Integration—This option has more capabilities than the Integration Wizard, and may be faster to use for advanced users. In addition to being able to import databases and files, a user can set up a data template (ADT) that points to your database. This allows the Topic Server to access a database directly instead of importing a local copy into the Topic Server. Both the Integration Wizard and Expert Integration use the Import Database option when copying database content to the Topic Server.

Unification

Unification is the process by which the Topic Builder combines entries from various data sources together in one topic. It is what allows the Answer Window to show several tabs containing different kinds of information about a topic, as is shown in FIG. 25, instead of just having one tab per topic.

The Topic Builder provides a variety of effective methods for performing unification and fine-tuning the results.

Data Source Management

There are a variety of things a user can do to data sources:

Update—Users should update a data source when a new version of the original data source, such as a glossary or employee list, becomes available. Users can update data sources manually, or set the Topic Builder to automatically update the data source periodically.

Relate—Users can relate data sources to each other in a similar way that database tables can be related to each other. This causes some of the data in the child table to behave as if it resides in the parent table. The data from the child table will appear in the Answer Window along with data from the parent table.

Find/Edit—Users can perform a "search and replace" function across an entire data source, manually add entries to a data source, delete entries from a data source, create an empty data source, and view data source properties.

Topic Management

Using the Topic Builder, you can modify topics so they appear in the Answer Window as desired. Users can move entries (tabs) from one topic to another, change the content of an entry, and change the way content appears. Users can also determine how topics will appear in the Answer Window by setting tab order, title priority, and description priority. An advanced Find option helps you quickly find the topics you are looking for.

Topic Builder

Opening the Main Window

When users opens the Topic Builder, they are shown a login screen where they can enter their username and password. The Topic Builder compares login information with the permissions that were assigned with the Security Manager. The permissions determine which data sources each user can see and how they can change them. When permission information has been found and loaded, the Topic Builder main window appears.

Changing Connection Options

In some systems, Topic Builder is installed on several servers, and each server contains its own data sources and topics. If the name of a server changes, or if you have multiple servers, this will need to be indicates in the Topic Builder. To do this, there is an Options button on the Login window. This window is also accessible from the Topic Builder main window. In the window the user can enter the server name or server IP address.

The Topic Builder Main Window

After successfully logging into the Topic Builder, the main window appears.

The main window is divided into several parts:

2811, the toolbar—In addition to useful buttons, this bar includes the Search box used to locate topics.

2812, the view icons—Click on these icons to view data sources or topics.

2814, the view pane—This pane displays topics or data sources, whichever you are currently viewing.

Each data source listing, shown in 2805, appears with the following information:

Name—The data source name.
ID—The unique data source identifier.
Publication Date—The date the data source was integrated.
Entries—The number of entries in the data source.

Viewing Data Source Entries

To view the first several entries in a data source, simply double click on the data source name. The entries appear at the bottom of the window. To change the number of entries that appear when you double click on a data source, change the Entry Number field 2804 as desired.

Instead of viewing the first several entries in the selected data source, you can view entries that relate to a particular search phrase. Simply type the phrase in the search box and press the search button.

When the search button is pressed, the entries in the selected data source that contain the search phrase appear at the bottom of the window.

To navigate the entries, press the buttons in section 2806. One can go to the first or last set of entries by pressing the arrow buttons. It is also possible to jump to a particular entry by typing its ID in the Start from Entry ID field.

Viewing Topics

You can search for and view topics in the Topic Server by entering text into 2810.

Topics whose trigger phrases closely match the search phrase appear in the View Pane 2813.

When one selects a topic, the preview tab 2814 displays how the topic appears in the Answer Window.

The following information is displayed for each topic:

Title—The topic title that appears at the top of the Answer Window.
Topic ID—The unique topic identifier.
Description—A short description of the topic.
Data Sources—The data sources that have entries unified with this topic.

The Properties and Contents tabs that appear at the bottom of the window are used to edit the topic, as will be discussed later.

Refreshing the Display

The Topic Builder can be installed on several workstations within the organization, and users can work at all installations simultaneously. If a user suspects that data sources or topics have been edited while he was logged in to Topic Builder, he can update the display by opening the Tools menu and choosing Refresh List.

Similarly, if users suspect that users/groups have been edited or permissions have been changed while they were logged in to the Topic Builder, they can update the display by opening the Tools menu and choosing Reload Permissions.

Login Limit

For security reasons, the Topic Builder will automatically log users off if they have been connected for more than 12 hours and 40 minutes consecutively. After the logout time has been exceeded, background processes will be completed but new active process cannot be completed. If this happens users will receive a Ticket has Expired message. To continue working one has to login again.

Sending For Help

The Topic Builder includes an option for quickly sending an email to your Support Staff or IT Department. To do so, one can open the Tools menu and choose Support. Then fill in the email and press Send.

The message is automatically sent to the client's Support Staff or IT Department.

Importing Databases

Opening the Database

To open a database for import, open the File menu in the Topic Builder main window and choose Import from Database. Then FIG. 28 appears. Choose the database type. If you will be importing from an Oracle or MS Access database, choose Oracle or MS Access. If your database vendor provides JDBC drivers for Windows and Solaris, choose JDBC. Otherwise choose ODBC.

The window that appears depends on the database type you chose: Oracle, MS Access, JDBC, or ODBC.

Oracle

Figure 29:
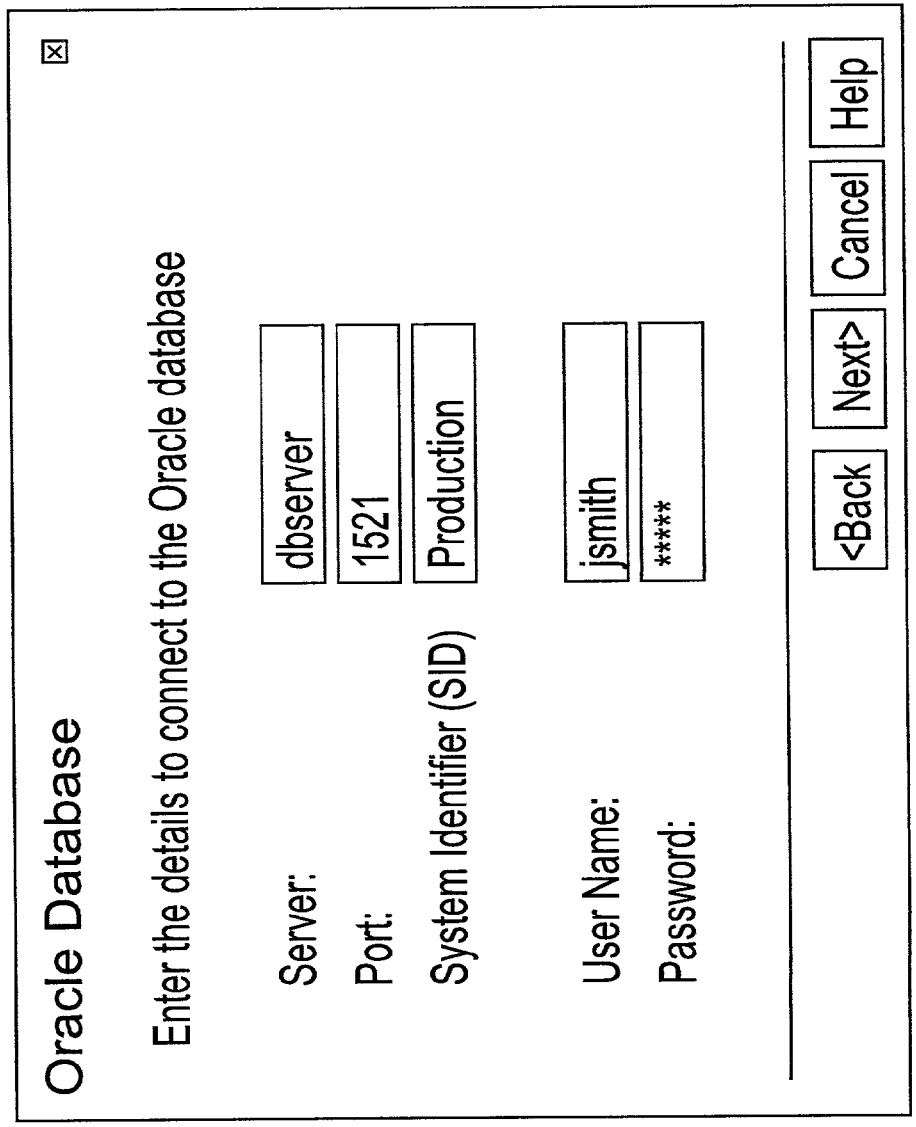

For example, FIG. 29 is the dialogue box shown when connecting to an Oracle database. It requires the following parameters:

Server—The server that hosts the database.
Port—The server port used to access the database.
System Identifier (SID)—The identifier of the system in the database to which you connect.

User Name—Your username.
Password—Your password.

When you are done, press Next.

For Microsoft Access databases, type in the database path or browse to the database in the Access dialogue.

ODBC

In the ODBC window, the list shows all ODBC data sources defined on your computer. When you have selected the desired database in the list, fill in your User Name and Password, and press Next.

JDBC

In the JDBC window, fill out the following parameters:
Driver Class Name—Full name of the JAVA class which is the driver for the database.
URL—Connection string used to connect to the database.
Username—Your username.
Password—Your password.
Location of JDBC class—Location of the JAR or ZIP file containing the driver class (see Driver Class Name above). Type it in or browse to it. If you need more than one file, separate each file with a semicolon (;).

Building the Query

Figure 30:
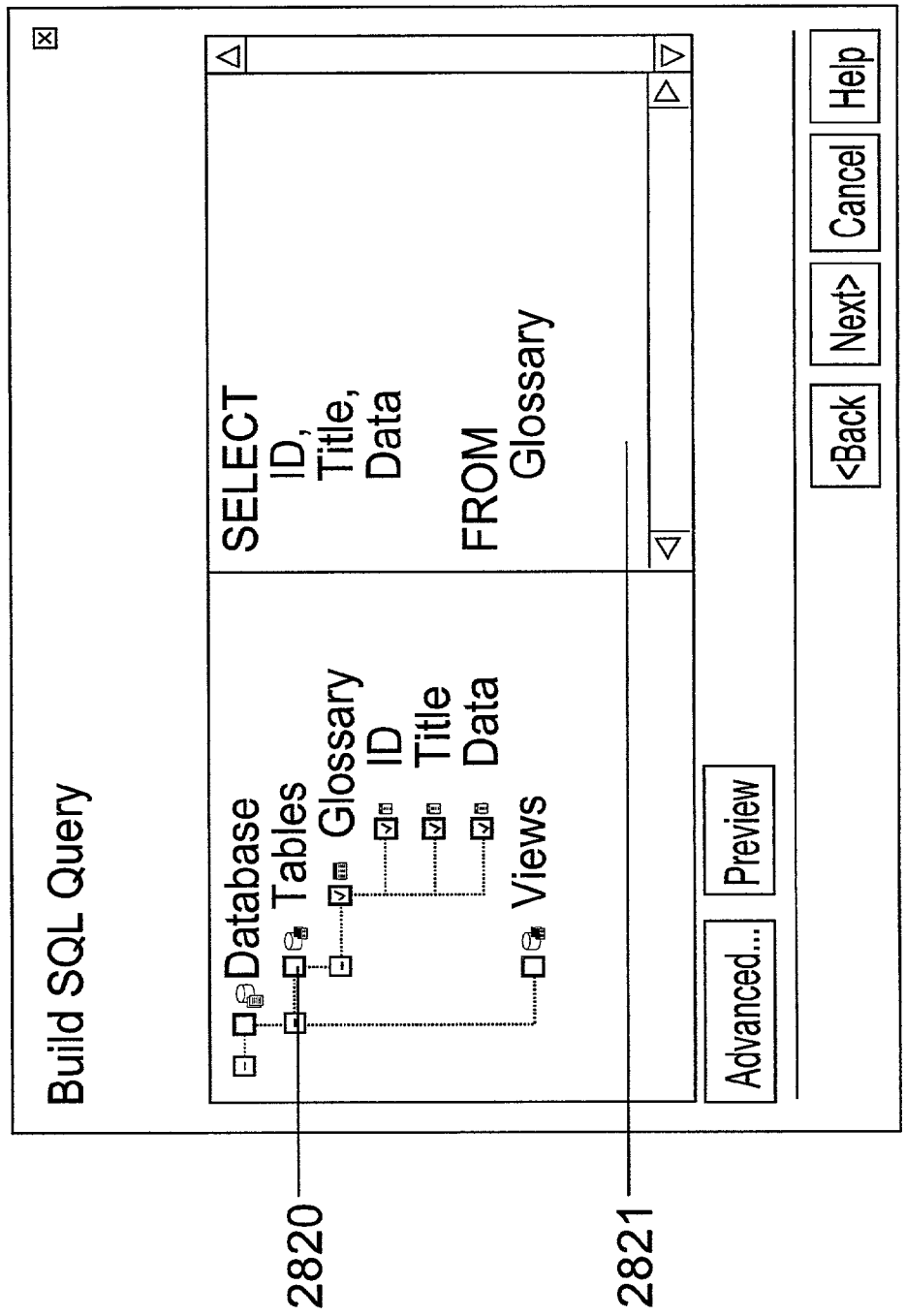
Figure 31:
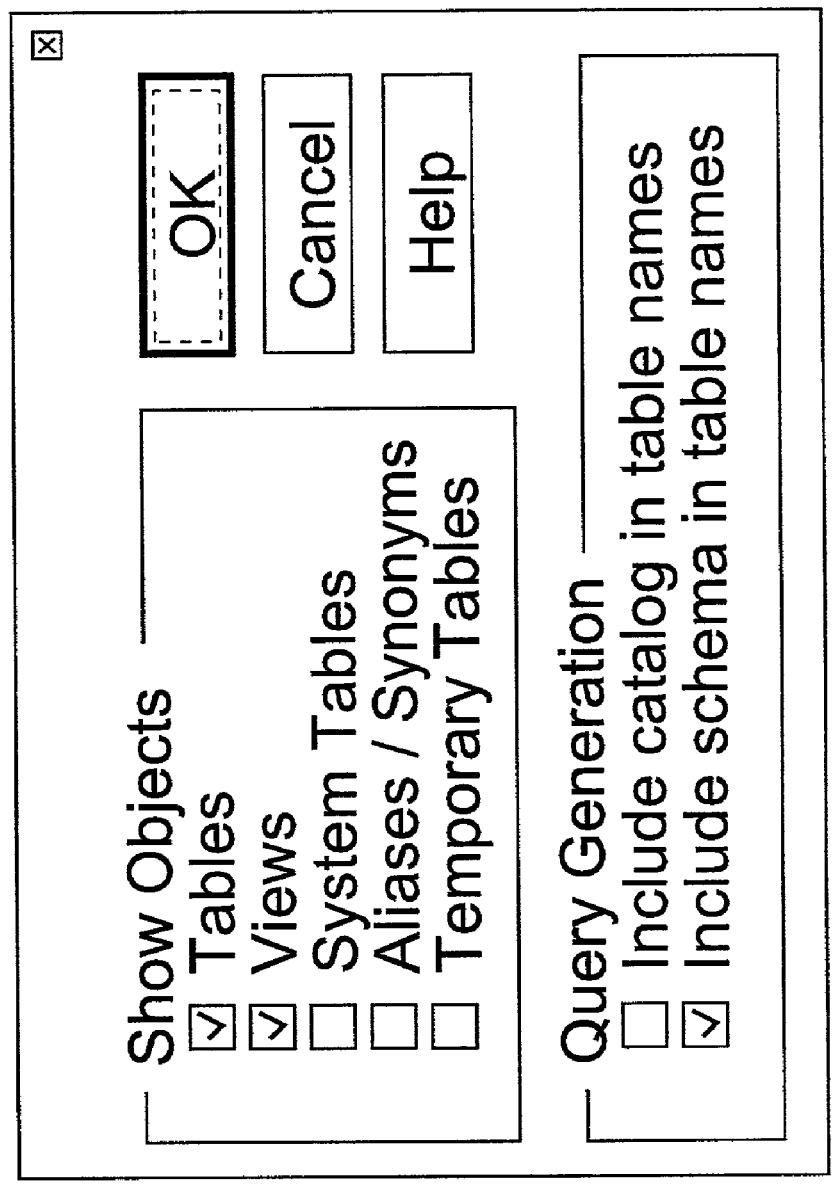

The database opens and appears in the left pane of the Build SQL Query window as shown in FIG. 30. The next step to importing the database is to use this window to build a query that specifies which parts of the database are to be imported. Use the + sign to navigate the database tree.

Put a checkmark next to the database items to be imported, as in 2820. The query for importing the checked items appears in the right pane of the window. To view a preview of the data marked for import, press Preview.

When you are done building the query, press Finish to import the database.

Advanced Database Navigation

To make it easier to navigate the database in the Build SQL Query window, you can choose to show/hide some elements of the database:

In the Build SQL Query window, FIG. 30, press Advanced. The window shown in FIG. 31 appears.

In the Show Objects section of the window, put a check next to the database elements you wish to show. Unchecked items will be hidden.

In the Query Generation section of the window, indicate whether the table names in the query should be catalog/schema independent to allow the query to work even if the table is moved to a different catalog/schema.

After pressing OK, the database appears again in the Build SQL Query window, with only the desired elements shown.

Previewing the Query Results

You can preview the results of the query you have defined in the Build SQL Query window. This visually allows you to determine if you have selected the correct items for import. To view the preview window:

In the Build SQL Query window, FIG. 30, press Preview. The window shown in FIG. 32 opens.

Integrating Data Sources

Starting the Wizard

To start the Integration Wizard, open the File menu and choose Integration Wizard in the Topic Builder main window.

Figure 33:
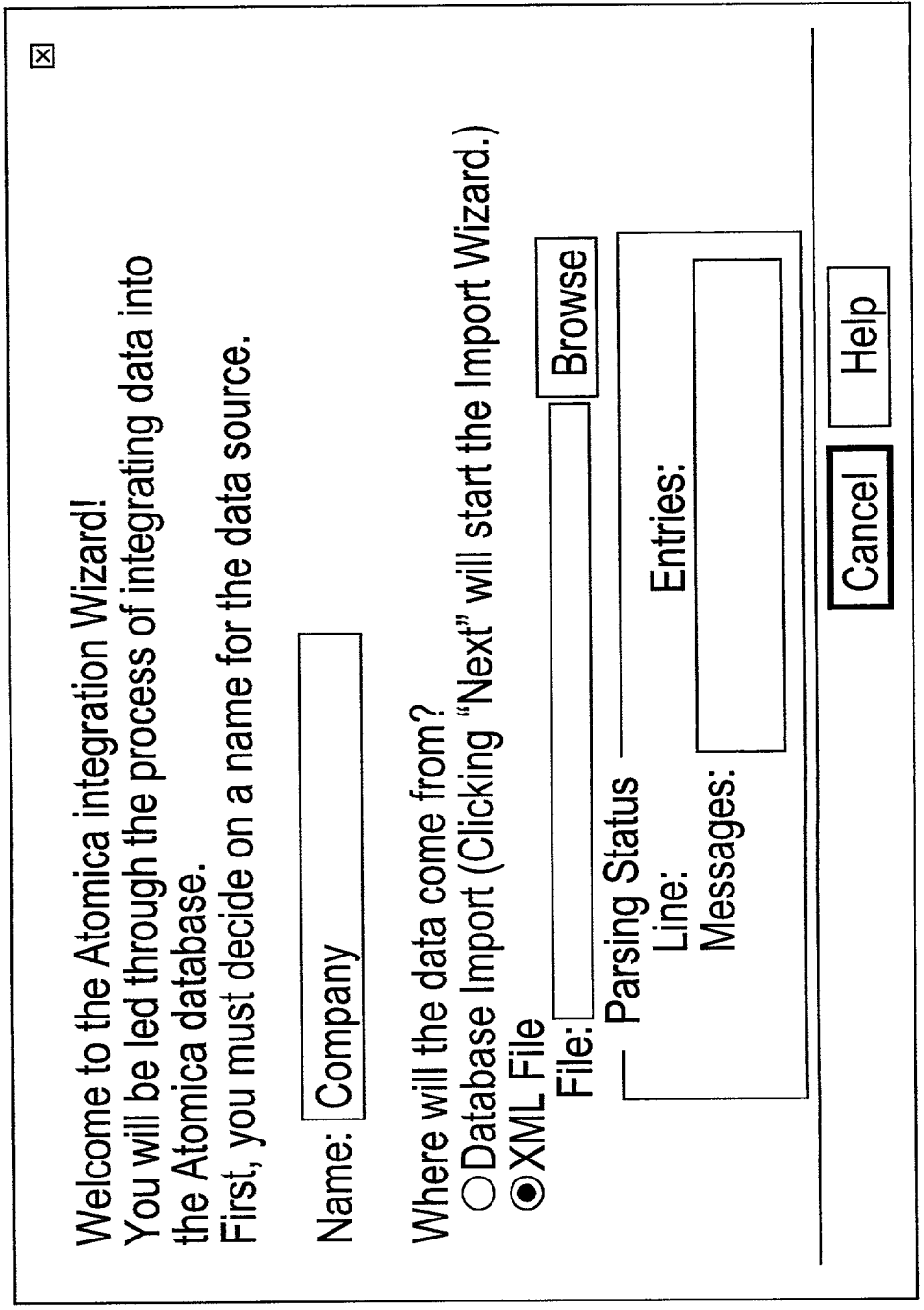
Figure 37:
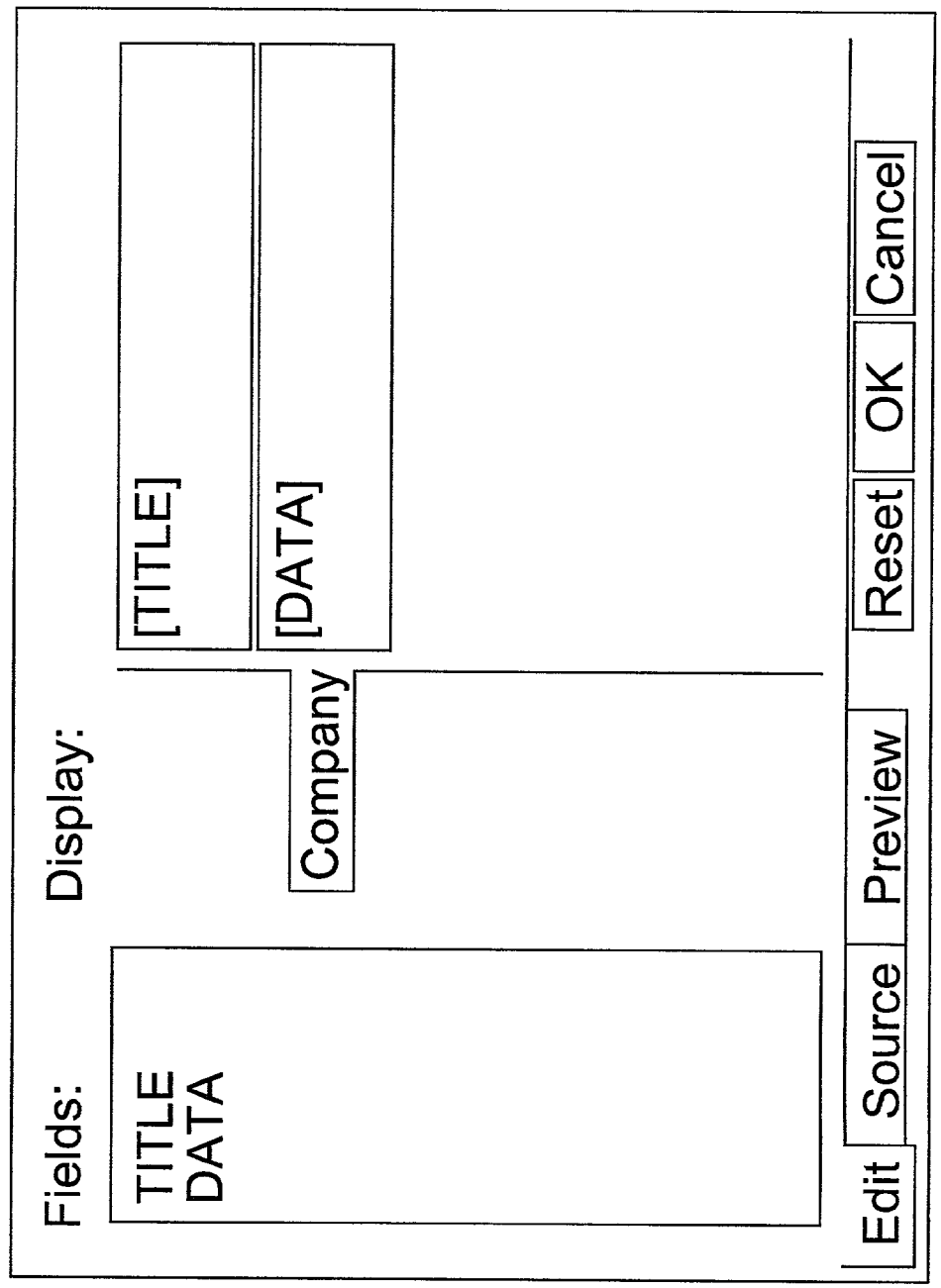

At the top of the window shown in FIG. 33, fill in the data source name. This is how the data source will be listed in the Topic Builder main window.

Indicate whether the data source being imported is a database or an XML file.

If you are importing a database, the Importing Database Wizard appears to help you through the import. When you are done importing the database, you are returned to the Integration Wizard.

If you are importing an XML file, press Browse and locate the file. The wizard checks the file validity, reports any errors, and indicates when it has imported the file successfully.

Creating Topic Attributes

When you press Next, the Topic Creation Attributes window shown in FIG. 34 appears.

In this window determine whether the entries in this data source will ever appear as their own topics. If they will (this is usually the case), set how the entries in this data source will behave as topics by designating the title, description, and trigger phrases. If the data source you are now integrating is only going to appear as a child data source click the then choose not to create topics and the following steps, until Enabling Updates, are not performed.

Set the Title and Description

The fields of the data source appear in the Data Source Fields list on the right side of the window shown in FIG. 34. These fields represent the different kinds of information in the source file. For example, if the source file is a telephone list, standard fields might include First Name, Last Name, and Telephone Number.

Use the data source fields to tell the Topic Builder what the Title and Description for each entry should be.

The title is what appears in the title bar of the Answer Window when the topic is shown.

The description is the label that appears next to the title in the Did You Mean? tab of the Answer Window.

Designate the title and description by selecting the desired data source field and pressing the left arrow. The data source field name is copied into the appropriate box (as shown above). If desired, you can copy over several fields to make up the title or description (such as [Title][ID]).

You can also add text directly to the Title and Description fields by simply clicking on them and typing. However, the Title field must contain at least one data source field.

The Title and Description fields can each contain a maximum of 150 characters. The text is truncated if there are more characters.

Set the Trigger Phrases

Now set the trigger phrases at the bottom of the window. Trigger phrases are words or groups of words by which topics can be found in the Answer Window. For example, if someone Alt-clicks or types Finance, all topics with the trigger phrase Finance will appear.

Tell the Topic Builder which data source fields to use to build trigger phrases for each topic. Consider the example where the data source is a list of Suppliers. You would want each Supplier's trigger phrases to include the name of the Supplier company. This would allow users to search for Suppliers by their company names.

Build trigger phrases using data source fields in the same way you built the title and description. Simply select the desired data source field and press the left arrow to copy the data source field name into the Trigger Phrases box. You can specify several trigger phrases.

Exact

For each trigger phrase, put a check in the Exact box if the entire trigger phrase must be matched for the topic to be found. This is useful when, for example, the trigger phrase contains phrases such as bird in the hand. In this case, you want the entire phrase to trigger the topic, not just one word from the phrase.

Priority

For each trigger phrase, assign a Priority to indicate the quality of the trigger phrase. If the trigger phrase is a very good indicator of the entry content, give it a higher priority. If not, give it a lower priority. If two topics have the same trigger phrase, the one with the higher priority is shown in the Answer Window.

Combining Trigger Phrases

Combine two data source fields to create a trigger phrase. When you do this, the first field is required and the second optimizes the trigger phrase (assuming the Exact option is not checked; see above).

Consider the example of the combined fields: [LastName] [FirstName]. In this case, if someone searched for a last name only (such as Jones), or for a last name and a first name together (such as Mary Jones), the topic would be found. But if someone searched for the first name only (such as Mary), the topic would not be found. If the two fields had appeared as two separate trigger phrases, the topic would be found by either Mary or Jones.

To combine fields, make sure the first data source field is selected when bringing over the other data source fields. In this example, the procedure would be as follows:

In the Data Sources Fields list, select [LastName] and press the arrow.
In the Trigger Phrases list, select [LastName].
In the Data Sources field list, select [FirstName] and press the arrow.

Typing Trigger Phrases

Manually type in text to be used as a trigger phrase. However, every trigger phrase must include at least one data source field. You can then add fixed-text trigger phrases topic-by-topic.

You can also create trigger phrases that comprise partly of fields and partly of typed text. For example, the trigger Order [OrderID] allows the topic to be found by phrases such as Order 17.

A word in a trigger can have up to 100 characters. There can be 25 words in a trigger.

Deleting Trigger Phrases

To delete a trigger phrase, select the phrase and press delete button designated with an X.

Enabling Updates

When you press Next from the window in FIG. 34, the Enable Updates window appears.

In FIG. 35 first determine whether you will ever need to update the data source with a more current version. If you will, designate the unique key as described below. For a data source to be updated, it must have a unique field.

Determine Whether to Enable Updates

If the data source is never going to be updated, select the I will not need to reintegrate data . . . option and press Next.

If the data source is periodically updated, such as an employee list, select the I want the ability to reintegrate new or changed data . . . option and designate the unique key as described below.

Designate the Unique Key

The unique key is not used at integration time, but rather is used later when the data source is updated. The unique key allows the Topic Builder to keep track of entries so it knows when to update an entry and when to create a new one.

Consider the example of an employee list. In this case it would be wise to assign the [EmployeeID] field as the unique key. This way, if an employee changes her name and the data source is updated, the Topic Builder will know to update the existing entry. And if a new employee has the same name as an existing employee, the Topic Builder will know to add a new entry. It is important to choose an effective unique key, since it cannot be changed without re-integrating the data source.

Specify the unique key by selecting the desired data source field and pressing the left arrow. The data source field name is copied into the Unique Key field. If no single field is unique, you can combine two or more fields to make the unique key (such as [ID][Title]).

Setting the Presentation Template

When you press Next, the Presentation Template window appears.

The following sections provide an introduction to presentation templates, and explain how to select or create a template.

About Presentation Templates

Presentation templates determine how entries in the data source will appear in the Answer Window. They determine the name of the tab in which the entries appear, and set the exact look and functionality of each data field.

Select a Template

If you want a basic, no-frills template for the data source you are now integrating, or if you prefer to deal with the presentation later, select the Use a default template . . . option. The default template shows all the entry fields in a bulleted list. It displays the entry title at the top, and uses the data source name as the tab name.

When you are ready to work on the presentation template, select the Run the Template Creator . . . option. This allows you to create your own template for this data source.

Create a Template

When you choose the Run the Template Creator . . . option, the Template Creator window appears.

The Template Creator is a graphical interface that minimizes the need to deal with code when creating a template. It helps you create a wide variety of templates, but does not allow the full flexibility available when using code directly.

The left side of the window lists the data source fields. The right side is used to graphically build the template. At any time, you can go to the Source tab to see the actual source code of the template, or to the Preview tab to see exactly how the first entry of the data source will appear in the Answer Window using this template. Building a template involves several steps:

Adding the desired number of text boxes to the template and editing their content.
Optionally adding a picture to the template and editing its content.
Adding the desired number of tabs to the template, and editing their content.
When you are done, press OK to return to the Integration Wizard.

Adding and Editing Text Boxes

When you first open the Template Creator (FIG. 37), two text boxes appear. The top one is for a title, and the bottom one is for regular text.

To set the text that will appear in the either of the text boxes, simply click in the box and type. Alternatively, you can drag one or more data source fields from the left side of the window onto the text box so that the value of the fields will be displayed. You can also combine fields and typed text to get the desired result.

Using Text Boxes with an Internally Unified Data Source

When you are using an internally unified data source, a check box appears alongside each text box. When the check box is marked, the text in the text box appears only once even if the information in a subsequent text box is repeated. When the check box is blank, the text in the text box appears each time.

For example, a data source contains quotes from famous personalities. Once text box contains the person's title and the second text box contains the quote. One person may have made many well-known quotes. If the title check box is marked, the person's title will appear only once for a number of quotes. If the title check box is blank, then the title will appear alongside every quote.

Adding and Editing a Picture

If your data source includes a field that contains links to graphics, add this field to the template:

Press the Picture button. A picture icon appears in the template display.

Drag the field onto the picture. The field name appears below the picture icon.

When an entry from this data source is displayed in the Answer Window, the picture icon is replaced by the relevant graphic.

Adding and Editing Tabs

When you first open the Template Creator, one tab appears. To edit the name of the tab, just click on the tab and type. This sets how the tab will appear in the Answer Window.

The Template Creator also allows you to add tabs. This will cause one entry to appear on more than one tab in the Answer Window. For example, if your data source includes information about the company's divisions, you can have general information about the division appear in the General tab, and have a list of employees in the division appear in the People tab. To add a tab, press the Add Tab button at the top of the window.

For each tab, you will have to add text boxes and/or pictures to indicate how information in the tab will be displayed. Click on a tab to view its contents.

Resetting the Display

To start over, press Reset. The display area resets to how it looked when you first opened the Template Creator.

Setting Unification

When you press Next, the Unification Information window appears. In this window determine whether the entries in this data source will be unified to existing topics, and in what way. The following sections provide an introduction to unification, and explain how to set the parameters in this window.

About Unification

Unification is the process by which the Topic Builder combines entries from various data sources together in one topic. It is what allows the Answer Window to show several tabs containing different kinds of information about a topic, instead of just having one tab per topic. In this way, unification greatly enhances the power of the system.

Select Unification Type

Choose from the three options shown in the Unification Information window:

No Unification—Select this option if you want each entry in this data source to appear as its own topic even though there may be other very similar topics in the Topic Server.

Automatic Unification—Select this option to have the Topic Builder intelligently unify entries from the data source to similar existing topics.

Advanced Unification—Select this option if you want to fine-tune the parameters used to unify the data source. When you select this option, the Settings button will become activated. Press this button to open the Unification tab where you can set the advanced unification parameters, as will be discussed later. When you are done, you will be returned to the Unification Information window.

When you are done, press Finish.

Finishing Integration

When you press Finish, the Topic Builder begins integrating the data source. A progress window lets you know how the integration is progressing, and informs you when the integration was successful.

Figure 38:
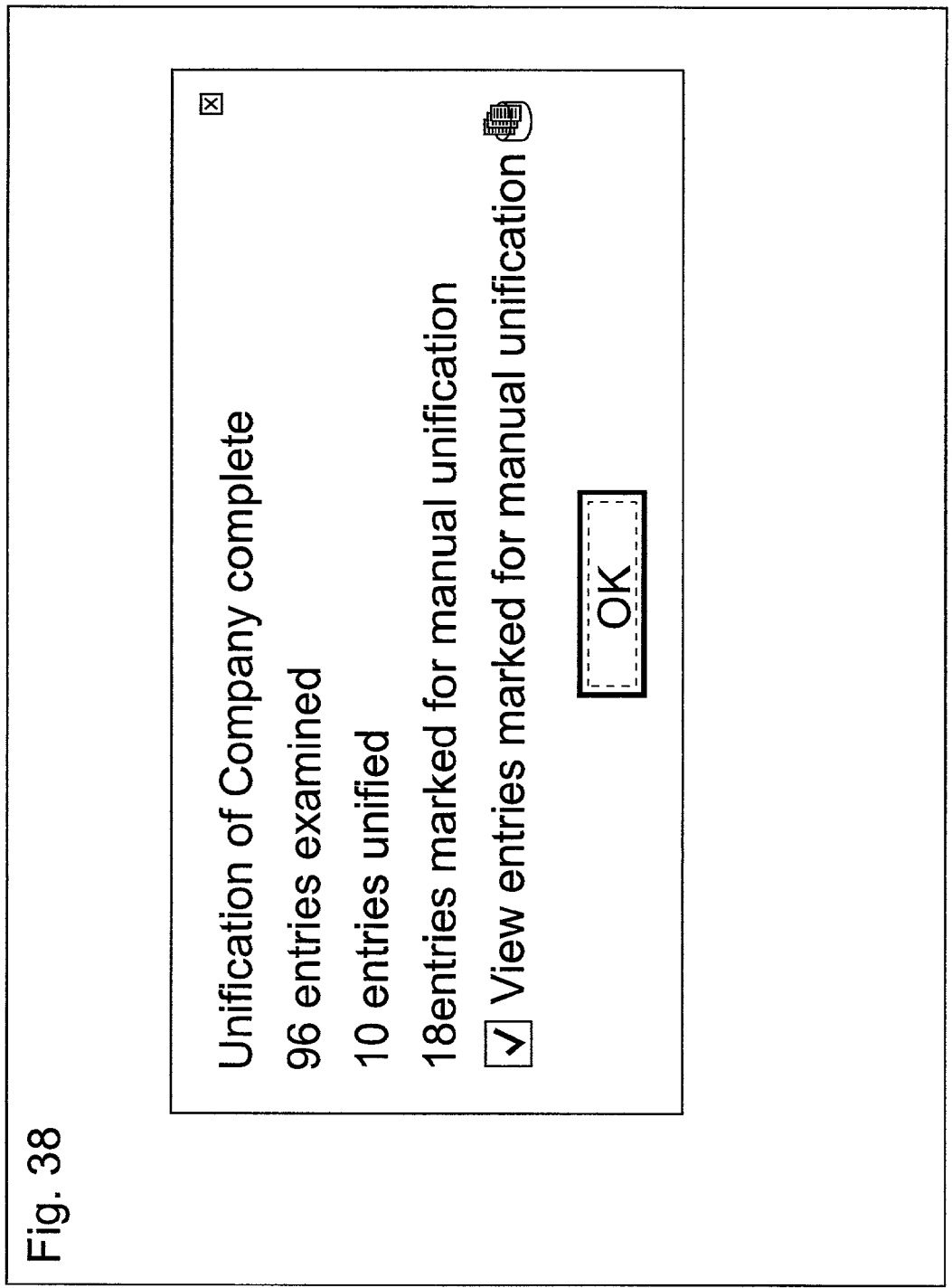

If you enabled unification, the data source is also unified and a special status window, FIG. 38, appears to show the unification results.

This window shows how many entries were in the the data source, how many were unified, and how many were marked for manual unification.

Entries are marked for manual unification when the Topic Builder is uncertain whether they should be unified. These entries are left un-unified, but since they are marked they can be easily found during the manual unification process. Manual Unification will be discussed further later.

If you do not want to work on manual unification now, or if you did not unify your data source, uncheck the View entries marked for manual unification option and press OK. To see this topic at a later stage, click the right mouse button and select Show Unresolved Topics.

Figure 26:
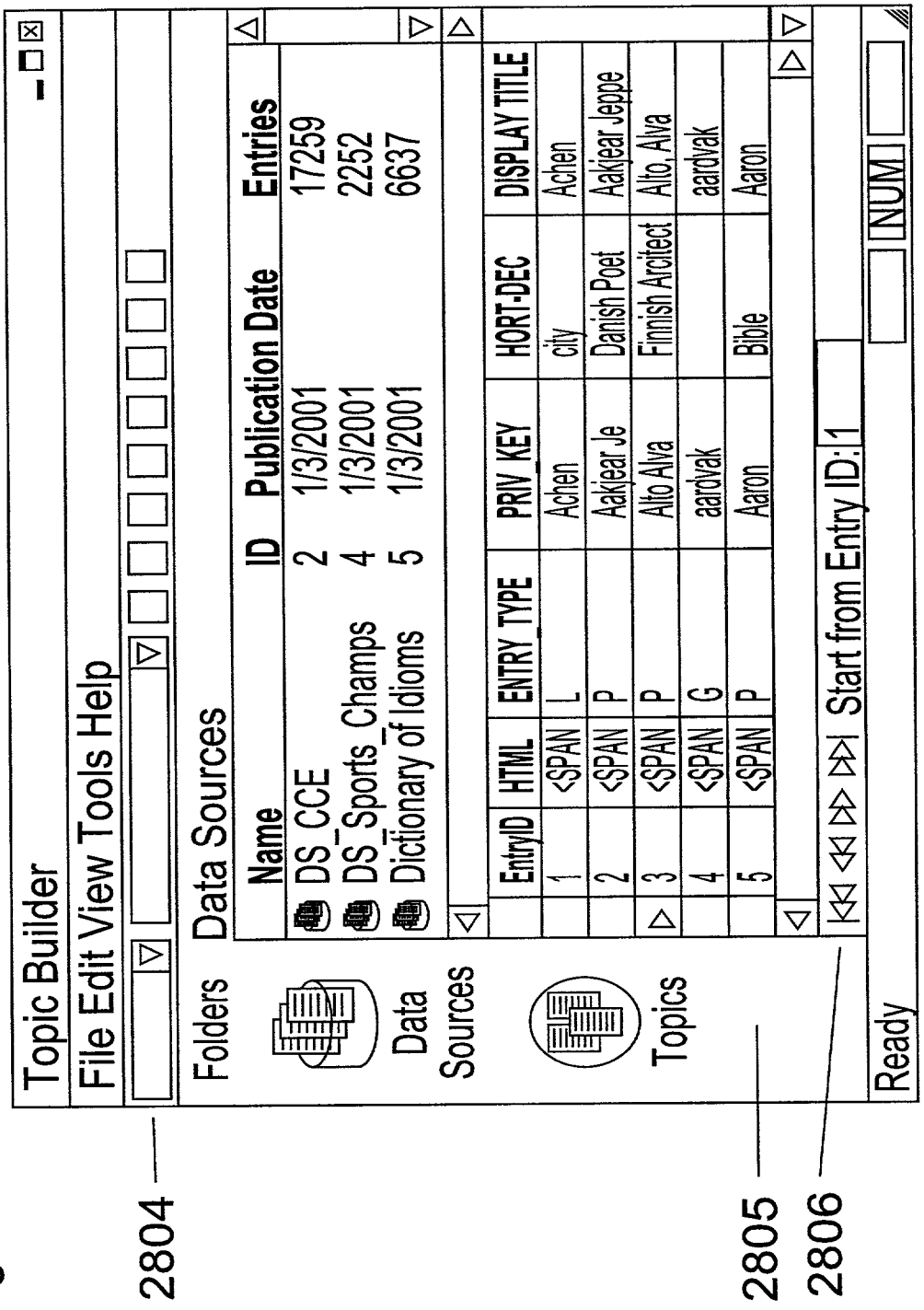
Figure 27:
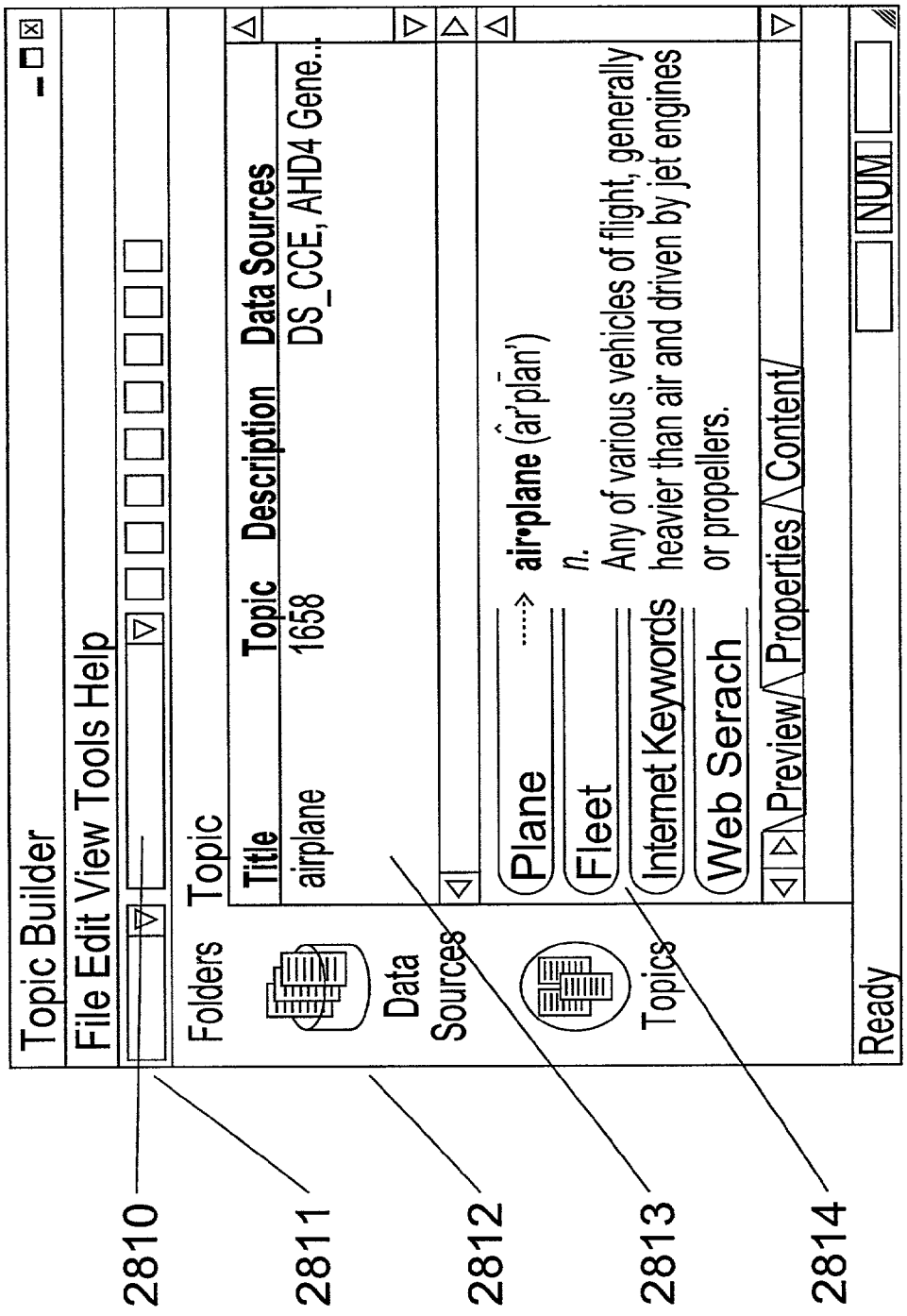
Figure 28:
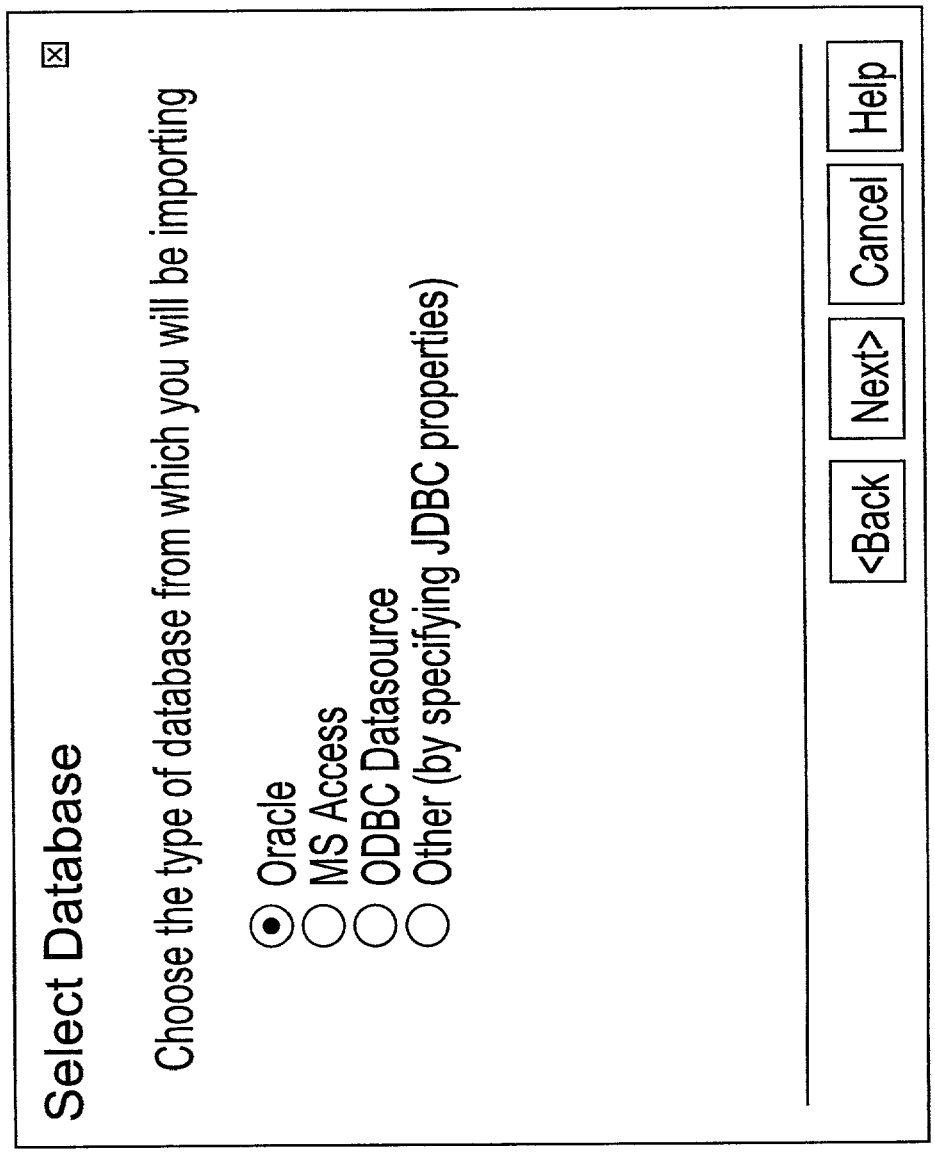

Your data source has been successfully integrated, and it now appears on the data source list in the Topic Builder main window, FIG. 26.

Expert Integration

Before You Integrate

If you are integrating a database and you do not intend to set up a data template, you must use the Import Database option before you integrate. Data templates will be explained in later discussions. If you are integrating a document, make sure it is in valid single level XML.

Integration Procedure

This section explains the general procedure for integrating a new data source. Each step is explained in detail in the following sections, with reference to FIG. 65.

To integrate a data source:

In the Topic Builder main window, open the File menu and choose Integrate (Expert). The Integrate XML window opens.

In the General tab, specify the source file properties, set the unique key, determine whether to create topics from this data source, determine the title and description, and build trigger phrases.

In the Presentation tab, choose the presentation template.

If you wish to make live queries to an external database, go to the External Fields tab and choose the data template.

You can fill out the last two tabs now, or leave them for later. In the Unification tab, you set the unification parameters. In the Update tab, set the update parameters. At any time you can view the History tab to see the unification and update history of the data source.

When you are done, press OK. The Topic Builder analyzes and processes the data source, and integrates it into the Topic Server. By default, an integrated data source can only be edited by the user who integrated it. To open a data source to general use, use the Security Manager, which will be discussed later.

Step 2830: Specify the Source File Properties

The first step in integrating a data source is to go to the General tab and specify the XML source file properties.

In the Name field, type the name by which the data source will be listed in the Topic Builder.

Specify the source file by typing the path and name of the XML file in the XML Source File field. Alternatively, you can browse to the file and select it.

When you specify the source file, the Topic Builder checks the file validity and reports any errors. The fields of the data source automatically appear in the Fields list on the right side of the window. These fields represent the different kinds of information in the source file.

For example, if the source file is a telephone list, standard fields might include First Name, Last Name, and Telephone Number. You will use data source fields in steps 2, 3, and 4 below to help the Topic Builder organize the data source in the Topic Server.

The ID field is automatically filled with the data source ID after integration.

Step 2831: Set the Unique Key

The unique key is not used at integration time, but rather is used later when the data source is updated. The unique key allows the Topic Builder to keep track of entries so it knows when to update an entry and when to create a new one.

Consider the example of an employee list. In this case it would be wise to assign the [EmployeeID] field as the unique key. This way, if an employee changes her name and the data source is updated, the Topic Builder will know to update the existing entry. And if a new employee has the same name as an existing employee, the Topic Builder will know to add a new entry. It is important to choose an effective unique key, since it cannot be changed without re-integrating the data source. If you do not expect to ever update the data source, deselect the Data source is updateable option. If you do expect to update the source, leave the Data source is updateable option selected and specify the unique key by selecting the desired data source field and pressing the left arrow. The data source field name is copied into the Unique Key field.

If no single field is unique, you can combine two or more fields to make the unique key.

Step 2832: Determine Whether to Create Topics

Optionally, you can determine that entries from this data source will not become topics nor unify with existing topics. Data from this data source will only be seen in the Answer Window if the data source is related as a child to another data source. Related data sources will be discussed further.

Step 2833: Determine the Title and Description

When integrating a data source, tell the Topic Builder which data source fields to use to build the title and description for each entry.

The title is what appears in the title bar of the Answer Window when the topic is shown.

The description is the label that appears next to the title in the Did You Mean? tab of the Answer Window.

Build the title and description using data source fields in the same way you built the unique key. Simply select the desired data source field and press the left arrow to copy the data source field name into the appropriate box.

You can combine fields just as you did for the unique key. You can also add text directly to the fields by simply clicking on them and typing. However, the Title field must contain at least one data source field.

The Title and Description fields can each contain a maximum of 150 characters. The text is truncated if there are more characters.

Step 2834: Build Trigger Phrases

Trigger phrases are words or groups of words by which topics can be found in the Answer Window. For example, if someone Alt-clicks or types Finance, all topics with the trigger phrase Finance can appear.

When integrating a data source, you must tell the Topic Builder which data source fields to use to build trigger phrases for each topic. Consider the example where the data source is an employee email list. You would want each employee's trigger phrases to include the employee's name and email address. This would allow users to search for people by name or email address.

Build trigger phrases using data source fields in the same way you built the unique key. Simply select the desired data source field and press the left arrow to copy the data source field name into the Trigger Phrases box. You can specify several trigger phrases.

Exact

For each trigger phrase, put a check in the Exact box if the entire trigger phrase must be matched for the topic to be found. This is useful when, for example, the trigger phrase contains phrases such as bird in the hand. In this case, you want the entire phrase to trigger the topic, not just one word from the phrase.

Priority

For each trigger phrase, assign a Priority to indicate the quality of the trigger phrase.

If the trigger phrase is a very good indicator of the entry content, give it a higher priority. If not, give it a lower priority. If two topics have the same trigger phrase, the one with the higher priority is shown in the Answer Window.

Combining Trigger Phrases

You can combine two data source fields to create a trigger phrase. When you do this, the first field is required and the second optimizes the trigger phrase. Consider the example of the combined fields: [LastName] [FirstName]. In this case, if someone searched for a last name only (such as Jones), or for a last name and a first name together (such as Mary Jones), the topic would be found. But if someone searched for the first name only (such as Mary), the topic would not be found. If the two fields had appeared as two separate trigger phrases, the topic would be found by either Mary or Jones.

To combine fields, make sure the first data source field is selected when bringing over the other data source fields. In this example, the procedure would be as follows:

In the Data Sources Fields list, select [LastName] and press the arrow.

In the Trigger Phrases list, select [LastName].

In the Data Sources field list, select [FirstName] and press the arrow.

Typing Trigger Phrases

You can manually type in text to be used as a trigger phrase. However, every trigger phrase must include at least one data source field. You can then add fixed-text trigger phrases topic-by-topic.

You can also create trigger phrases that comprise partly of fields and partly of typed text. For example, the trigger Order [OrderID] allows the topic to be found by phrases such as Order 17.

A word in a trigger can have up to 100 characters. There can be 25 words in a trigger.

Deleting Trigger Phrases

To delete a trigger phrase, select the phrase and press the button marked with and X.

Step 2835: Choose a Presentation Template

The presentation template determines how the entries in the data source will appear in the Answer Window. It determines the name of the tab in which the entries appear, and sets the design and functionality of each data field.

Figure 40:
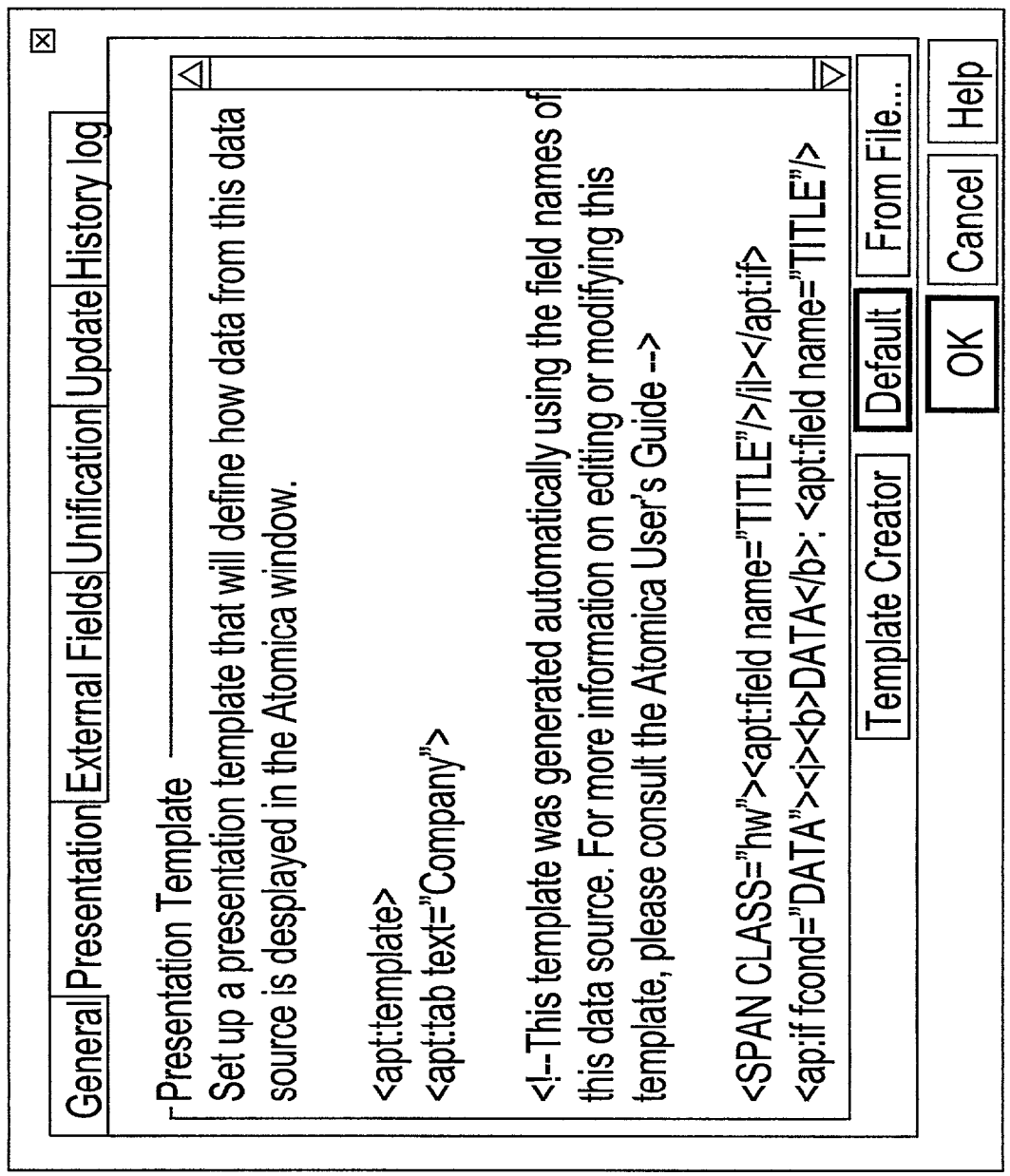

To choose a template for the data source:

In the Integrate XML window, go to the Presentation tab, seen in FIG 40.

To use the default template, press Default. To use or edit an existing template file, press From File. To create a new template for this data source using the graphical Template Creator, press Template Creator.

You can edit the template text if desired. Changes to the template affect the data source but are not saved in the original template file.

Step 2836: Choose a Data Template (ADT)

During full integration, the data source is copied to the Topic Server. This means that changes made later to the original data source are not reflected in the Topic Server. This normal mode of integration is used for data sources that are small, relatively static, with infrequent updates.

Many data sources provide information that updates continuously: stock quotes, news, inventory levels, order status, etc. For these data sources, you can use a data template to setup a link to your database. Each time a search is made in the Answer Window, the data is drawn anew directly from the live remote database.

Figure 41:
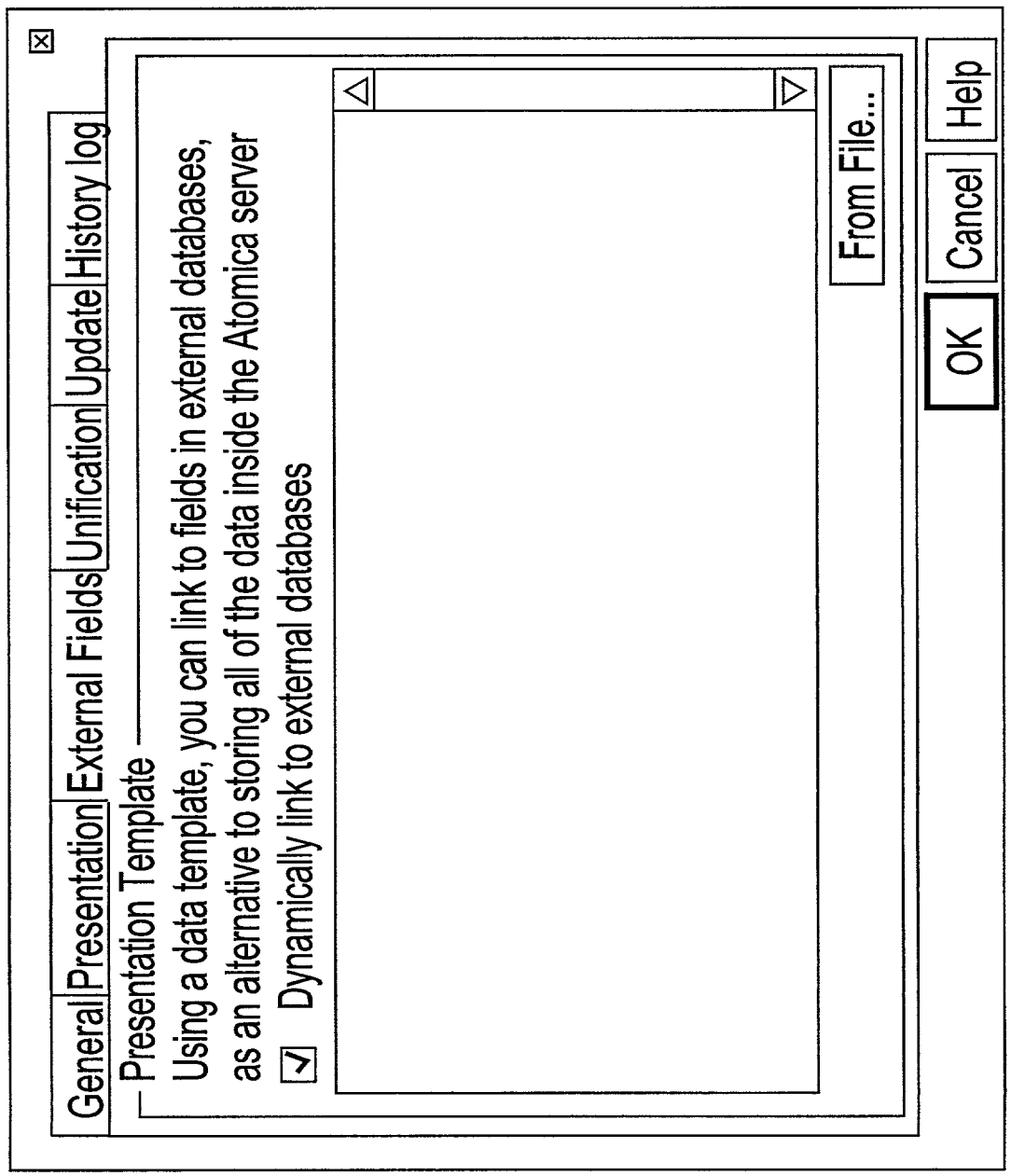

To choose a data template for the data source:

In the Integrate XML window, go to the External Fields tab, FIG. 41.

Check the Dynamically link to external databases option.

Press From File, browse to the template, and press OK.
The template text appears in the window.

You can edit the template text if desired. Changes to the template affect the data source but are not saved in the original template file.

Step 2837: Set Unification Parameters

You can set unification parameters now so that the data source will be unified during integration, or you can unify the data source later. Unification will be more fully discussed later.

Step 2838: Set Update Parameters

You can set update parameters now, or at any time later. In any case the update parameters are not used during integration, but rather when an update occurs.

Step 2839: View Data Source History

Figure 42:
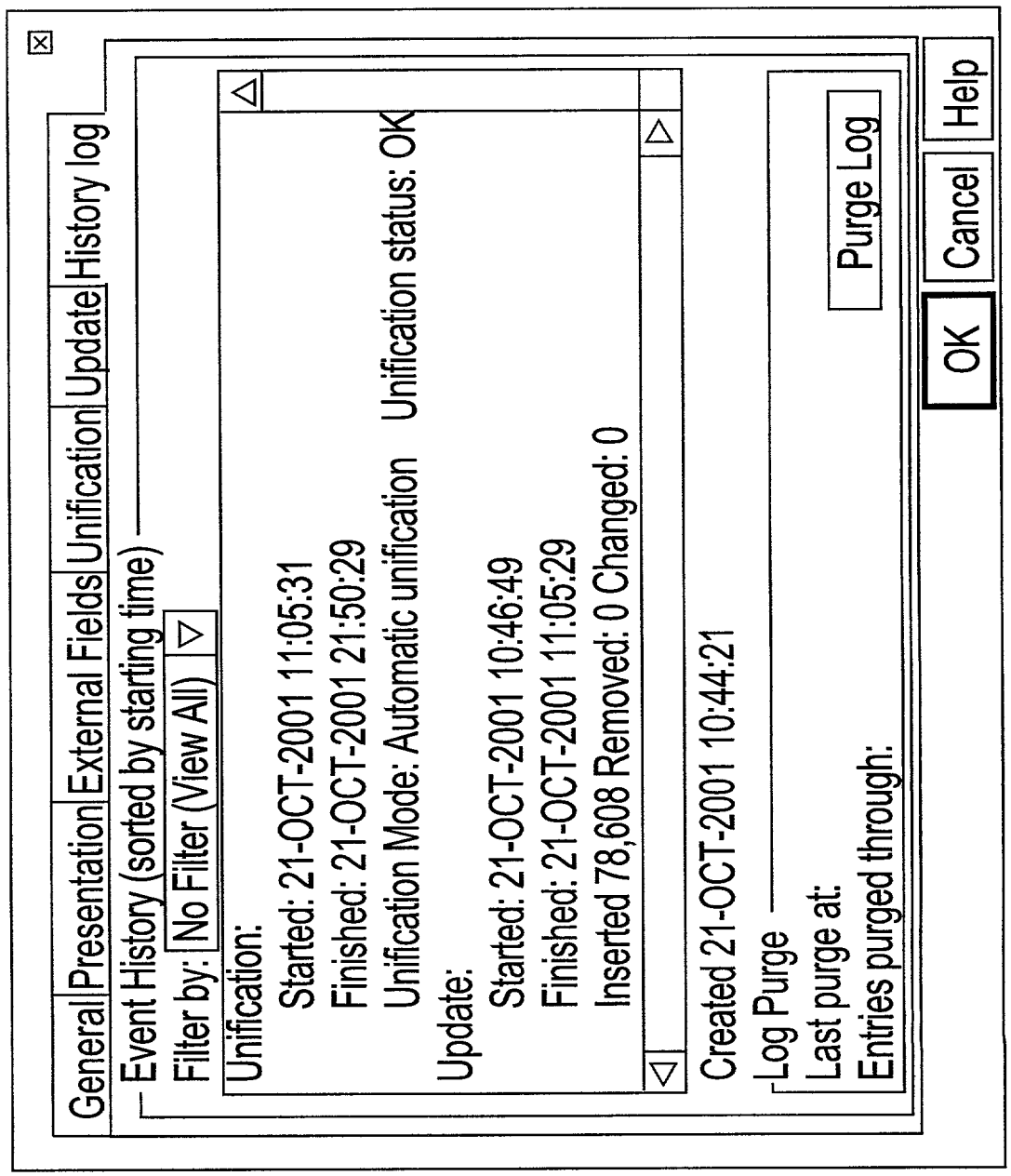

The History tab, shown in FIG. 42, shows the unification and update history of the data source. Since the data source has not yet been integrated, the History tab will be empty if you view it before the integration is complete.

To view the data source history any time after integration, right-click on the data source and choose Properties, and then go to the History Log tab.

To delete some of the history entries, press Purge.

Fine-Tuning Unification

Unification Overview

Unification is the process by which the Topic Builder combines entries from various data sources together in one topic. It is what allows the Answer Window to show several tabs containing associated information about a topic, instead of just having one tab per topic. In this way, unification greatly enhances the power of the system.

When integrating data sources, either with the Integrating Wizard or with the Expert Integrator Builder performs this unification based on the information it has about the new data source and the existing data sources, and based on default unification parameters.

If automatic unification is not sufficient, you can fine-tune it in two ways:

Advanced Unification—This can be done when integrating, or at any time afterwards. It involves adjusting the unification parameters used by the Topic Builder so the data source will integrate as desired.

Manual Unification—This method involves manually manipulating data source entries to combine them into new topics or to split them into separate topics. This method is especially useful for entries which the Topic Builder marked for manual unification, since it was unsure whether they should be automatically unified.

Advanced Unification

Advanced unification is sometimes performed when integrating a data source, and sometimes performed subsequently after examining the success of the default settings.

Figure 43:
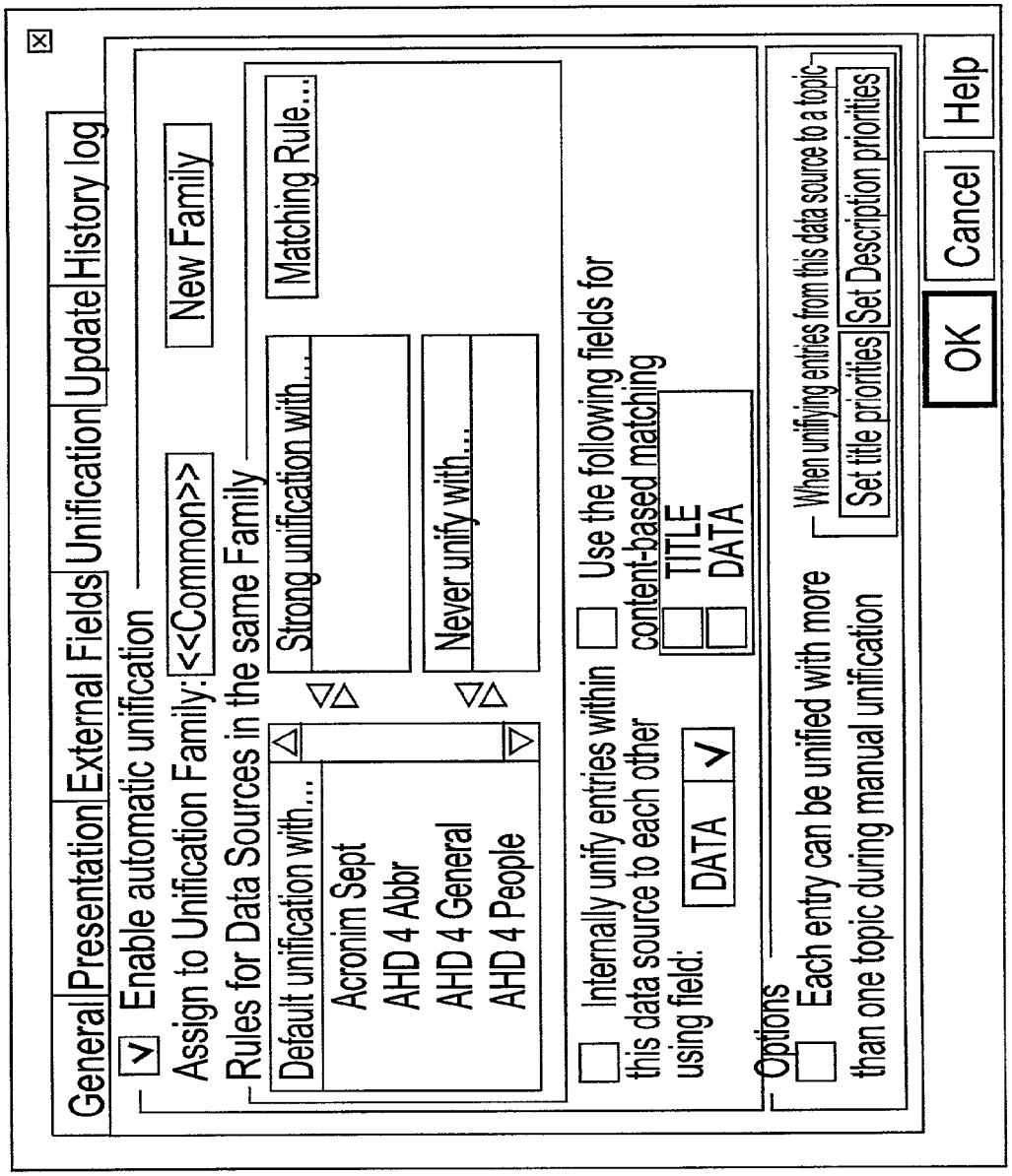

The unification tab, FIG. 43, is accessed during integration by pressing the Advanced button, and after integration by right-clicking on the data source in the Topic Builder main window and choosing Properties.

To perform advanced unification:

In the Unification tab, FIG. 43, do the following:

Enable automatic unification

Choose the unification family

Set unification rules

Set internal unification

Enable multi-topic unification

Adjust the priority for titles and descriptions

Some of these settings are optional. If you are currently integrating the data source, continue with the integration procedure. Unification will be done during integration.

If you are unifying after integration, press OK to close the Properties window. When the window pops-up asking if you want to run a unification session, press OK.

When the Topic Builder is done unifying, it indicates how many entries it has unified. If it is not sure whether to unify certain entries, it leaves the entries as their own topics and marks them for manual unification.

If you have unified a data source and wish to start over, right-click on the data source and choose De-unify Data Source.

Reference is now made to FIG. 66.

Step 2840: Enable Automatic Unification

The first step in advanced unification is to enable unification by checking the option.

Step 2841: Choose the Unification Family

Data sources are organized into families, such as People, Places, or Things. Data sources will only unify with other data sources in the same family. This helps avoid obviously false unifications, such as between a person (Sarah Widget), and an appliance (Super Widget Holder).

If you wish the data source to be able to unify with all data sources, choose the <<COMMON>> family. To add a new family, press New Family and type the name of a new family.

It is important to choose the family before setting the unification rules. Unification ignores the permissions set in the Security Manager. The Topic Builder unifies to any qualified data source, whether or not the Topic Builder user has read access. Default settings for this data source are used.

Manual unification ignores the Unification Family membership. The Topic Builder user can manually unify any data entries from any data sources as explained later.

Step 2842: Set Unification Rules

Figure 44:
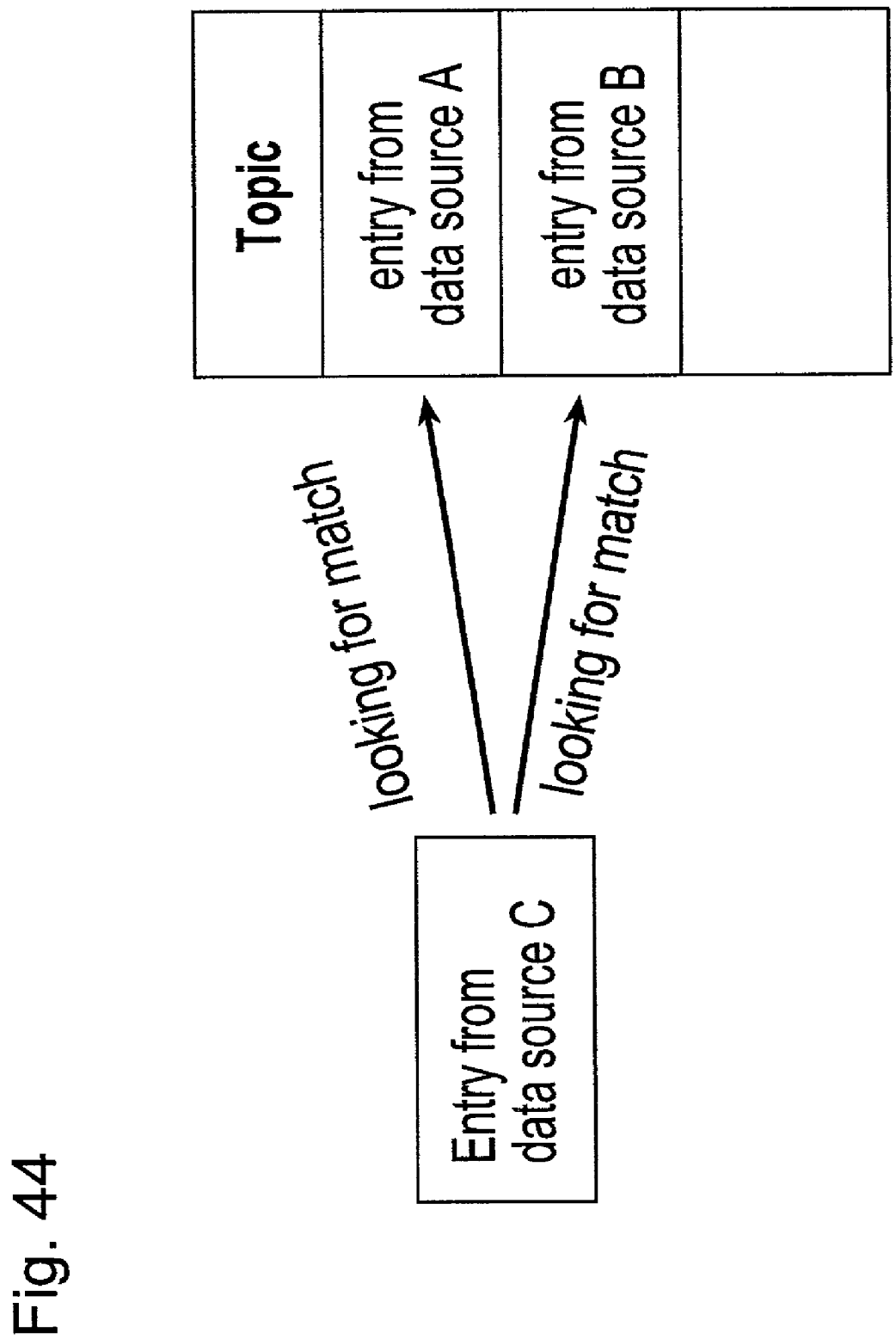

During unification, the Topic Builder looks for matches between entries in the current data source and entries in existing topics. When a close match is found, the entry from the new data source is unified into the topic as shown in FIG. 44.

You can now choose to what degree entries from specific data sources will match each other:

Strong Unification—Encourage unification with these data sources. Priority is given to unifying with a topic that includes a data source entry marked for strong unification.

Never Unify—Disallow unification with these data sources. If a topic already includes an entry from a particular data source marked to never unify, an entry from the new data source will never be unified with it.

The left side of the window in FIG. 43 lists the data sources within the unification family. Unification with these data sources will be done in accordance with normal unification rules. To encourage or disallow unification with a specific data source, select it and then click an arrow to move it into the appropriate box on the right side of the window.

Customizing a Match

For data sources that you have set for strong unification, you can direct the Topic Builder to look at specific fields within the data sources, to help it find a good match. This is called customizing a match. If you do not customize a match, the Topic Builder by default uses the data source's title to find matches.

To customize a match:

Click on a data source in the strong unification box and press the Matching Rule button. The Customized Matching Rule window opens (as shown in FIG. 45).

The left side of the window shows the fields from the data source you are currently unifying, and from the data source you wish to unify it with. Select a field from each data source, and press the arrows to copy them to the string fields on the right side of the window.

Sometimes you may not have a single field in each data source that will match exactly. For example, the existing data source may have the field [Name] containing entries like Jefferson, Thomas and the new data source will have two fields: [FirstName] containing entries like Thomas and [LastName] containing entries like Jefferson. In this case build the string fields to show the Topic Builder how to match the fields exactly. In this example you would enter: [LastName], [FirstName].

Sometimes you will need to allow or disallow variations in the field content. For example, if the data source is a glossary of acronyms you should disallow Single/Plural variations so that the word LIUS is not misidentified as a plural of the name Liu and unified with that topic.

To determine which variations are allowed in field content, check the options at the bottom of the window. Some options are interdependent, so their availability depends on which other options are checked.

Step 2843: Set Internal Unification

Choose whether to allow entries within the data source to unify with each other, and specify the field by which they should be grouped. If Internal Unification is selected, data entries that internally unify to the same topic will appear together as a list on a single tab for that topic.

To understand this option, consider the example of a news articles data source, where each article has a keyword field containing a word that classifies the article such as Finance or Law.

Two article entries have been assigned the keyword Finance, and you want them to appear together in the topic Finance. In this case, you would enable internal unification so the article entries can unify within the data source, and you would choose the keyword field to show how they should unify.

Step 2844: Set Unification Options

If your data source includes entries that are relevant to more than one topic, enable this option that will allow you to unify one data entry to more than one topic. This will allow you to manually unify the entries to multiple topics.

Step 2845: Determine Default Title and Description

Each data entry is assigned a title and description during integration. When entries are unified, the title/description of one entry is used for the topic, and the title/description of the other entries are ignored. For example, there must be a single title chosen for a topic containing the entries Bill Clinton and Clinton William. Choose in FIG. 43 whether the title/description of entries from this data source will be given priority over the data sources already integrated.

Manual Unification

Manual unification is non-automatic and is best reserved until all automatic unification is done. Unlike the other unification methods, manual unification is done per topic and not per data source. First you find the topics that need manual unification, and then you manually unify or de-unify them.

Finding Manual Unification Topics

The first step in manual unification is to find the topics you want. You may already know of specific topics whose unification you would like to adjust. You may also wish to adjust the unification of topics that have entries marked for manual unification, or topics that have only one entry, or topics with entries from specific data sources.

The Find window has many useful fields that can help you locate topics with the characteristics you want. This will be discussed further later. Another method is to right click on a data source and choose Show Unresolved Topics to see the entries that were marked for manual unification.

Entries marked for manual unification will have the hand symbol which will disappear upon unification. You can also remove the symbol by right-clicking the entry and choosing Unmark Entry.

Once the topics you want to work with appear in the main Topic Builder window, you can manually unify them by combining whole topics, or by moving entries from one topic to another.

Manually Unifying Whole Topics

When you manually unify two whole topics, all of the entries in both topics combine into a single topic. To unify whole topics:
- In the Topic Builder main window, right-click on a topic you want to unify and choose Unify to Topic. The window in FIG. 47 appears.
- A suggested list of related topics appears in the top part of the window. Look for the topic you wish to unify with. Click on a topic to see its preview in the bottom part of the window.
- If you don't see the topic you want to unify with, use the Find box to search for it, just as you would in the Topic Builder main window.
- When you find the topic to unify with, select the topic and press Unify. The two topics unify into one topic.

Figure 47:
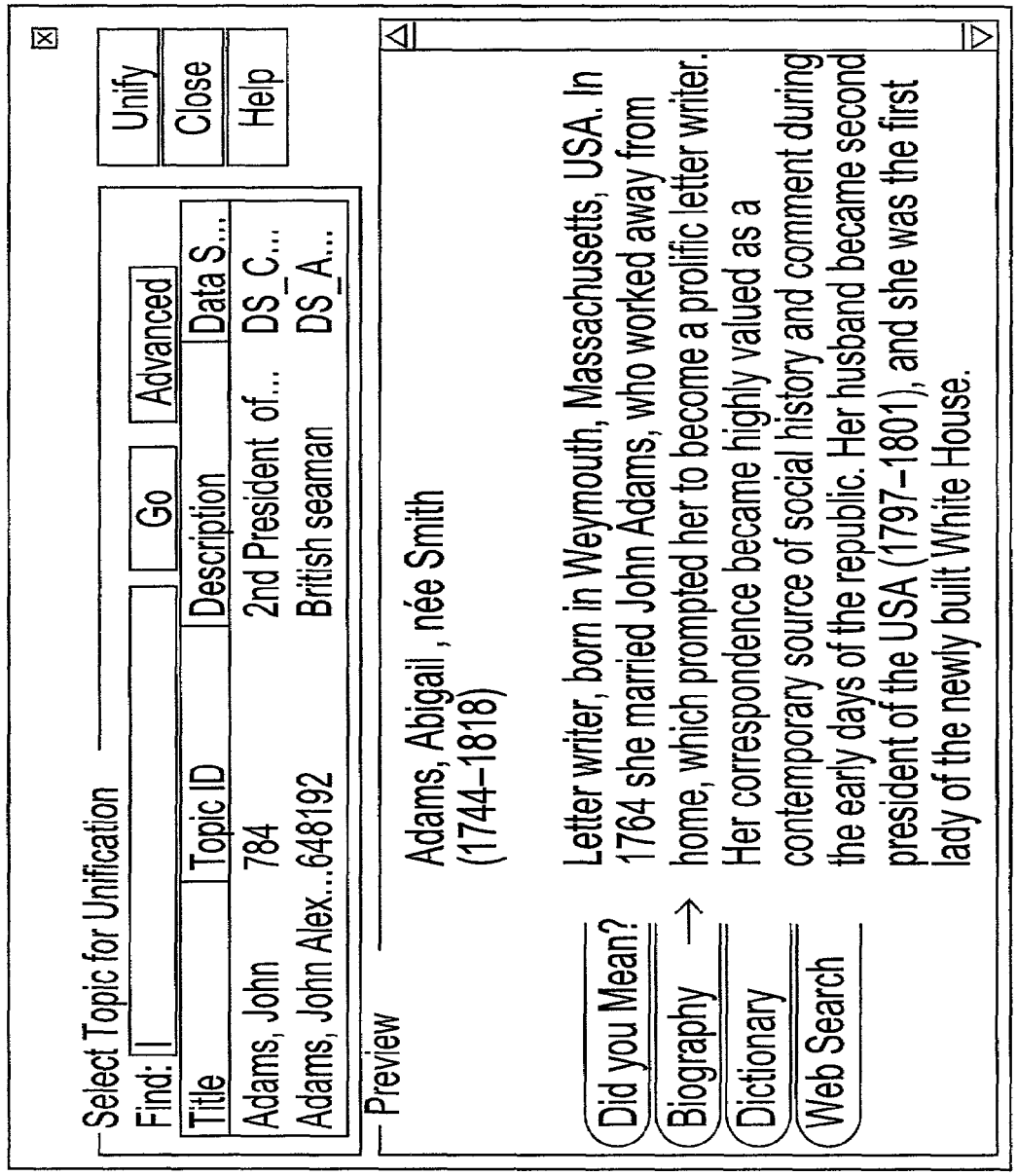

The window in FIG. 47 immediately brings up the next topic that was listed in the Topic Builder main window and shows a suggested list of related topics. Using the same procedure, find the topic to unify with and press Unify. In this way you can quickly go through all the topics listed in the Topic Builder main window.

Manually Unifying Entries

When you manually unify an entry, a specific data source entry moves from one topic to another. To unify an entry:
- In the Topic Builder main window, click a topic to open its preview in the bottom of the window, and go to the Contents tab.
- The Data Sources box shows the data sources from which the topic's entries are drawn. Each listed data source represents an entry in the topic.
- Select the data source whose entry you want to move to another topic, and press the Unify button. The window in FIG. 47 appears.
- A suggested list of related topics appears in the top part of the window. Look for the topic you wish to move the entry to. Click on a topic to see its preview in the bottom part of the window.
- If you do not see the topic you want, use the Find box to search for it, just as you would in the Topic Builder main window.
- When you find the topic you want, select it and press Unify. The entry is moved to the topic. If you enabled this data source to unify its entries to more than one topic, then the entry is copied to the topic and also remains as its own topic.

Quick Unification

Figure 46:
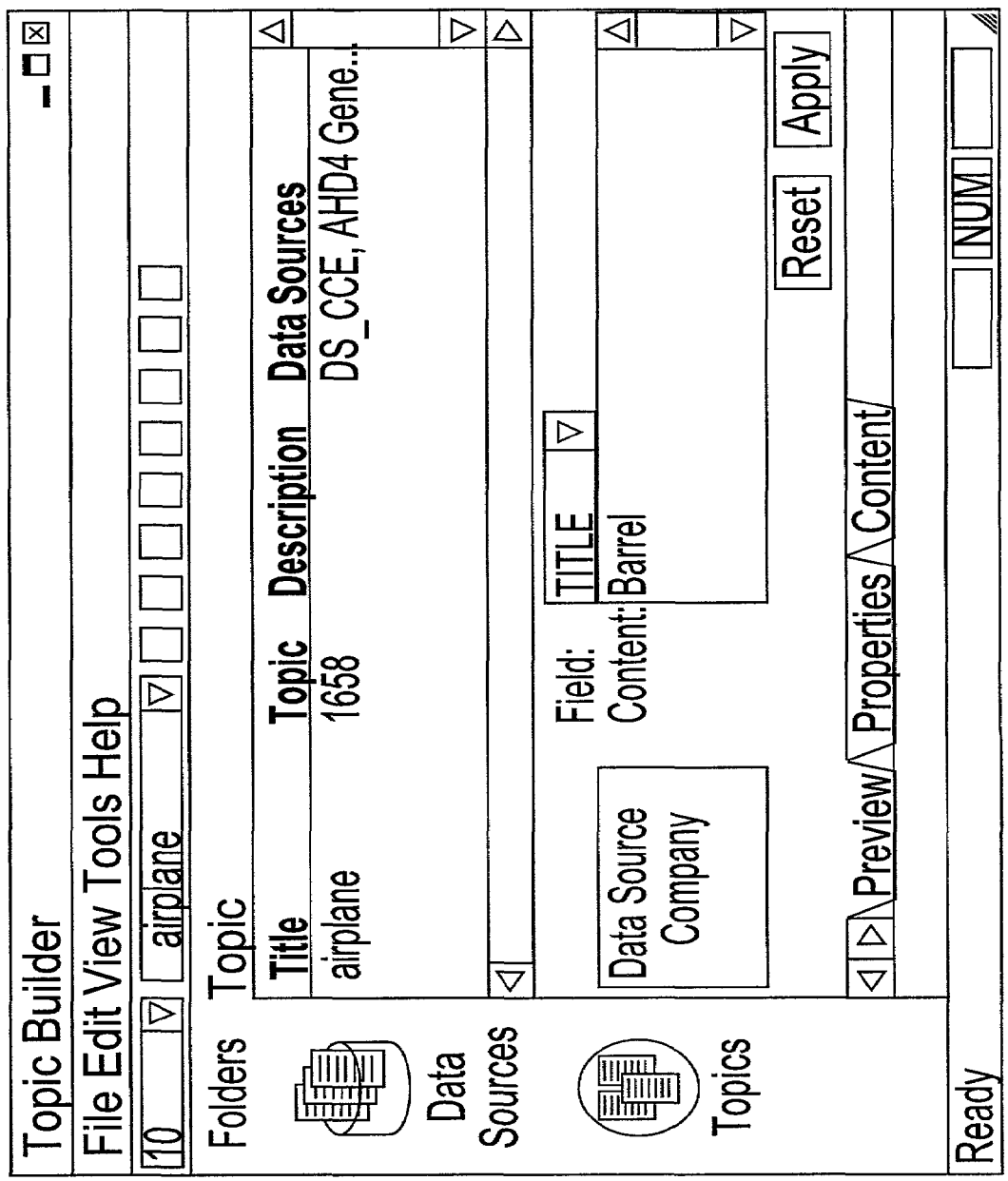

You can also manually unify an entry by dragging and dropping the entry from the content tab on the bottom part of FIG. 46 to onto a topic listed in the top part of the figure. When you do this, the entry is unified with the topic.

Manually De-Unifying Entries

If an entry has been incorrectly unified to a topic, you can de-unify the entry to its own topic, or you can delete the entry entirely.
- To de-unify an entry, select the entry's data source from the content tab in FIG. 46 and press the de-unify button.
- To delete an entry, select the entry's data source and press the delete button.

Relating Data Sources

Overview of Data Source Relations

You can relate data sources to each other in a similar way that database tables can be related to each other. This causes some of the data in the child table to behave as if it resides in the parent table. The data from the child table will appear in the Answer Window along with data from the parent table.

Consider the example of FIG. 64. Each entry in the Department table is its own topic (Finance dept, Marketing dept, etc), and we want each topic to include a list of employees in the department. But the Department table does not contain a list of employees in each department, rather it contains the DepID number for each department.

But the Employee table does contain a list of all employees, including their names and department IDs (in the DepartID field). So we can relate these two data sources by the indicated fields, and produce topics that might appear as shown in FIG. 64.

In this case, we have chosen the word Employees to introduce the employee list and we have chosen to list the employees with the fields FirstName and LastName.

Several child data sources can be related to one parent data source. The order in which the data from the child data appears is determined by the presentation template.

If someone has permission to read the parent data source but not the child data source, in the Answer Window and in Topic Builder he will see the data from the parent data source, but not the data from the child data source.

Creating Data Source Relations

Figure 48:
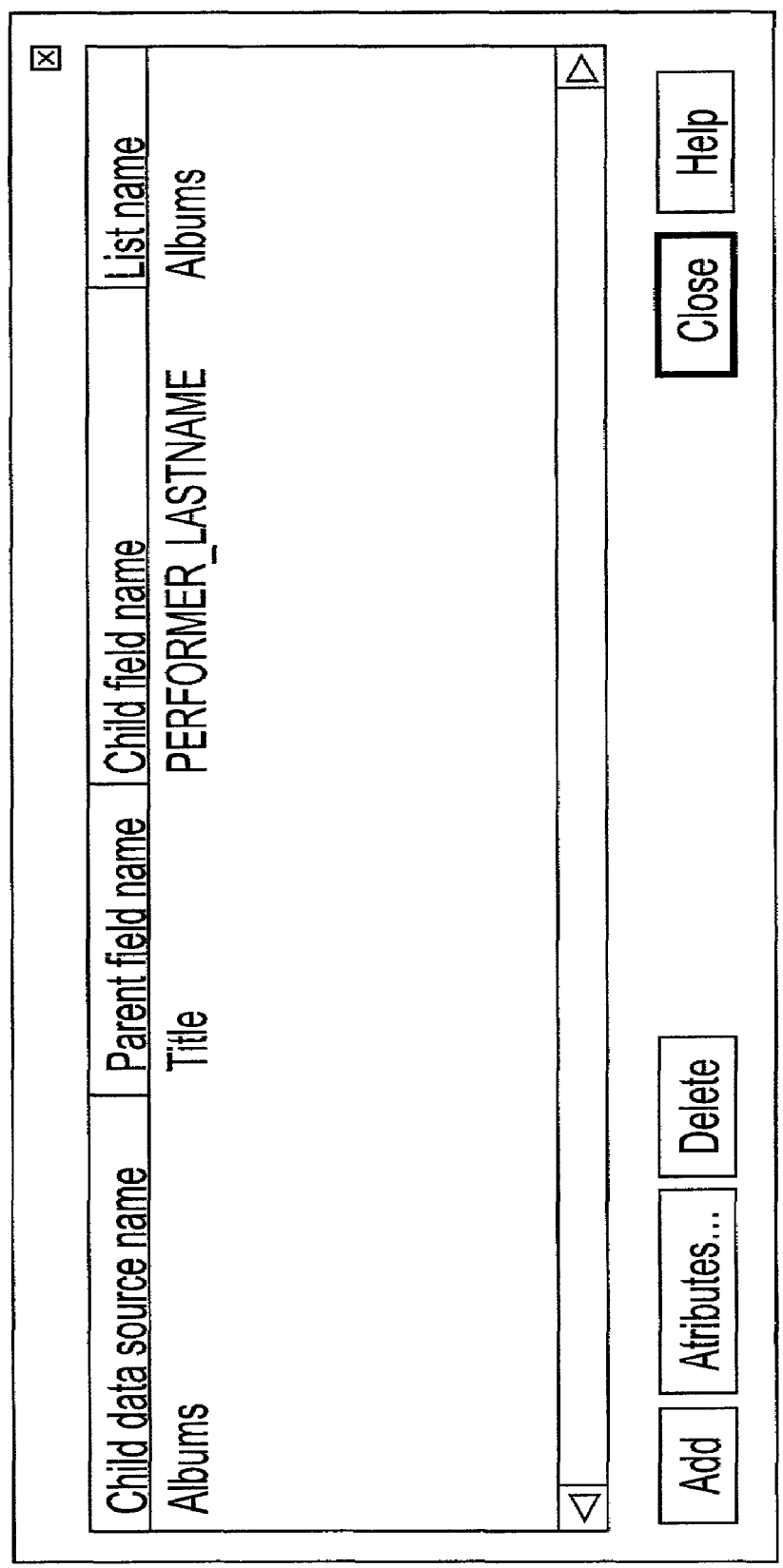
Figure 49:
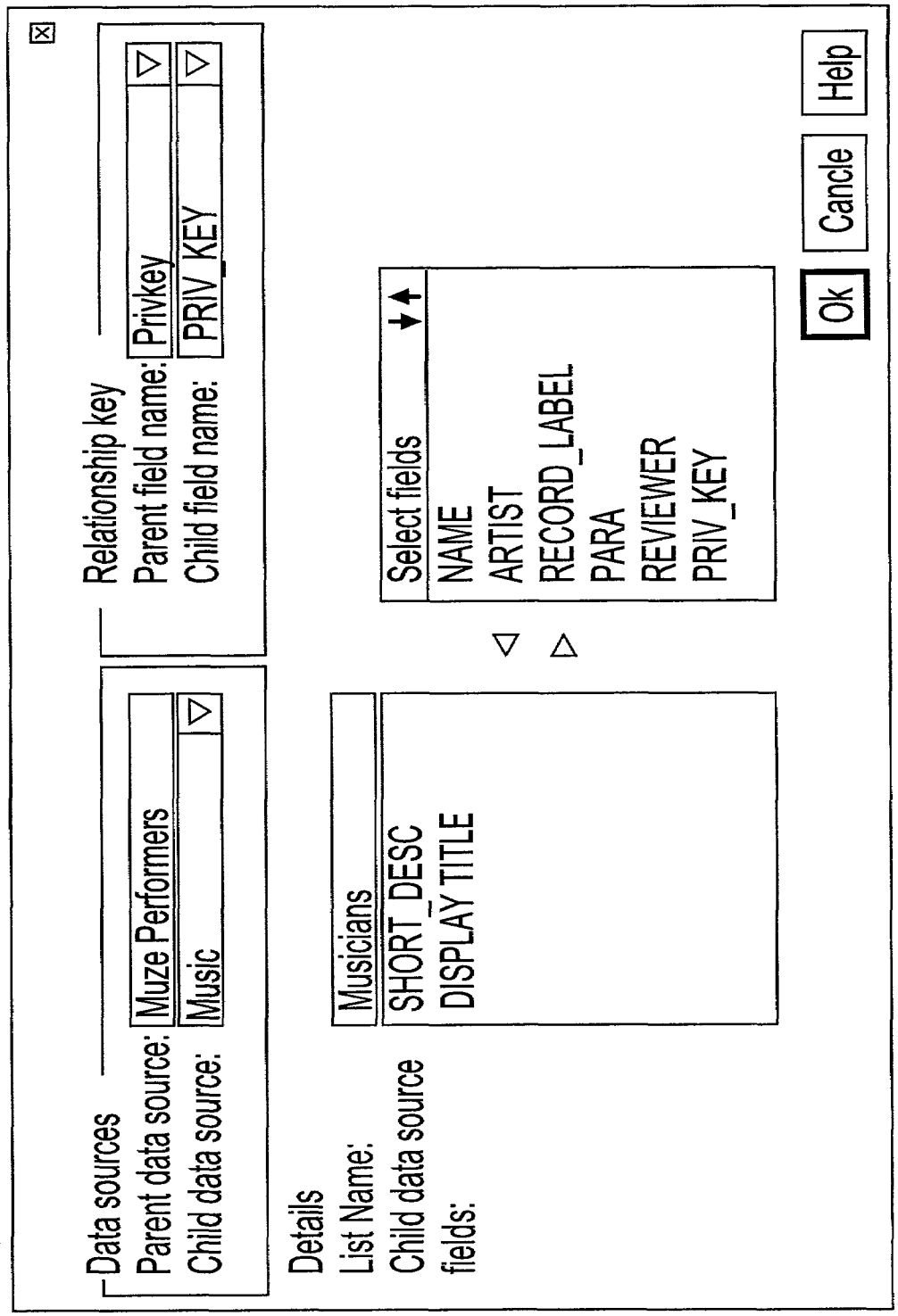
Figure 50:
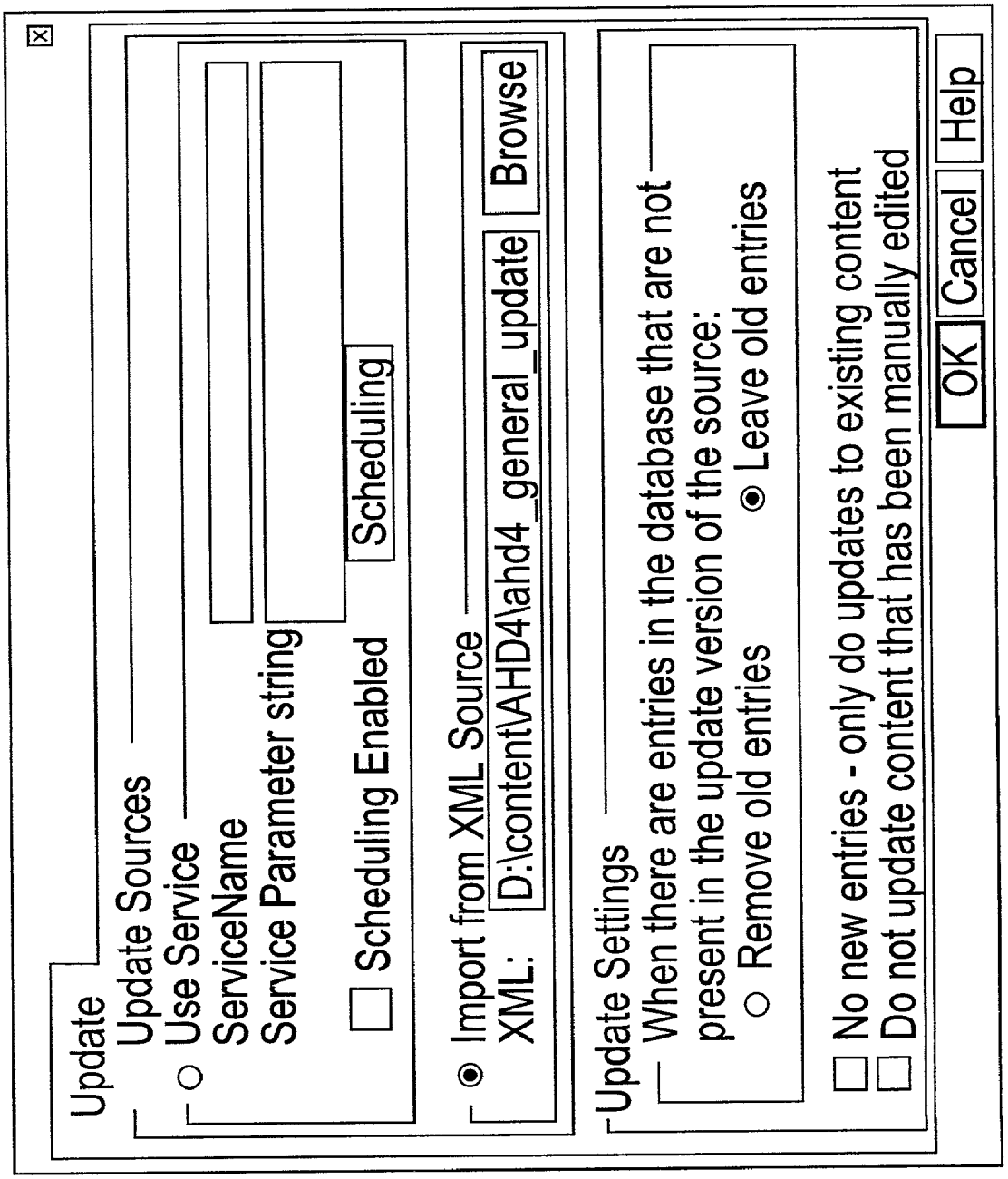
Figure 52:
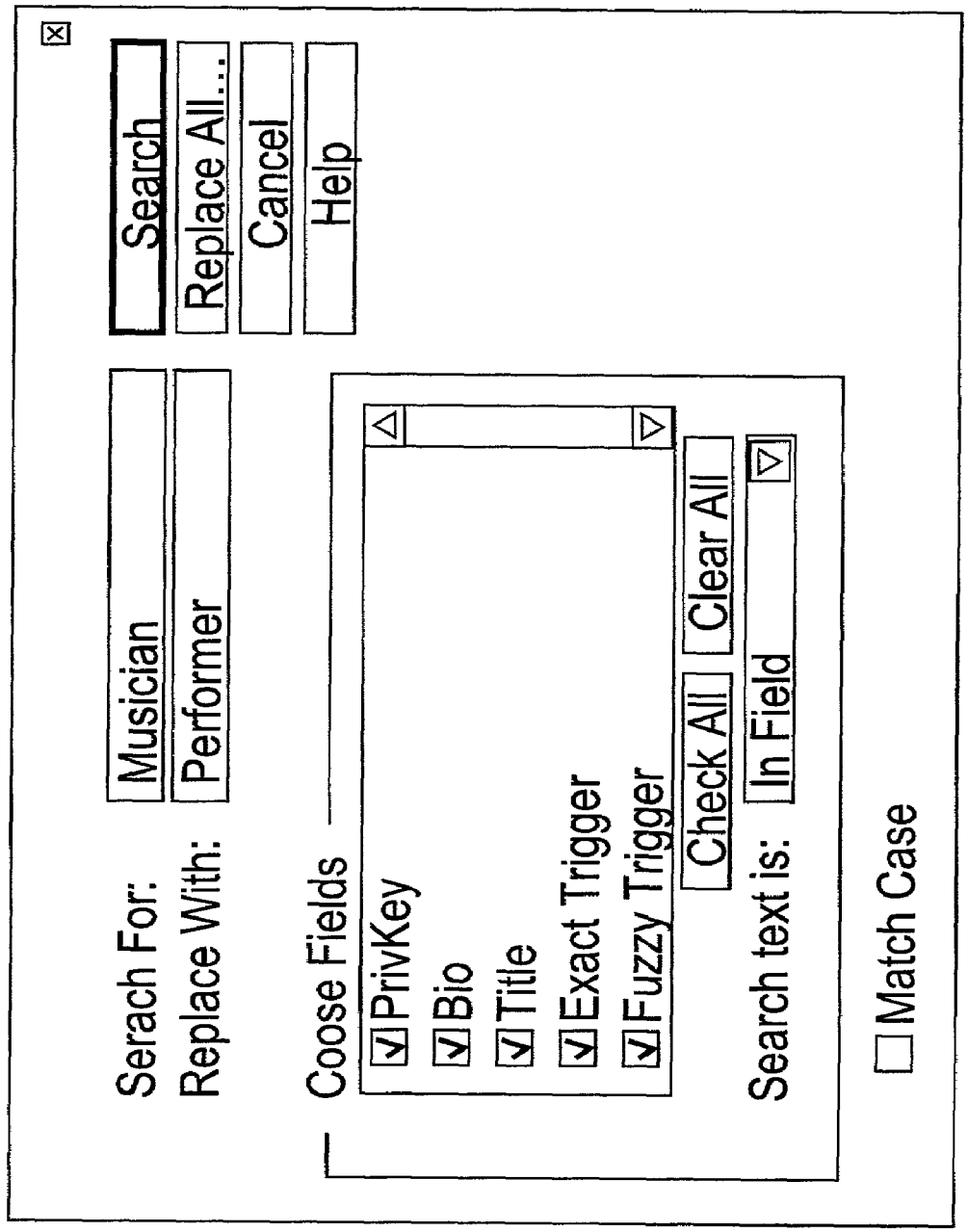

To relate two data sources:
- In the Topic Builder main window, right-click on the data source that you wish to be the parent, and choose Child Data Sources. FIG. 48 appears.
- The window lists the child data sources that have been related to this parent data source. For each child data source it shows the names of the fields that have been related. It also shows the list name which is the text that introduces the related data in the Answer Window.
- To relate another child data source, press Add. Then FIG. 49 appears.
- In the top part of the window, select the data source to be the child, and choose the field in each data source that make up the relation.
  - In the bottom section of the window, type in the list name and select the data source fields to appear in the list. You can adjust the order in which the selected fields will appear by clicking a field and then pressing the up and down arrow buttons.
  - When you are done, press OK. The new child data source appears in thez Child Data Source window.

Editing Data Source Relations

To edit a data source relation, click on the relation in the Child Data Source window and press Attributes. You can edit the list name and selected fields exactly as if you were adding a new relation.

To delete a data source relation, click on the relation in the Child Data Source window and press Delete.

Viewing Data Source Parents

The Child Data Sources window described above shows the children of the selected data source. To view the parents of a particular data source, right-click on the data source and choose Parent Data Sources.

As with the Child Data Source window, use the Attributes button to edit the relations, and use the Delete button to delete them.

Modifying Data Source Contents

Updating a Data Source

This section explains how to update a data source. You should update a data source when a new version of the original data source becomes available. Even if a data source has a data template (ADT), it should still be updated periodically to keep the topic list current.

This section first explains how to run an update. Then it presents the Update Properties window and explains how to fill out the parts of the windows.

Running an Update

Updates can be run automatically or manually. The parameters used to setup automatic updates are found in the Update Properties window (described below).

To run an update manually, right-click on a data source in the Topic Builder main window and choose Update Data Source.

Press Update Now to update the data source. If this button is disabled, this means that some essential update parameters have not been filled in. To fill in these parameters, access the Update Properties window by pressing Properties.

Update Properties Window

The Update Properties window contains the update parameters. Whenever an automatic or manual update takes place, it works according to these parameters.

To fill out the update parameters:
Choose whether to update using a service, or to update from a file. You can only use a service if your data source has a data template, which will be discussed later.
If you can use a service, you can also use automatic scheduling.
If you are updating from a file, enter the file name.
Specify the Update Settings and then press OK.

Each of these steps is detailed in the following sections.

Step 1: Update Using a Service

If your system setup supports it, you can update using a service.

To update using a service:
Enable the Use Service option in FIG. 50.
Enter the Service Name and Service Parameter String, as provided by your Support Staff or IT Department. For more information about services, refer to the Setting Up External Data Retrieval document.
If you wish to schedule automatic periodic updates, check the Scheduling enabled option and then press Scheduling.

Step 2: Setting Up Scheduling

If you are updating from a service, you can use automatic scheduling. When you press the Scheduling button, the Scheduling Properties window opens, as shown in FIG. 51.

To setup scheduling:
In the scheduling window, FIG. 51, choose which days to update. You can choose by checking the days of the week, or by choosing the day in the month.
Choose the time of day for the update to run. If you choose to have the update run more than once a day, indicate the number of times per day.
Optionally, enter the email address of someone who should be notified if the update does not run for some reason. Press Test to send a test email to the chosen address.

When you are done, press OK. The data source will be updated at the scheduled times. If an update fails, an error notification email will be sent.

Step 3: Enter XML Source File Name

To update from a file:
Enable the Import from XML Source option in FIG. 51.
Type in the path and name of the file, or press Browse to find the file.

Step 4: Set Update Settings

The last step in setting update parameters is configuring the update settings.

These settings determine what happens when discrepancies are found between existing entries and updated entries:
Determine what will happen if some existing data entries do not appear in the updated data source. If you want them to be deleted, choose Remove old entries. If want them to remain, choose Leave old entries.
If you only want current entries to be updated, but you don't want new entries to be added, check the No new entries—only do updates to existing content option.
If you do not want entries that have been manually edited to be updated so that the manual editing will not be lost, check the Do not update content that has been manually edited option.

Finding and Editing Data Source Entries

You can look for a search phrase within the entries of a data source, and you can perform a search and replace function across an entire data source. To access the Search and Replace window, select a data source in the Topic Builder main window, open the Edit menu and choose Find. Then the window in FIG. 52 appears.

In addition to the standard search and replace fields and buttons, the Search and Replace window allows you to specify which fields to search, and how the search text should be positioned in the field:
In field—Finds the search text anywhere in the field. This is the standard method of searching.
Start of field—Finds the search text only if it appears at the start of the field.
Entire field—Finds the search text only if it is the only text in the field.

Adding Entries to a Data Source

Figure 53:
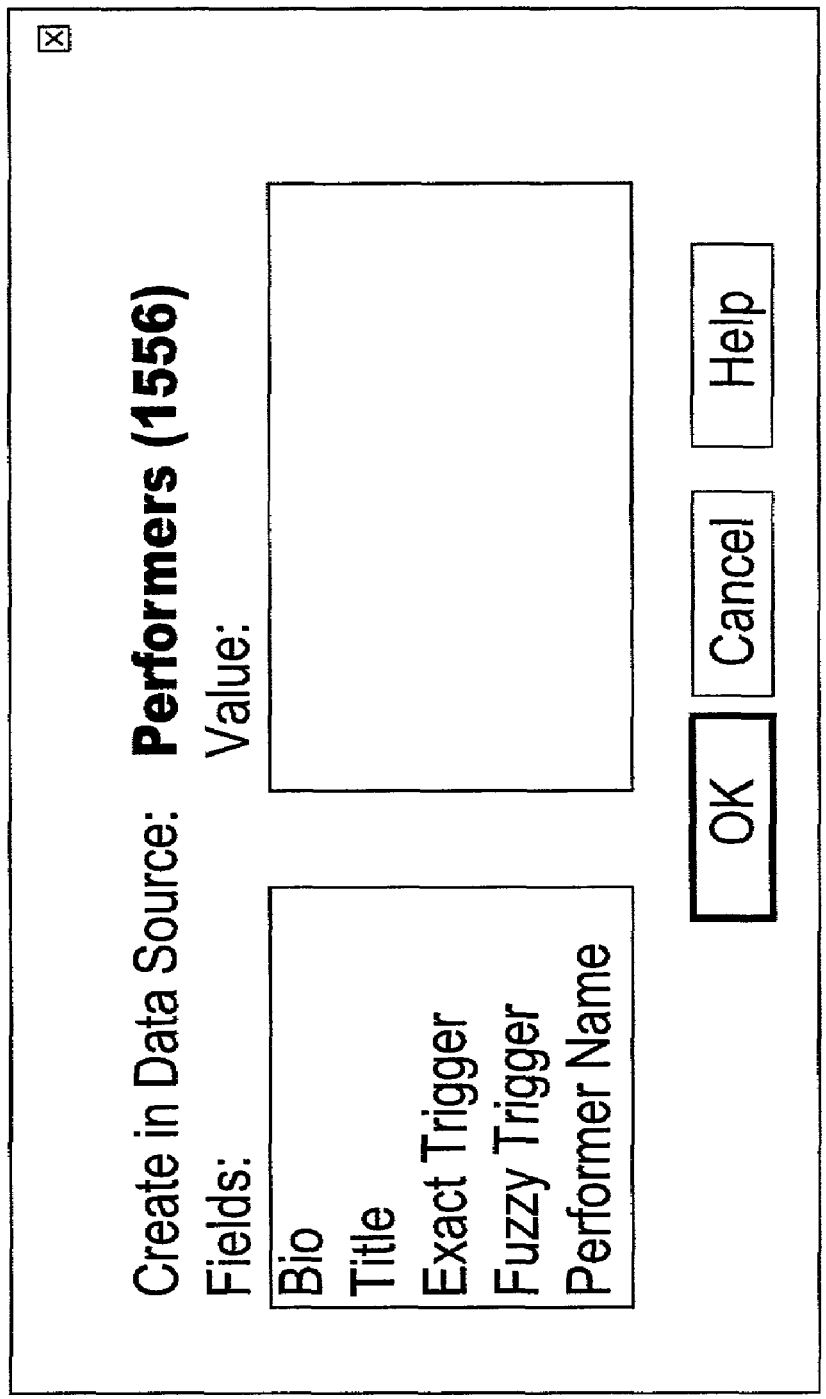

You can manually add entries to an existing data source:
In the Topic Builder main window, right-click on a data source and choose Create Data Entry. The New Data Entry window opens, showing the name of the data source at the top of the window as shown in FIG. 53.

Select a data field in the Fields section of the window, and then type its value in the Value section. Repeat this for all data fields.

When you are done, press OK. The new entry is appended to the data source. The entry is automatically unified according to the data source's unification parameters in the properties window.

Deleting and Emptying a Data Source

If a data source is no longer relevant, you can remove it from the Topic Server. There are several ways to do this:

Delete data source—This option removes the data source completely. If the data source is needed later, you will have to integrate it from scratch.

Delete all entries—This option removes all entries from the data source, but leaves the source in place to later update or add entries. All data source properties are preserved.

To delete/empty a data source, right-click on a data source in the Topic Builder main window and choose Delete or Remove All Entries. It may take several minutes to perform the action, depending on the size of the data source.

The Topic Warehouse can be used as a primary information repository for information that does not naturally have another "home". To do so create an empty data source, and then populate it one entry at a time.

Creating an Empty Data Source

Sometimes you may need to add an entry for which you do not have a data source. Consider the example where the employee list is not yet available, but it is important for some employees to be listed immediately. You can create an empty data source and manually add entries. Later, when the data source becomes available, you can update the data source.

Figure 39:
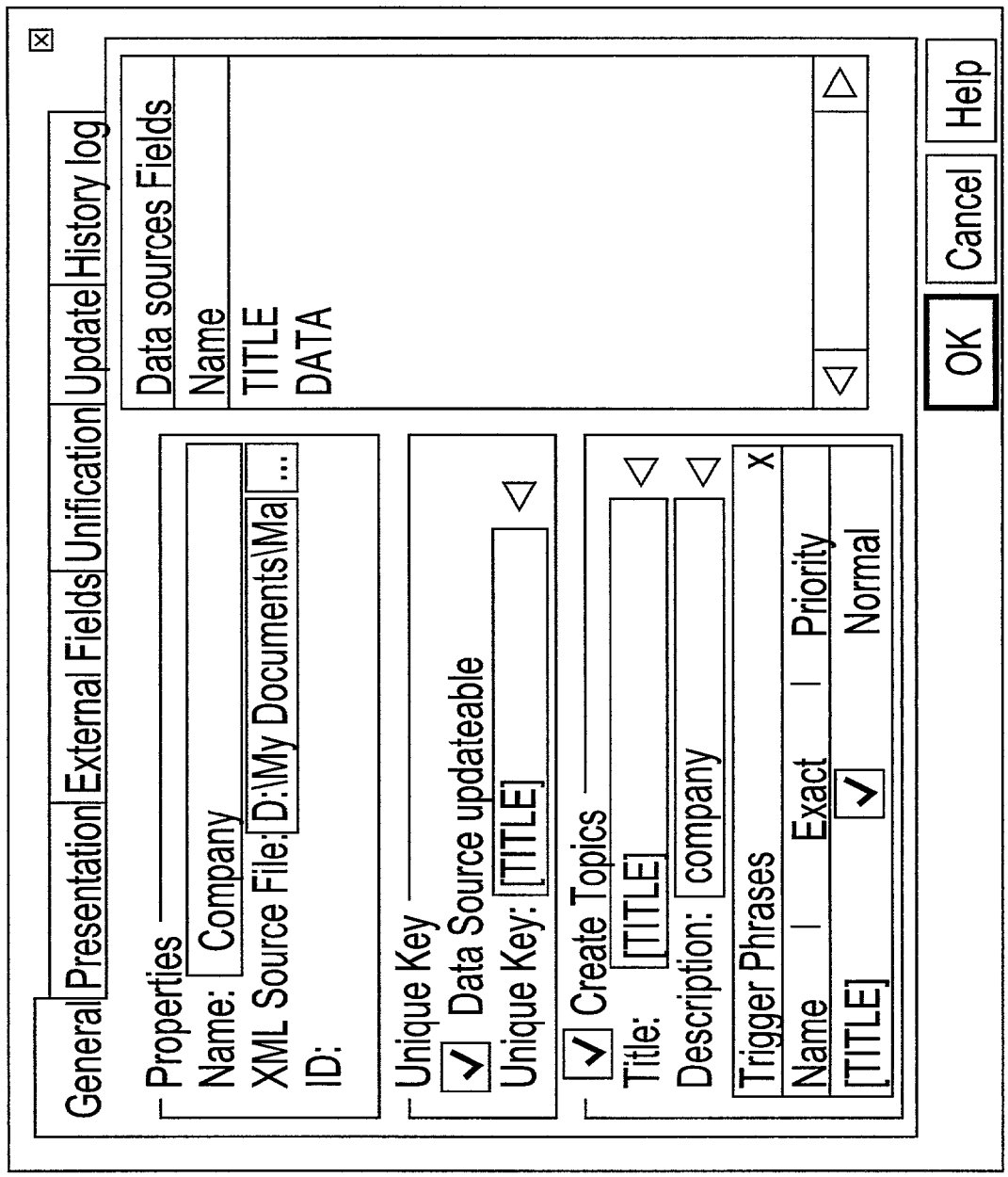

To create an empty data source:

In the Topic Builder main window, right-click on a data source and choose Create empty data source. FIG. 39 appears, but with out any fields listed.

In the Fields section of the window, add data source fields by pressing Add Field button and typing the field name.

Fill out the remaining parameters as you would when integrating a new data source, as discussed above.

When you are done, press OK. The empty data source is created, and it appears in the data source list.

Viewing Data Source Properties

Figure 54:
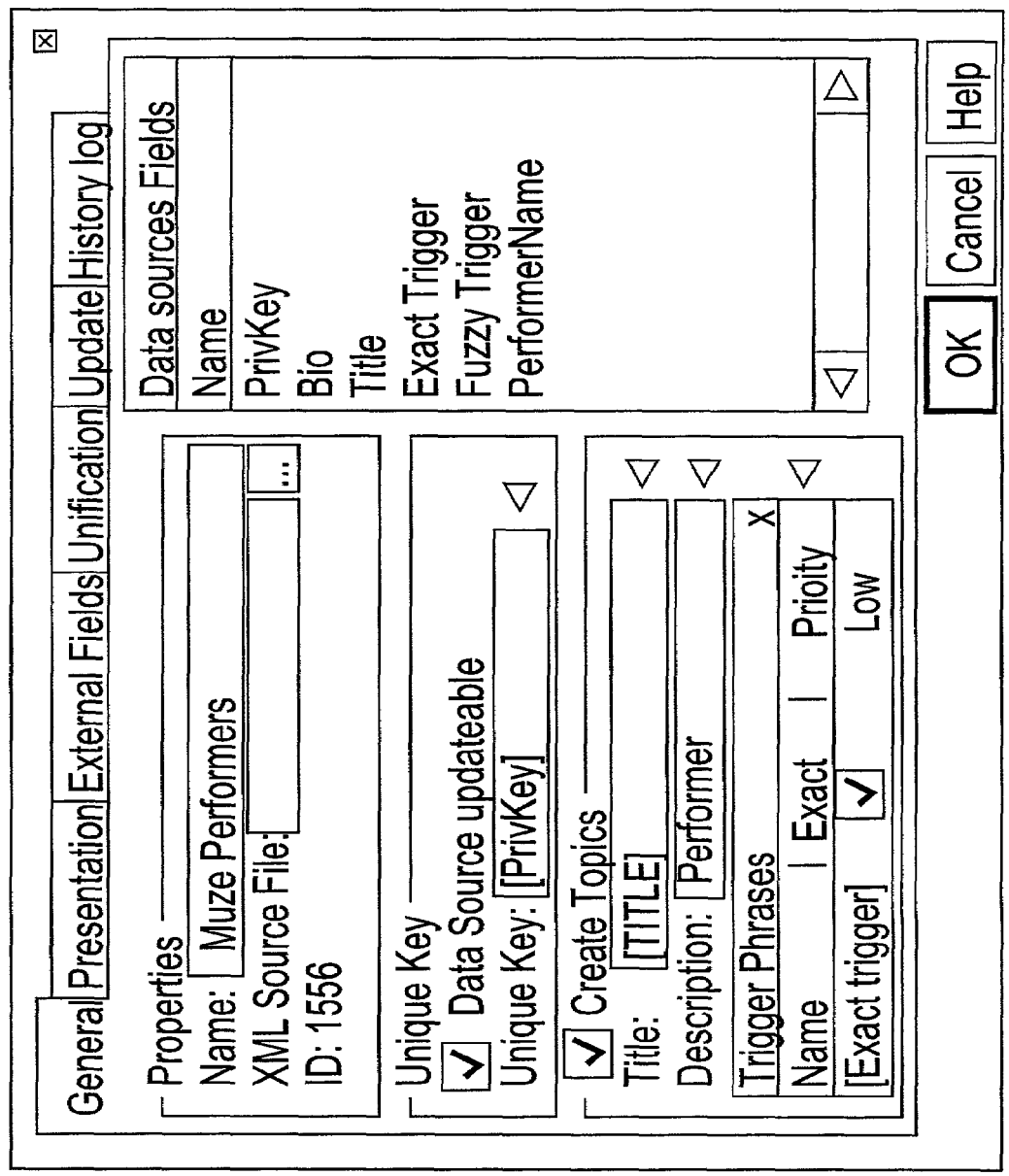

You set data source properties when you integrate the data source. At any time you can view the properties of a data source. Many of the properties may be edited, and the changes affect the data source immediately upon pressing the OK button. To view data source properties, right-click on a data source in the Topic Builder main window and choose Properties. FIG. 54 appears.

Working with Topics

Finding Topics

Figure 55:
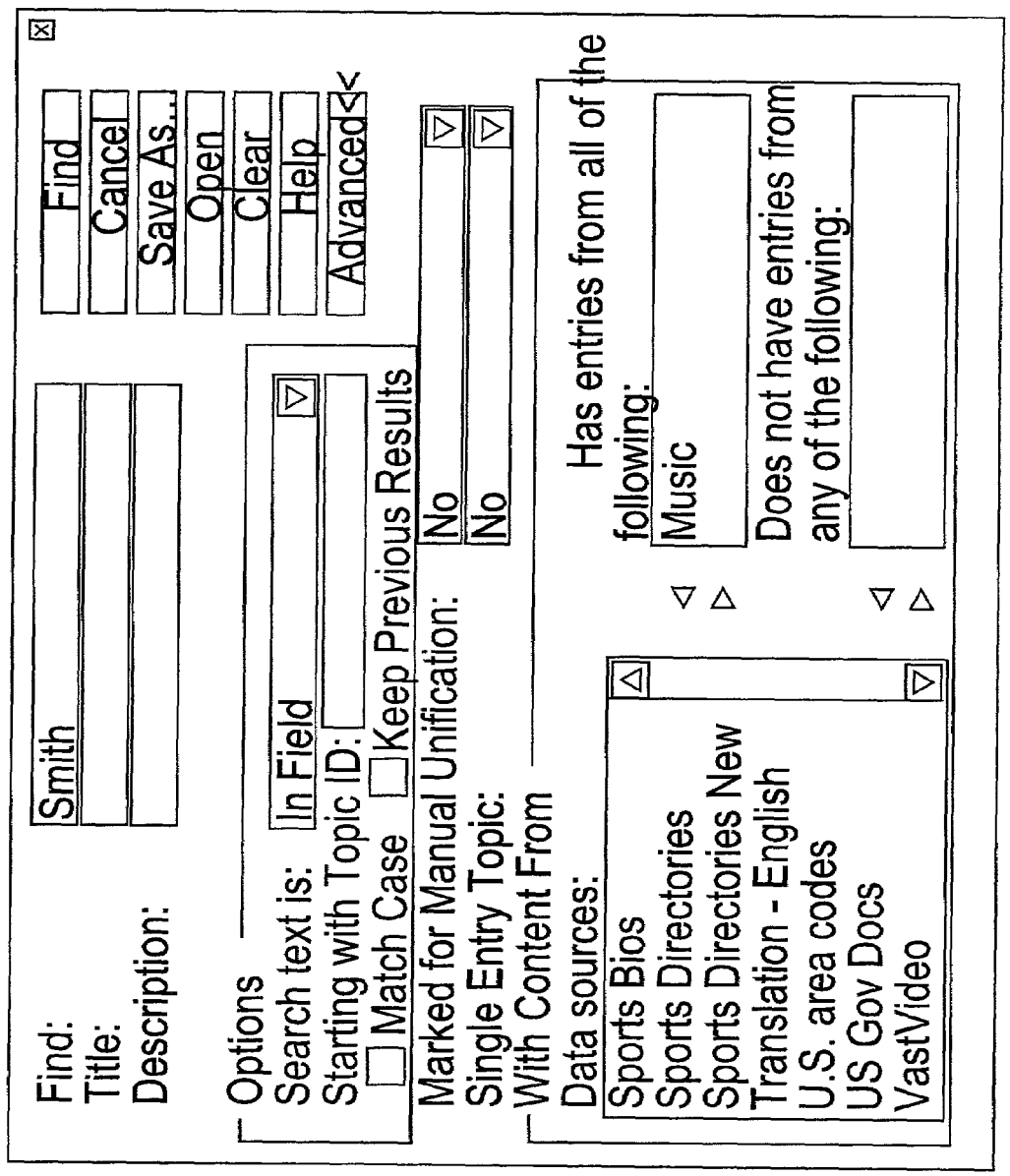

The Topic Builder includes an advanced Find function to help you locate topics. To access the Find Topics window, go to the Topics View of the Topic Builder main window, open the Edit menu and choose Find. FIG. 55 appears.

To find a topic, fill in the parameters and press Find. The matching topics are shown in the Topics view of the Topic Builder main window. To reset the Find window to default values, press Reset.

Find Fields

In the Find window (FIG. 55), the first field locates topics using the same algorithms used by the Find box in the Answer Window and in the Topic Builder main window. The Title and Description fields find topics that match the text in these fields.

The Options allow you to set the following:

Search text is—How the search text should appear in the field:

In field—Finds the search text anywhere in the field. This is the standard method of searching.

Start of field—Finds the search text only if it appears at the start of the field.

Entire field—Finds the search text only if it is the only text in the field.

Starting with Topic ID—What topic ID number the search will begin at.

Topics with IDs lower than this number will not be searched.

Match Case—Whether the search is case sensitive.

Keep Previous Results—Check this option to retain the results of the last search. The old and new results will be shown together.

The bottom section of the window in FIG. 55 is that Advanced Find. Using the advanced options, you can find topics marked for manual unification, and single-entry topics. You can also limit the search to topics with/without entries from specific data sources. These searches are very useful during manual unification.

Saving and Retrieving Searches

You can save searches for later use that you have defined in the Find Topics window, FIG. 55.

To save a search, press Save as. Provide a name and press OK.

To retrieve a search, press Open. Select a search and press OK.

Editing Topic Properties

When data sources are integrated, the Topic Builder automatically creates topics from them or unifies them to existing topics. The default properties of each topic are based on the properties that were set at integration time. At any time you can manually edit the properties of a topic:

In the Topic Builder main window, select the desired topic.

Figure 56:
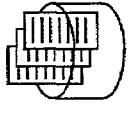
Figure 57:
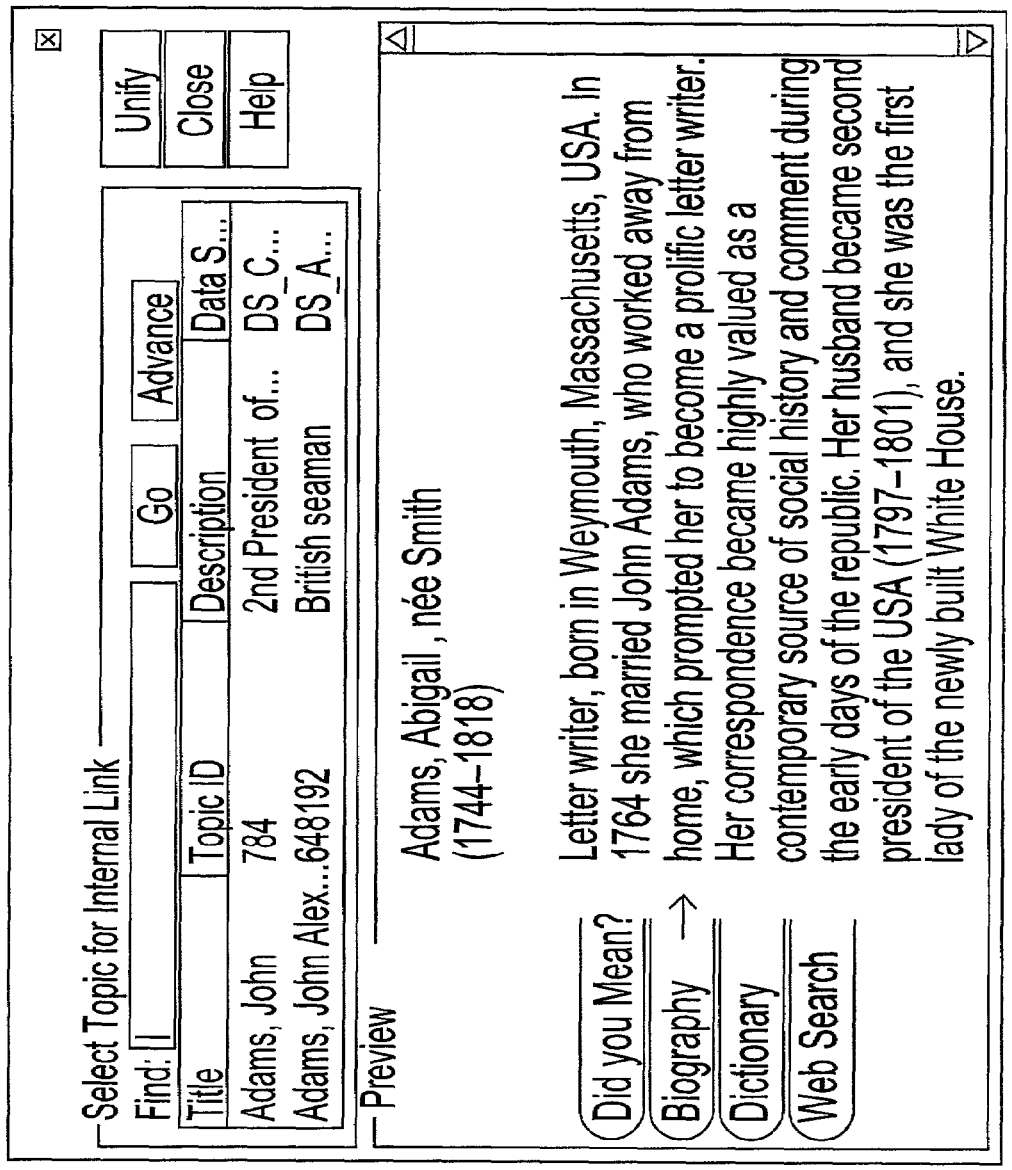
Figure 58:
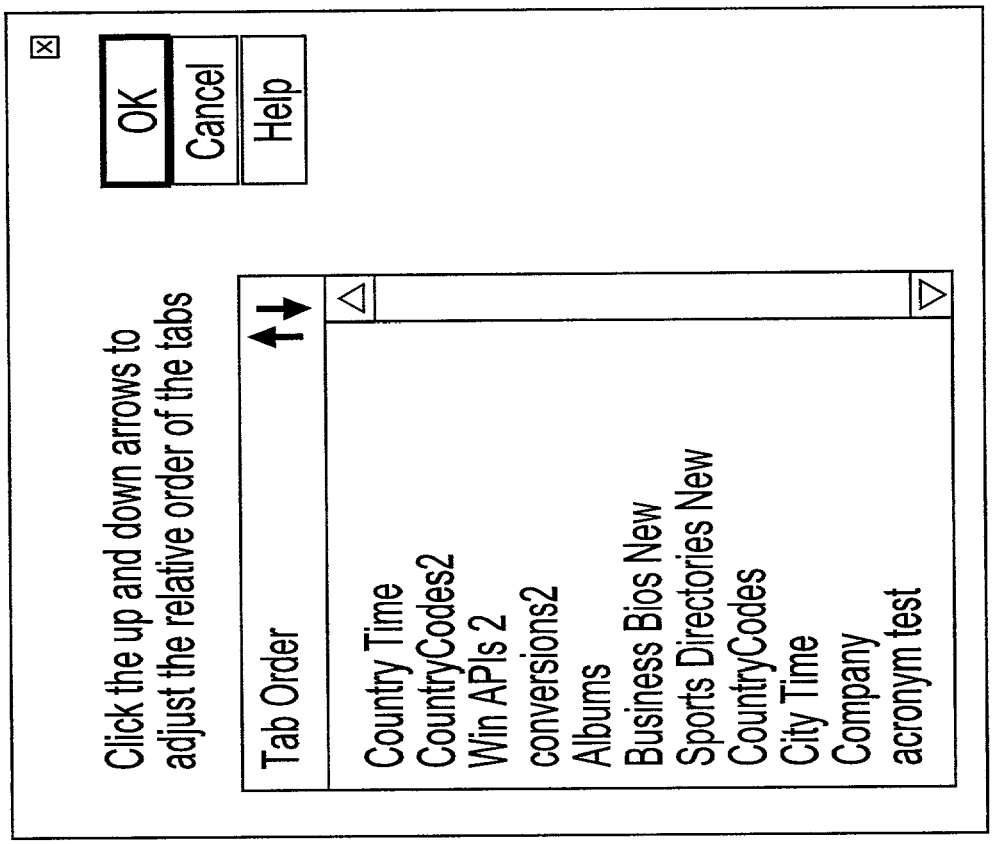
Figure 59:
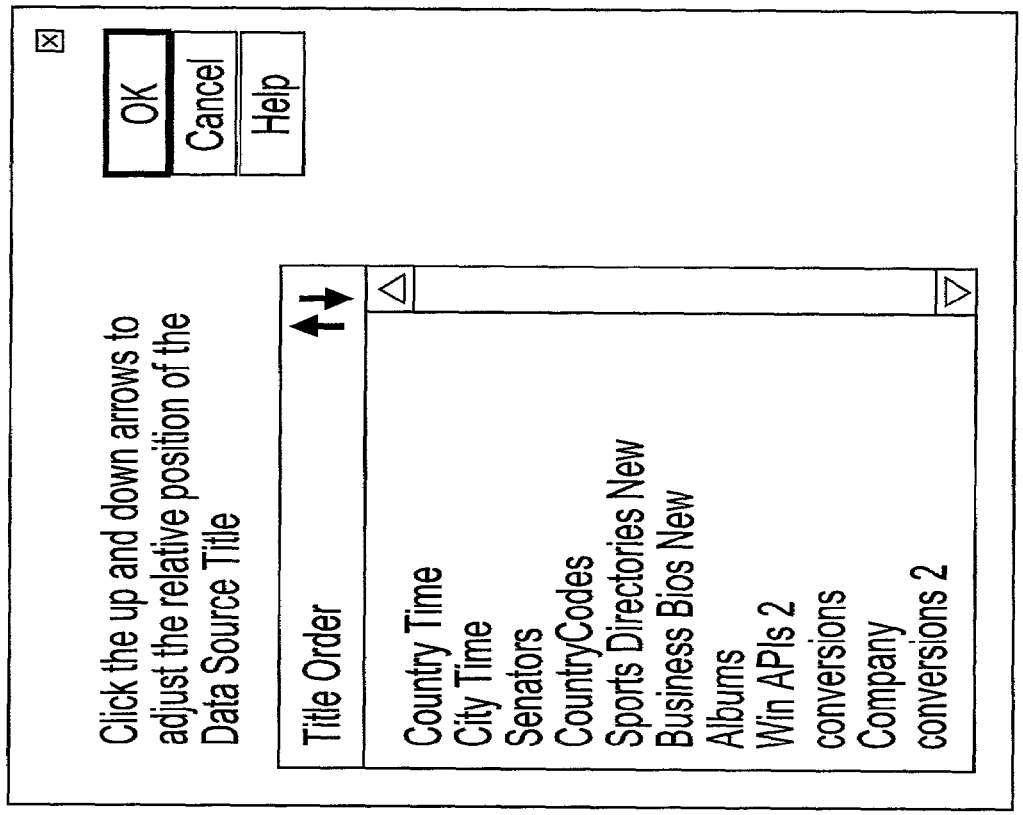
Figure 60:
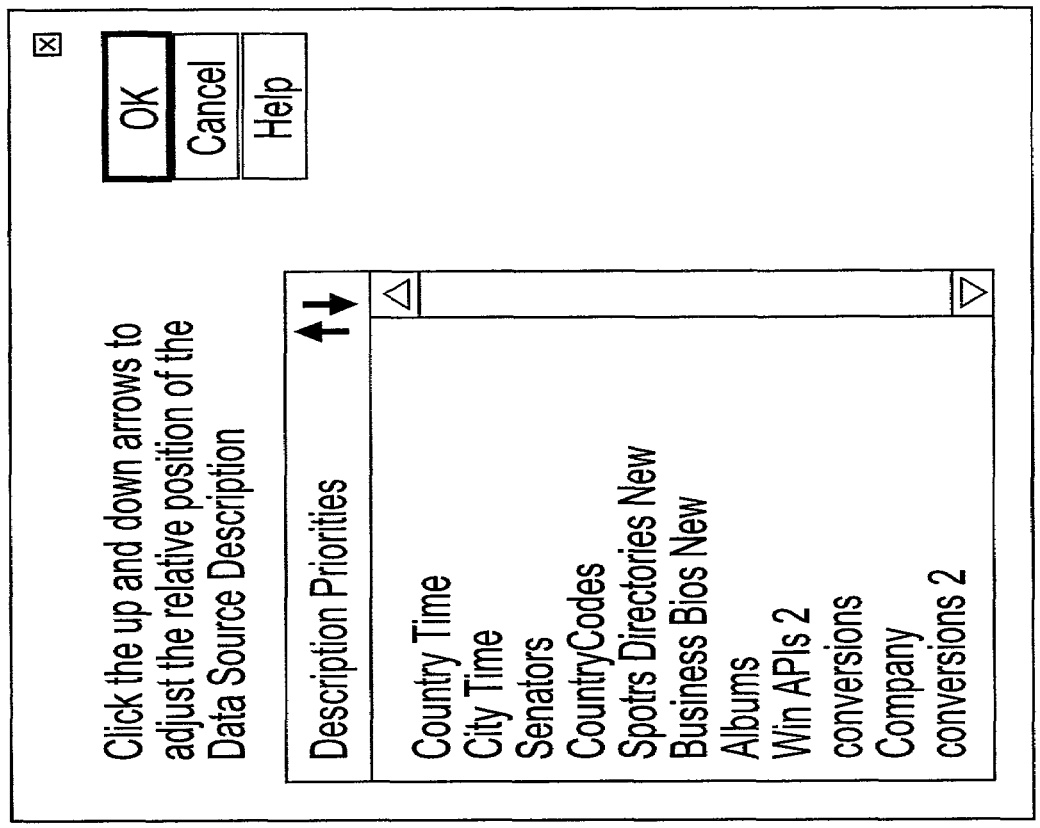
Figure 62:
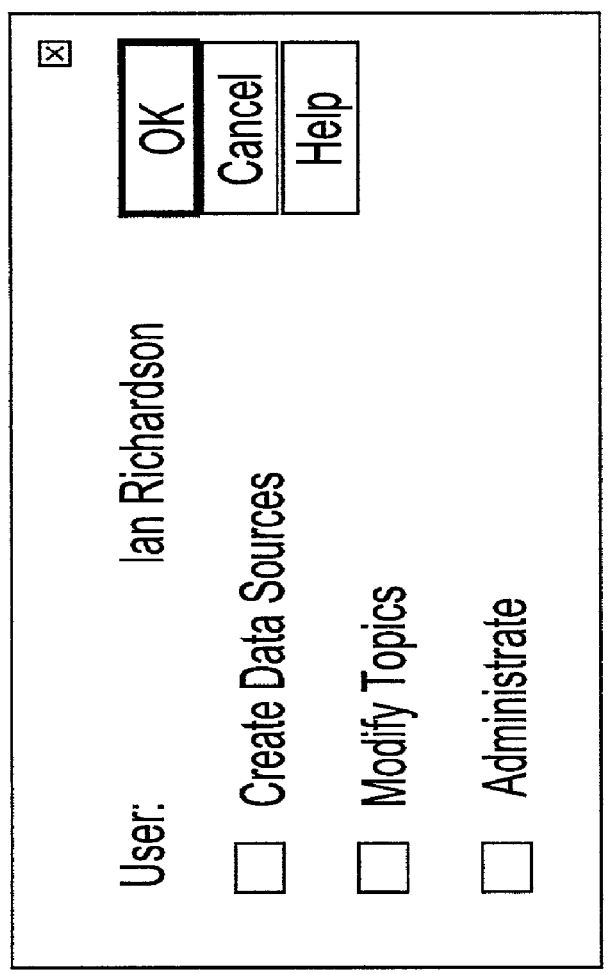

As shown in FIG. 56, the View Pane at the bottom of the main Topic Builder window selects the Properties tab. The topic properties are displayed.

Change the title and description as desired. The title appears at the top of the Answer Window when the topic is shown. The description appears in the Did You Mean? tab in the Answer Window when appropriate.

Select each trigger phrase one by one, and edit its words requirement and priority. If you want the trigger phrase to find this topic only if there is an exact match, then check the Exact option.

A higher priority means that this topic will be shown even if other topics have the same trigger phrase. You can add a new trigger phrase, or delete the selected trigger phrase by pressing the appropriate buttons.

When you are done, press Apply. Until you press Apply, you can return to the starting values of all fields by pressing Reset.

Editing Topic Content

When data sources are integrated, the Topic Builder recognizes fields within the data source and displays them as specified by the presentation template. At any time, you can view the fields of an entry and change their content and way they appear:

In the Topic Builder main window select the desired topic.

In the Parameters Pane of the main window select the Contents tab. The topic contents are displayed as shown in FIG. 46.

The data sources associated with the topic are shown on the left side. When you select a data source, the relevant entry from that source is shown on the right side. Select the entry field you wish to view in the Field field. You can switch between viewing the content as it will appear in the Answer Window and between viewing it with HTML code by pressing the browser button.

Edit the text as desired by clicking on the text and typing.

Apply character formatting by selecting text and pressing one of the buttons (B for bold, I for italic, U for underline).

If desired, use the buttons to add links as described in the following section.

When you are done, press Apply. Until you press Apply, you can return to the starting values of all fields by pressing Reset.

Adding Links

When editing topic content, you can add links to other topics. When someone clicks on a link in the Answer Window, the topic that you linked to appears. You can also link to external sites, in which case the external site appears in a separate window when the link is clicked.

External Links

To add a link from the current topic to an external website:
   Select the text to be linked and press external link button. You will then see text box where you can type the URL of the external site.

Internal Links

To add a link from the current topic to other topics:
   Select the text to be linked and press the internal link button. The window shown in FIG. 57 opens.
   A selection of related topics appears in the top part of the window. Click on a topic to see its preview in the bottom half of the window.
   If you don't see the topic you want to link to, use the Find box to search for it, just as you would in the Topic Builder main window.
   When you find the topic to link to, select the topic and press OK.

You can delete a link by selecting the link text and pressing the delete link button.

Setting Tab Order

When a topic is displayed in the Answer Window, each data source has its own tab as shown in FIG. 21.

You can determine the order in which the tabs appear. For any topic, only a few tabs from the Topic Warehouse appear. The relevant tabs appear in the order that the data sources of these tabs occur in the Tab Order list. This can be viewed and modified as follows:

In the Topic Builder main window, open the Tools menu and choose Set Tab Order. The Edit Tab Order window, FIG. 58, opens.
   The window shows all integrated data sources. You can move a data source up or down in the order by selecting it and pressing the arrow buttons.

Setting Title Priorities

Each data source entry has a title. This title appears at the top of the Answer Window when the topic is shown. When several data source entries are unified into one topic, the topic uses the title of one of the entries. To determine which entry's title will be used:
   Open the Tools menu and choose Titles Priorities. The window in FIG. 59 opens.
   The window lists the existing data sources from highest to lowest priority. When a topic appears in the Answer Window, the title of the entry from the data source highest in the list will be shown.
   Select a data source and then press the arrow buttons to move it up or down in the priority list. This window overrides the title priority set during integration.

Setting Description Priorities

Each data source entry has a short description. This description appears in the Did You Mean? tab of the Answer Window. When several data source entries are unified into one topic, the topic uses the description of one of the entries. To determine which entry's description will be used:

Open the Tools menu and choose Description Priorities. The window in FIG. 60 opens. The window lists the existing data sources from highest to lowest priority. When a topic appears in the Answer Window, the description of the entry from the data source highest in the list will be shown.

Select a data source and then press the arrow buttons to move it up or down in the priority list. This window overrides the description priority set during integration.

Security Manager

Data Sources and Topics

The Topic Builder takes data sources, such as human resource lists, corporate source documents, and databases, and processes them. During processing it organizes the data into topics that can be shown in the Answer Window.

Permissions

Permissions relate to actions you are allowed to do when using the Topic Builder. For example, someone with permission to read a data source can open and view the source in Topic Builder. But that person cannot edit the data source in Topic Builder unless he or she also has permission to write to the data source.

The Security Manager controls the following permissions:
   Creating Data Sources—With this permission you can add new data sources to the Topic Server using the Topic Builder.
   Read/Write/Delete Data Sources—With these permissions you can read, edit, and delete data sources in the Topic Server, depending upon the settings of your permissions. If you do not have read permission for a data source, you will not be able to view entries from that source in the Answer Window, and the data source will be grayed-out in Topic Builder. You may have read permission but no write or delete permissions.

Modify Topics—With this permission you can modify topics in the Topic Server using the Topic Builder, without changing the underlying data sources.

In addition, the Administrator permission allows you to access the Security Manager to view and change permissions.

Users and Groups

The Security Manager does not allow you to create new users or groups, or to assign users to groups. Instead it relies entirely upon your existing Administration System, drawing user and group information from your organization's LDAP server and allowing you to keep this information all in one place.

Users are people in the organization. Users are organized into groups for administration purposes. Using the Security Manager, permissions are assigned to users, defining exactly what they are allowed to do. Permissions can also be assigned to groups, so that every user in the group has those permissions.

The Security Manager main window is your primary tool for controlling the permissions of users and groups. From the main window, you can view and modify the permissions assigned to users and groups.

Opening the Main Window

To open the Security Manager main window:
  Press the Windows Start button, choose Programs, choose Topic Builder, and then choose Security Manager. A login window appears. Type in your username and password, and press OK.

The Security Manager verifies that you have administrator permission, and then opens the Security Manager main window. If you do not have administrator permission, you cannot access Security Manager unless someone assigns this permission to you. The first time you access the Security Manager, use the username and password provided by your Support Staff or IT Department.

Security Manager Main Window
  The left side of the window in FIG. 61, called the Navigation Pane, shows the available users and groups. The right side of the window, called the Permissions Pane, shows the permissions assigned to the selected user or group.

Navigation Pane
  Use the tabs and the navigation tree to easily find the user or group you are interested in.
  The lists of groups and users are taken from the network administration system. The EVERYONE group includes all users, and this group is useful when you want to modify a permission for all users.

When you select a user or group, the permissions assigned to it appear in the Permissions Pane, the right side of the window in FIG. 61.

Permissions Pane

When you select a user or group in the Navigation Pane, its assigned General permissions and Data Source permissions are shown in the Permissions Pane. These permissions define what the selected user or group can do in the Topic Builder, and also define who can use the Security Manager.

General permissions include:
Create DS's—Permission to integrate new data sources into the Topic Server.
Modify Topics—Permission to modify topics in the Topic Server. .
Administrator—Permission to access the Security Manager and edit permissions. .
Data Source Permissions Set the Following for each Data Source:
Read—Permission to see the data source or entries within the data source. .
Write—Permission to edit the data source, or to add or edit entries within. .
Delete—Permission to delete the data source or entries within.

Inherited Permissions
  A user may have a permission because it was assigned to him, or because it was assigned to the group he is in, or both. In each of these cases the user has the permission. If a user has a permission only due to the group he is in, the word Allow appears in brackets to remind you that the user will lose this permission if he is moved to a different group.

Multiple Selection

In the Navigation Pane, you can use the Shift and Ctrl keys to select several users/groups at once. When you do so, the assigned permissions will appear only if they are the same for all selected users/groups. If there is a permission difference, where one selected user has a permission while another does not, a dash will appear.

You can also use the Shift and Ctrl keys to select several data sources at once.

Refresh Button

If you suspect that users/groups have been edited or permissions have been changed while you were logged in to the Security Manager, you can update the display by pressing the Refresh button located in the upper left corner of the main window. You can also refresh the display by pressing F5, or by opening the Admin menu and choosing Refresh.

Assigning Permissions

This chapter explains how to assign permissions to users and groups. The procedure is slightly different, depending on whether you are assigning General permissions or Data Source permissions.

Assigning General Permissions

To assign general permissions to a user or group:
  Select one or more users or groups. The currently assigned permissions appear in the Permissions pane of the main window.
  The General Permissions window, FIG. 62, appears. A checked box means the permission is currently assigned to the selected user or group. Inherited permissions that a user inherits from a group are not shown.
    If you selected multiple users/groups and there is a permission difference, a grayed-out check appears in the checkbox. Click on the checkbox to assign/unassign the permission to all selected users/groups.
    Edit the checkboxes as desired and press OK. The newly assigned permissions appear in the main window.

Assigning Data Source Permissions

To Assign Data Source Permissions to a User or Group:
  Select one or more users or groups. The currently assigned permissions appear in the Permissions pane of the main window.
  Select one or more data sources.
    Press the Modify button or double click on the data source.

Figure 63:
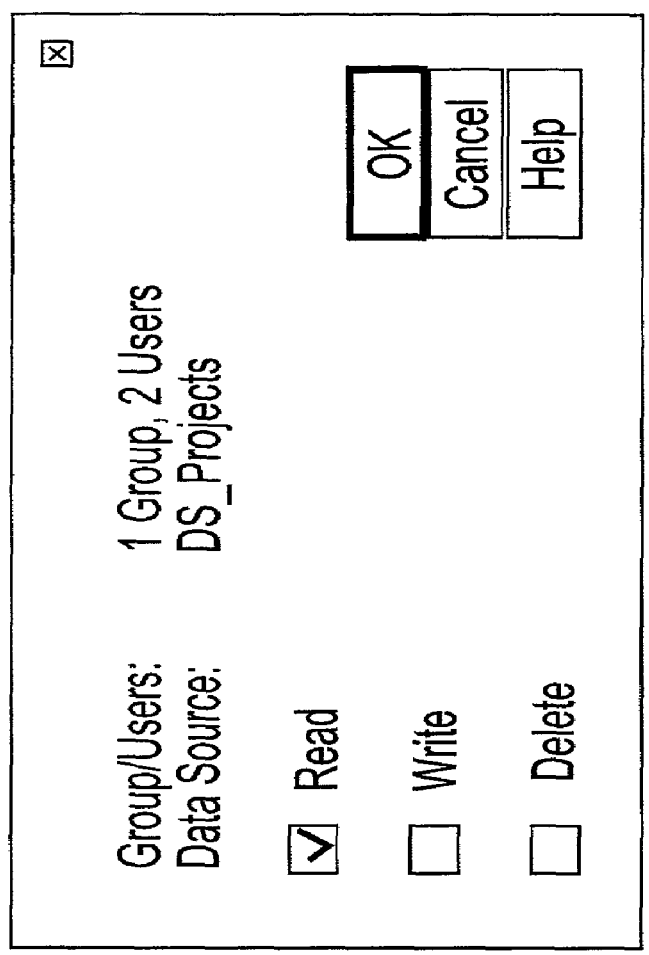

The Data Source Permissions window, FIG. 63 appears. A checked box means the permission is currently assigned to the selected user or group. Inherited permissions that a user inherits from a group are not shown.
  If you selected multiple users/groups/data sources and there is a permission difference, a grayed-out check appears in the checkbox. Click on the checkbox to assign or unassign the permission for selected data sources to the selected users/groups.
  Edit the checkboxes as desired and press OK. The newly assigned permissions appear in the main window.

FIG. 66 is a simplified flowchart illustration of a preferred method for advanced unification, operative in accordance with a preferred embodiment of the present invention; and FIG. 67 is a simplified flowchart illustration of a preferred method of operation for the communications interface block 100 in FIG. 2A, in a "distributed topic servers" embodiment of the present invention in which an assembly of intercommunicating topic servers is provided.

Referring back to FIG. 1, multiple topic servers 70 can communicate in a distributed or peer-to-peer environment. Thus the same lookup may be sent out to multiple Topic Servers which may for example be daisy-chained together or interconnected in any other suitable pattern. Either a Topic Server or a client can coordinate the information retrieved from different Topic Servers to build a single page for the user.

Intercommunicating topic servers may be operative to combine topics from different servers. Alternatively or in addition, a client or topic server may also decide that a particular topic from a single topic server is most appropriate and may return this topic with links to access the related topics on other topic servers.

A particular advantage of the intercommunicating topic servers provided in accordance with a preferred embodiment of the present invention is that through a singe query request from the user, the user may receive a unified result containing topic information from multiple Topic Servers thereby reducing the time to receive such information as well as improving the user's experience in looking up information.

FIG. 67 is a simplified flowchart illustration of a first preferred method of operation for the communications interface block 100 in FIG. 2A, in a "distributed topic servers" embodiment of the present invention in which an assembly of intercommunicating topic servers is provided.

FIG. 68 is a simplified flowchart illustration of a preferred method of operation for the communications interface block 100 in FIG. 2A, in a "distributed topic servers" embodiment of the present invention in which an assembly of intercommunicating topic servers is provided. In this embodiment, each topic server typically comprises a topic extractor operative to prepare at least one data source, the data source including a multiplicity of data entries, for topic-based retrieval, by extracting a multiplicity of topics from the data entries such that each data entry is assigned to at least one topic, a disambiguator operative to rank the relevancy of each of the multiplicity of topics to a given query including defining at least one most relevant topics and a data accessor operative to access at least some of the data entries assigned to at least one of the most relevant topics.

In this embodiment the communications interface block 100 typically has a topic server intercommunicator function which typically performs the following operations:

a. receives a user's query;
b. presents the user's query to at least one additional topic server,
c. receives at least one data entries assigned to at least one topic extracted by at least one additional topic server and ranked by at least one additional topic server as relevant to the user's query, from at least one data source associated with the additional topic server,
d. combines the at least one data entries provided by said at least one additional topic server with at least one data entries accessed by another topic server, including receiving, from the disambiguators of at least one additional topic servers, a relevancy ranking for more than one topics, and selecting, from among the more than one topics, a most relevant topic over all of the at least one additional topic servers, and
e. outputs a combined response to the user's query which includes data entries associated with more than one topic server. Typically, the combined response comprises the set of all data entries associated, in each topic server, with the topic selected as most relevant. If the data entries sent by some or all of the topic servers are not those which relate to the topic selected as most relevant, the communications interface optionally approaches those topic servers and requests that the data entries for the topic selected as most relevant be forwarded for inclusion in the combined response.

Distributed unification may be a process unconnected to a particular lookup request, in which unification is performed between the topics of server A and server B for all groups of servers where unification is desired. This may be initiated by a user request or a scheduled event, just as is unification within a single server. Alternatively, for each topic retrieved as the result of disambiguation on each server to which a query is sent, retrieve the topic's associated title and triggers. Based on that data, compute the relevance of each topic to the highest-ranked (top) topic. Any other topics whose computed relevance is above a certain predefined threshold is considered as unified—for the purposes of the current query—with the top topic. Next retrieve all data entries for the top topic and all its unified topics from their respective servers and proceed with the regular query processing.

The CD-ROM appendix attached herewith is a computer listing of a preferred software implementation of publishing apparatus for generating an information retrieval system, constructed and operative in accordance with a preferred embodiment of the present invention.

A preferred method for installing and running the software listing of the CD-ROM appendix is as follows:

Copy the file ATOMICA.HEX in the \appendix folder stored in the appended CD-ROM into a temporary directory.

Unhex the computer listing ATOMICA.HEX mentioned in step 2 using HEX IT V1.8 or greater by John Augustine, 3129 Earl St., Laureldale, Pa. 19605 creating file atomica.zip.

Decompress the file ATOMICA.ZIP using WINZIP version 6.2 or greater, extracting all files into the folder \CDROM using the WINZIP option "Use Folder names".

Installation, Configuration and Run

This section describes how to install, configure and run the Atomica servers that underlie the Atomica Enterprise Topic Warehouse system.

System and Component Overview:

The Atomica Enterprise Topic Warehouse system comprises a few components:
Front-end WebServer—Apache WebServer with mod_perl, mod_ssl and custom Atomica scripts.
Back-end WebServer (when installation is done on a single server machine, a single WebServer handles both front-end and back-end tasks).
Back-end Atomica Server—atsrv
Back-end Database—Oracle Review of Prerequisites and System Requirements:

The following is a listing of those components that are prerequisite to the Atomica Enterprise Server installation process:
Sun Solaris 7 Operating system, installed with a default installation
A minimum of 1 GB RAM
Root access to the system
Oracle installation as described in section 2.b.
A minimum of 2 GB Disk space List of commercial vendors cited as prerequisites for installation:
The Apache Software Foundation
1901 Munsey Drive
Forest Hill, Md. 21050-2747
U.S.A.
The OpenLDAP Foundation
270 Redwood Shores Pwy, PMB #107
Redwood City, Calif. 94065
USA
Oracle Corporation
500 Oracle Parkway
Redwood City, Calif. 94065
Phone: (650) 506-7000
Fax: (650) 506-7200
Sun Microsystems, Inc.
901 San Antonio Road
Palo Alto, Calif. 94303
Phone: (650) 960-1300
Fax: (650) 336-0646
Microsoft Corporation
One Microsoft Way
Redmond, Wash. 98052
Phone: (425) 882-8080
Fax: (425) 936-7329
Netscape Communications
501 East Middlefield Road
Mountain View, Calif. 94043
Phone: (650) 254-1900
Fax: (650) 528-4124
Overview of the Components:
3RD-PARTY COMPONENTS
Apache
  mod_ssl-2.3.11-1.3.6.tar.gz
  mod_Perl-1.23.tar.gz
  apache_1.3.6.tar.gz
  ssl_util_ssl.c OpenLDAP
  openldap-2.0.7.tgz
Perl
  Bundle-libnet-1.00.tar.gz
  Convert-ASN1-0.07.tar.gz
  DBI-1.15.tar.gz
  DBD-Oracle-1.06.tar.gz
  DateManip-5.39.tar.gz
  Digest-MD5-2.12.tar.gz
  HTML-Parser-3.15.tar.gz
  HTML-Tagset-3.03.tar.gz
  MIME-Base64-2.11.tar.gz
  ParallelUserAgent-2.49.tar.gz
  Parse-Yapp-1.03.tar.gz
  Time-HiRes-01.20.tar.gz
  URI-1.10.tar.gz
  XML-Parser.2.30.tar.gz
  libnet-1.0703.tar.gz
  libwww-perl-5.50.tar.gz
  libxml-enno-1.02.tar.gz
  libxml-perl-0.07.tar.gz
  perl-5.005_03-sol7-sparc-local.gz
  perl-ldap-0.22.tar.gz System
  Bash-2.03-sol7-sparc-local
  gcc-2.95-sol7-sparc-local.gz
  gzip-1.3-sol7-sparc-local
  openssl-0.9.6.tar.gz
  libgdbm.tar
  libextr.so
  make-3.79.1.tar.gz Misc
  xerces-c-srcl_4_0.tar.gz
  expat-1.95.0.tar.gz ATOMICA:
ATOMka-all.pkg
ATOMat-sparc.pkg
ATOMput-all.pkg
at_preOraIns.sh
ATOMora.tar.gz Overview of the Directory Structure/Glossary of Terms Used in This Document:
[ATOMICA_ROOT]: The directory under which all the Atomica components are installed.
[LOGS_DIR]: The directory chosen for Atomica log.
[PUBLISHING_DIR]: The directory where files are put in temporarily during publishing.
[APACHE_ROOT]: The directory under which Apache is installed.
[LDAP_ROOT]: The directory under which the LDAP server is installed, assuming it is installed on the same machine as the Atomica server.
[ORACLE_BASE] and [ORACLE_HOME]: These directories are the same as in all Oracle installations.

Preparing Server Environment

Creation of Proper Partition on Disk
[PUBLISHING_DIR] serves as a temporary location for XML files during publishing. We recommend this directory to be put on a separate partition, for security reasons, and in order to avoid filling the disk with large XML files.
[LOGS_DIR] should also be on a partition other then the one used for Atomica server files. It can grow very large, despite the log rotation.

Oracle System Preparation

The installation assumes the availability of an Oracle database administrator, and that Oracle has already been or will be installed by the Oracle DBA.

The following Oracle Components may be installed:
Oracle Version 8.1.7.1 including:
Oracle8i Server
Oracle Product Options
Oracle InterMedia
Spatial (When installing custom there is a dependency to Spatial)
Net8
Oracle Utilities
SQL*PLUS
Oracle Java Products
JDBC Drivers
Specific notes regarding Oracle as pertains to Atomica installation:
Recommended Hard Disk Partitions—Five Disks/ oracle=contains Oracle Software, System,Tools and Temp Tablespaces
/ora_data=contains DATA Tablespaces (ATOMICA_DATA, Users)
/ora_index=contains INDEX Tablespaces (ATOMICA_INDEX)
/ora_rbs=contains RBS Tablespace
/ora_arch=contains Directory for archive logs Installation Of Other Prerequisite Components
Some installations use pkgadd. This utility is usually located in /usr/sbin. bash
Bash installation is not required, but it will make the rest of the installation flow more smoothly.
To install bash, obtain root permissions and type the following:
pkgadd -d /cdrom/3rd_party_components/System/bash-2.03-sol7-sparc-local gzip Many components of the Atomica server are compressed using gzip.

To install gzip, obtain root permissions and type the following:
pkgadd -d /cdrom/3rd_party_components/System/gzip-1.3-sol7-sparc-local gcc compiler The gcc compiler is used for Apache and Perl installations. To install Gcc, obtain root permissions and enter the following:
gunzip gcc-2.95-sol7-sparc-local.gz
pkgadd -d /cdrom/3rd_party_components/System/gcc-2.95-sol7-sparc-local
Add '/usr/ccs/bin/' to $PATH so that the "make" command can be found:
PATH=$PATH:/usr/ccs/bin
OpenSSL
OpenSSL is required by mod_ssl Apache module, for encryption handling in the WebServer. To install OpenSSL, obtain root permissions and type the following
gunzip /cdrom/3rd_party_components/System/openssl-0.9.6.tar.gz
tar xvf /cdrom/3rd_party_components/System/openssl-0.9.6.tar
cd openssl-0.9.6
./config
make
make test
make install
expat
expat is an XML parser used by the WebServer scripts. To install expat, obtain root permissions and type the following:
cd [Some working directory]
gunzip /cdrom/3rd_party_components/Misc/expat-1.95.0.tar.gz
tar xvf /cdrom/3rd_party_components/Misc/expat-1.95.0.tar
cd expat-1.95.0
./configure
make
make install Perl and Perl Modules To install Perl, obtain root permissions and type the following:
gunzip /cdrom/3rd_party_components/Perl/perl-5.005_03-sol7-sparc-local.gz
pkgadd -d /cdrom/3rd_party_components/Perl/perl-5.005_03-sol7-sparc-local To install the required Perl modules, one must 'untar' and install each of the following files:

To untar the files, type these commands:
Cd [Some working directory]
gunzip /cdrom/3rd_party_components/Perl/MIME-Base64-2.11.tar.gz
tar xvf /cdrom/3rd_party_components/Perl/MIME-Base64-2.11.tar
gunzip /cdrom/3rd_party_components/Perl/URI-1.10.tar.gz
tar xvf /cdrom/3rd_party_components/Perl/URI-1.10.tar
gunzip /cdrom/3rd_party_components/Perl/Digest-MD5-2.12.tar.gz
tar xvf /cdrom/3rd_party_components/Perl/Digest-MD5-2.12.tar
gunzip /cdrom/3rd_party_components/Perl/HTML-Parser-3.15.tar.gz
tar xvf /cdrom/3rd_party_components/Perl/HTML-Parser-3.15.tar
gunzip /cdrom/3rd_party_components/Perl/libwww-perl-5.50.tar.gz
tar xvf /cdrom/3rd_party_components/Perl/libwww-perl-5.50.tar
gunzip /cdrom/3rd_party_components/Perl/Bundle-libnet-1.00.tar.gz
tar xvf /cdrom/3rd_party_components/Perl/Bundle-libnet-1.00.tar
gunzip /cdrom/3rd_party_components/Perl/Convert-ASN1-0.07.tar.gz
tar xvf /cdrom/3rd_party_components/Perl/Convert-ASN1-0.07.tar
gunzip /cdrom/3rd_party_components/Perl/DateManip-5.39.tar.gz
tar xvf /cdrom/3rd_party_components/Perl/DateManip-5.39.tar
gunzip /cdrom/3rd_party_components/Perl/HTML-Tagset-3.03.tar.gz
tar xvf /cdrom/3rd_party_components/Perl/HTML-Tagset-3.03.tar
gunzip /cdrom/3rd_party_components/Perl/libnet-1.0703.tar.gz
tar xvf /cdrom/3rd_party_components/Perl/libnet-1.0703.tar
gunzip /cdrom/3rd_party_components/Perl/XML-Parser.2.30.tar.gz

```
tar    xvf    /cdrom/3rd_party_components/Perl/XML-
    Parser.2.30.tar
gunzip    /cdrom/3rd_party_components/Perl/libxml-enno-
    1.02.tar.gz
tar    xvf    /cdrom/3rd_party_components/Perl/libxml-enno-
    1.02.tar
gunzip    /cdrom/3rd_party_components/Perl/libxml-perl-
    0.07.tar.gz
tar    xvf    /cdrom/3rd_party_components/Perl/libxml-perl-
    0.07.tar
gunzip    /cdrom/3rd_party_components/Perl/ParallelUser-
    Agent-2.49.tar.gz
tar    xvf    /cdrom/3rd_party_components/Perl/ParallelUser-
    Agent-2.49.tar
gunzip    /cdrom/3rd_party_components/Perl/Parse-Yapp-
    1.03.tar.gz
tar    xvf    /cdrom/3rd_party_components/Perl/Parse-Yapp-
    1.03.tar
gunzip    /cdrom/3rd_party_components/Perl/perl-ldap-
    0.22.tar.gz
tar    xvf    /cdrom/3rd_party_components/Perl/perl-ldap-
    0.22.tar
gunzip    /cdrom/3rd_party_components/Perl/Time-HiRes-
    01.20.tar.gz
tar    xvf    /cdrom/3rd_party_components/Perl/Time-HiRes-
    01.20.tar
gunzip /cdrom/3rd_party_components/Perl/DBI-1.15.tar.gz
tar xvf /cdrom/3rd_party_components/Perl/DBI-1.15.tar
gunzip    /cdrom/3rd_party_components/Perl/DBD-Oracle-
    1.06.tar.gz
tar    xvf    /cdrom/3rd_party_components/Perl/DBD-Oracle-
    1.06.tar
```

To install the modules:

For each module move for its source directory, and type the following with root permissions:
```
perl Makefile.PL
make
make test
make install
```

Pay close attention to the 'make test' output. A few modules have no tests to run. For the ones that do, check that no errors have occurred.

Notes

DBD-Oracle has to be installed after Oracle is up.

DBI module will show a warning message about optional RPC—Ignore it.

ParallelUserAgent will give a warning about an unsupported libwww.

Perl-ldap will show a warning about IOSocket.

Acquiring and installing a valid Digital certificate

For SSL to work properly, one needs to install a digital certificate on the server, which will authenticate the server both to the retrieval and the publisher clients. One may install a free test certificate first, in order to test the system. In such a case, one will receive at warning message for every login one performs from the client or from the Publisher.

Libgdbm libraries

Obtain Root Permissions
```
cd /usr/local/lib
tar xvf /cdrom/3rd_party_components/System/libgdbm.tar
```
Apache with mod_perl and mod_ssl Acquire root permissions, Move to the directory into which you want to install Apache ([APACHE_ROOT]).

```
cd [APACHE_ROOT]
```
Untar the tar files containing Apache, mod_perl and mod_ssl:
```
gunzip    /cdrom/3rd_party_components/Apache/apache_
    1.3.6.tar.gz
tar    xvf    /cdrom/3rd_party_components/Apache/apache_
    1.3.6.tar
gunzip    /cdrom/3rd_party_components/Apache/mod_perl-
    1.23.tar.gz
tar    xvf    /cdrom/3rd_party_components/Apache/mod_perl-
    1.23.tar
gunzip    /cdrom/3rd    party_components/Apache/mod_ssl-
    2.3.11-1.3.6.tar.gz
tar    xvf    /cdrom/3rd_party_components/Apache/mod_ssl-
    2.3.11-1.3.6.tar
```

One source file has to be replaced for the Atomica system to work. To do it, type
```
cp/cdrom/3rd_party_components/Apache/ssl_util_ssl.c
    mod_ssl-2.3.11-1.3.6/pkg.sslmod/ssl_util_ssl.c
```
Move to the mod_ssl directory
```
cd mod_ssl-2.3.11-1.3.6
```
Configure mod_ssl:
```
./configure --with-apache=../apache_1.3.17
```
Move to the mod_perl directory and install mod_perl there:
```
cd ../ mod_perl-1.23
perl Makefile.PL\
EVERYTHING=1 \
APACHE_SRC=../apache_1.3.6/src \
USE_APACI=1 \
PREP_HTTPD=1 \
DO_HTTPD=1
make
make install
```

Move to the Apache directory and install Apache there:
Replace [SSL_ROOT] with OpenSSL root directory and [APACHE_ROOT] with the Apache root directory.
```
cd ../apache_1.3.6
SSL_BASE=[SSL_ROOT]
./configure \
--prefix=[APACHE_ROOT] \
--enable-module=ssl \
--activate-module=src/modules/perl/libperl.a \
--enable-module=perl
make
make certificate
make install
```

In this step, a server certificate is used. For help on purchasing and installing Digital certificate, see the previous section
```
gmake
```
gmake is used for building the XERECES library.

To install it acquire root permissions, and then type these lines:
```
tar    xvf    /cdrom/3rd_party_components/System/make-
    3.79.1.tar.gz
gunzip make-3.79.1.tar
```
Dynamic libraries: XERCES and libextr.so XERCES is an XML parser used by atsrv.

This is an open source project which is run under the sponsorship of the Apache Software Foundation.

Type in the following commands:
```
tar xvf /cdrom/3rd_party_components/Misc/xerces-c-src1_
    4_0.tar.gz
cd xerces-c-src1_4_0
```

Use pwd to find out the full path of the current directory, and then use this value for setting the XERCESROOT environment variable:

export XERCESROOT=<full path to xerces-c-src1_4_0>cd src runConfigure −psolaris −cgcc −xg++ gmake (or make, if your default make is gnu make).

Then copy the generated library to/usr/local/lib (you will probably have to be super-user to do this):

cp ../lib/libxerces-c1__4.so/usr/local/lib cp /cdrom/3rd_party_components/System/libextr.so /usr/local/lib chmod a+x /usr/local/lib/libextr.so Preparing the LDAP Environment LDAP Installation The Atomica Enterprise Server requires an LDAP server for authentication and authorization of system users. Atomica can be attached to an existing LDAP installation, if the company already uses an LDAP server. Atomica supports the Microsoft Active Directory, the Netscape Directory Server, and OpenLDAP. If no LDAP server exists, OpenLDAP can be installed on the Atomica server machine.

Refer to these vendors for installation of the LDAP servers. Follow instructions included with the package if installing OpenLDAP.

To Install open LDAP:

cd [LDAP_ROOT]

gunzip /cdrom/3rd_party_components/OpenLDAP/openldap-2.0.7.tgz tar xvf /cdrom/3rd_party_components/OpenLDAP/openldap-2.0.7.tar cd openldap-2.0.7

./configure make depend make make test make install

Creation of LDAP Users

The directory administrator should create a new user with only read only rights so the Atomica Web Server can connect to the corporate LDAP directory server. You should explain to the administrator that all we will be doing is a) authenticating users and b) performing LDAP searches to obtain the distinguished names of users and groups.

Preparation of Proper FQDN and Distinguished Names

In order to properly connect to the LDAP server, we need to know the distinguished name of the LDAP user (see ii above). In order to perform proper LDAP searches, we will need the dn's of the user and group search base. The directory administrator may not be familiar with the LDAP protocol. But if we can obtain the location within the directory structure for these items, along with an understanding as to how the nodes within the directory tree are defined, we can construct the proper dn's. (See the LDAP section of the httpd.conf description for a complete explanation of dn's and FQDNs.)

Definition of SMTP Relay

Some features such as the 'send page' feature in Atomica require a SMTP relay. This SMTP name must be prepared for later use in the Oracle setup process.

Running an Atomica Server Installation

The Atomica server components are made up of 2 packages and a few scripts. The server installation process comprises installing the packages and running scripts to modify the Apache configuration file, creating the Atomica Database, and deploying the stored procedures in the database.

The relevant folders that remain on the machine after the Atomica installation process should look like this:

| Directory | Files | | Notes |
|---|---|---|---|
| [ATOMICA_ROOT] | | | |
| Atsrv | No files | | |
| Bin | atsrv.exe | | |
| | atsrvctl | | |
| | atsrv.conf | | |
| | run_sched_update.pl | | |
| dict | focuses.ini focuses.txt | | |
| Run | No files | | |
| Httpd | No files | | |
| cgi-bin | addAdmin.pl | | Scripts used by the Back-End Atomica Server to give initial administrator permissions and to support transfer of data files. If the front-end and back-end servers are on different machines then this directory must be on the machine with the back-end servers |
| | createDirectory.pl | | |
| | put.conf | | |
| | put.pl | | |
| Conf | atomica.conf | | atomica.conf contains settings needed by the Atomica Web Server. See section 3.d for details. |
| htdocs | favicon.ico | | This directory should be set as the documentroot of the Apache web server in httpd.conf unless the machine will also be hosting a web site. Favicon.ico is used by Internet Explorer when an Atomica page is added to one's "favorite" list. Index.html redirects the user to a page with the Atomica Server information. This lets you type "http://myserver name" and get server version information. |
| | index.html | | |
| lookup | atomica.css | lucidas0.eot | Javascript, css and other files referenced by the HTML shown in the Atomica Answer Window |
| | atomica__ie.css | main5ie.js | |
| | atomica__mac.css | main5n.js | |
| | browserbar.js | pronkey.html | |
| | hierMenus.js | | |

| Directory | Files | Notes |
|---|---|---|
| img | 100 + files | you should not need to modify any files in this directory Various image files sent to the Atomica Answer Window logos, background images, etc. You should not need to make any changes here. |
| cobrands | No files initially | Under the cobrands directory you may create a subdirectory with your cbid as its name and put your site-specific image files there. See section Your Own Look and Feel XXXX |
| scripts | 50 + files. | The main directory containing scripts to be run directly from the Atomica Answer Window. You should not need to modify any files in this directory. |
| cobrands | cb_xxxx.conf | A single file named cb_<your cbid>.conf containing configuration values to modify the site-specific look and feel of your Atomica Answer Window. See section Your Own Look and Feel XXXX |
| lib | About 50 scripts. | Files used internally by the Atomica Web Server's scripts - you should not need to modify any files in this directory. |
| menus | De.menu<br>fr.menu<br>it.menu<br>es.menu | Files containing interface text for the Web Browser version of the Atomica Answer Window HTTP - you should not need to modify any files in this directory. |
| remote | 6 scripts | Scripts invoked by the Web Server via HTTP -you should not need to modify any files in this directory. |
| Templates | About 90 HTML templates | Various html template files used to build the Atomica Answer Window you should not need to modify any files in this directory. |
| Local Services | No files atomica_url.pl | Implementation of the service for retrieving HTML from a URL to be used with external data. |
| Templates | Initially empty | When using the external data in_iframe feature with templates, the templates go here. |
| statictemplates | statictabs.txt | error.apt | When using the static tabs feature you will need to edit statictabs.txt and add appropriate .apt files (and optionally .adt files) in this directory. |
| [LDAP_ROOT]<br>[LOGS_DIR] | | statistics_log<br>error_log |
| [ORACLE_BASE]<br>admin | | |
| [ORACLE_SID]<br>adhoc<br>arch<br>bdump<br>Cdump<br>create | atomica_tblspc.sh<br>atomicacontext.sh<br>atomicadrsys.sh<br>atomicaiMedia.sh<br>atomicajava.sh<br>atomicaordinst.sh | atomicarun.sh<br>atomicarun1.sh<br>atomicarun2.sh<br>atomicaspatial1.sh<br>atomicasqlplus.sh<br>createdb817_atomica.sh<br>initatomica.ora | Scripts for creating the Atomica database instance |
| CreateDBObj | create_atomica_users.sh<br>create_atomica_users_run.sh<br>create_atomica_seq.sh<br>create_atomica_tables.sh | | Scripts for creating the Atomica users, tables and sequences |
| CreateSeq | actual_words_seq.sql<br>listfields_seq.sql<br>at_blob_msg_seq.sql<br>return_seq.sql<br>categories_seq.sql<br>run_seq_create.sql | concept_titles_seq.sql<br>runsrv_seq_create.sql<br>concepts_seq.sql<br>std_words_seq.sql<br>content_words_seq.sql | Sequence create scripts |

-continued

| Directory | Files | | Notes |
|---|---|---|---|
| | | unification_ses sion_seq.sql data_sources_ seq.sql | |
| CreateTables | actual_words.sql data_sources.sql title_words.sql app_param.sql de_numbers.sql ua_group_ permissions.sql at_blob_msg.sql de_to_de.sql ua_permissions.sql at_resource_ locking.sql de_words.sql ua_user_ permissions.sql categories.sql fuzzy_words.sql | unification_ ds_pairs.sql concept_data_ entries.sql listfields.sql unification_fa milies.sql concept_titles. sql return.sql unification_ses sion.sql concepts.sql run_table_ create.sql vssver.scc content_ words.sql runsrv_table_ create.sql data_entries. sql std_words.sql | Table create scripts |
| InitializeDB | InitData.pl services.sql SrvSynonym.sql textAnalysis.sql userAdmin.sql all.dtd publish.sql | jakarta-regexp- 1.1.jar last_build.jar last_srv_ build.jar mail.jar xmlparserv2.jar load_code.sh activation.jar | Scripts for loading JAVA code and creating stored procedures |
| InitializeInter media | IntermediaSetup.pl install_ indexes.sql.tmpl | | Scripts for creating and initializing Oracle Intermedia indexes used by Atomica |
| pfile | | | |
| udump | | | |

Install the Atomica packages

Install the front-end package:

Get root permissions.

cd [ATOMICA_ROOT]

cp /cdrom/Atomica/ATOMka-all.pkg .

pkgadd -d ./ATOMka-all.pkg

During package installation you will be asked a few questions:

| Question | Notes |
|---|---|
| The following packages are available: 1 ATOMka Atomica Front-end (all) 1.0.bw8 Select package(s) you wish to process (or 'all' to process all packages). (default: all) [?,??,q]: Processing package instance <ATOMka> from </export/home/guruadm/naamab/ATOMka-al l.pkg> Atomica Front-end (all) 1.0.bw8 Copyright (c) 2001, Atomica Corporation. All rights reserved. | Default is fine, press <enter> |

-continued

| Question | Notes |
|---|---|
| ATOMICA LICENSE AGREEMENT . . . You must read and agree to the license agreement to continue installation. Do you agree to the Atomica License Agreement? [y,n,?,q] | |
| What should the root path for Atomica server files and executables be? (default: /usr/local/atomica/) [?,q] | This direc- tory is referred to as [ATOMICA _ROOT] in this document. |
| What should the root path for the front-end logs be? (default: /var/log/atomica) [?,q] | This direc- tory is referred to as [LOGS _DIR] in this document |
| Who will the owner of files installed. This must be a user that already exists (default: atomica) [?,q] | Select a user that will own the scripts and other files |
| Which group will own the installed files. This group must already exist? [?,q] | |
| Note the following setup locations: root: /usr/local/atomica/ logs: /var/log/atomica/ user: atomica group: nobody Is this information correct? | Answer y/n |
| Are the Atomica front-end (where queries are sent) and back-end (where data is stored) on the same server (that is, this server)? | |
| What is the name or IP address of the Atomica server? Note: Name is preferred. (default: localbost) [?,q] | The name given here needs to match the server name defined in all the clients (publishing and retrieval) |
| Please verify that the following represents the answers you gave: . . . Is this information correct? | y or n |
| where can we find the httpd.conf for editing? (default: /usr/local/apache/conf/httpd.conf) [?,q] | Enter the location of the Apache httpd.conf configuration file. |
| we need to define a 'secret' file for use when creating SSL authentication tokens. Such a file is installed by default. If you wish to use it then press <enter>to select default. If you wish to give your own random secret data file then enter the location of that file here. (default: /usr/local/atomica/http/conf/secret) [?,q] | NOTE: This file is created with read permissions for everyone. |
| Enter a integer amount of minutes a ticket is valid before requiring regeneration (reauthentication) of a new one. (default: 760) [?,q] | |
| What type of LDAP server are we using? Note: If you are using OpenLDAP enter 'Netscape' as the proper value. (default: 'Netscape') [Netscape,Active Directory,?,q] | |
| What is the name or IP of the LDAP Host? (default: localhost) [?,q] | |

-continued

| Question | Notes |
|---|---|
| The System User Valid distictive name? Note: ask your LDAP administrator for this information if it is unclear. (default: CN = Manager,dc = atomica,dc = com) [?,q] LDAP System User Password? (default: secret) [?,q] | Be sure |
| Where do you want to start searching within the LDAP directory tree for users with access to the Atomica system? (default: ou = People, dc = atomica, dc = com) [?,q] | Be sure the default matches openldap scheme |
| Where do you want to start searching within the LDAP directory tree for groups with access to the Atomica system? (default: ou = Groups,dc = atomica,dc = com) [?,q] | Be sure the default matches openldap scheme |
| Path for the LDAP Log? (default: /var/log/httpd/ldap_log) [?,q] | |

Install the backend webserver package

Get root permissions.

cd [ATOMICA_ROOT]

cp /cdrom/Atomica/ATOMput-all.pkg.

pkgadd -d ./ATOMput-all.pkg

During package installation you will be asked a few questions:

| Question | Notes |
|---|---|
| The following packages are available: 1 ATOMput Atomica File Transfer engine (all) 1.0.bw8 Select package(s) you wish to process (or 'all' to process all packages). (default: all) [?,??,q]: Processing package instance <ATOMput> from </home/naamab/ATOMput-all.pkg> Atomica File Transfer engine (all) 1.0.bw8 Copyright 2001 Atomica Corp. ATOMICA LICENSE AGREEMENT ... You must read and agree to the license agreement to continue installation. Do you agree to the Atomica License Agreement? [y,n,?,q] | Default is fine, press <enter> |
| What should the root path for Atomica server files and executables be? (default: /usr/local/atomica/) [?,q] | |
| Give a local disk location where we can upload files. This is the directory the Atomica Publisher will use to transfer data to the server for processing. Note: When large amounts of data are being published a equal amount of free space is required. It is recommended to make this location on a partition with 1G + free space. (default: /usr/local/atomica/publish) [?,q] | |
| What is the name or IP of the local server? Atomica publisher clients need to be able to resolve this name and access the IP. (default: localhost) [?,q] | |
| Who will the owner of files installed. This must be a user that already exists. Enter ? to see existing users. (default: nobody) [?,q] | |
| Which group will own the installed files. Enter '?' to see existing groups. (default: nobody) [?,q] where can we find the httpd.conf for editing? (default: /usr/local/apache/conf/httpd.conf) [?,q] Note the following setup locations: root dir: /usr/local/atomica/ server name: localhost publish dir: /usr/local/atomica/publish httpd.conf: /usr/local/apache/conf/httpd.conf user: nobody group: nobody Is this information correct? | y/n |

Set up Oracle for Use with Atomica

The following process creates a new Oracle instance on your server, and builds in it schemas that are needed by Atomica. It will populate these schemas with tables, indexes, sequences, and stored procedures. It also deploys the JAVA code and initializes the Oracle Intermedia indexes.

Log in as the UNIX user that has Oracle system privileges.

Choose an instance name for your Atomica database. The name can have up to 8 characters. We recommend that the first 2 characters be 'a' and 't'. Note: the rest of this document will use [ORACLE_SID] to represent the instance name you choose. Set the environment variable ORACLE_SID=[ORACLE_SID]Be sure your environment has the proper setting for ORACLE_HOME and ORACLE_BASE. Ask the DBA who installed Oracle how to set these environment variables Prepare the Oracle scripts:

/cdrom/Atomica/at_preOraIns.sh

Edit the Oracle parameters for the database you are about to create:

cd [ORACLE_BASE]/admin/[ORACLE_SID]/pfile cp[ORACLE_BASE]/admin/[ORACLE_SID]/create/init-atomica.ora init[ORACLE_SID].ora Edit the file [ORACLE_BASE]/admin/[ORACLE_SID]/pfile/init[ORACLE_SID].ora. Find the following parameters and set their value as follows (use the correct actual values for [ORACLE_BASE] and [ORACLE_SID]):

| Parameter | Value |
|---|---|
| db_name | "[ORACLE_SID]" |
| instance_name | [ORACLE_SID] |
| service_names | [ORACLE_SID] |
| background_dump_dest | [ORACLE_BASE]/admin/[ORACLE_SID]/bdump |
| core_dump dest | [ORACLE_BASE]/admin/[ORACLE_SID]/cdump |
| user_dump dest | [ORACLE_BASE]/admin/[ORACLE_SID]/cdump |

You might want to make additional changes to the init.ora file ([ORACLE_BASE]/admin/[ORACLE_SID]/pfile/init[ORACLE_SID].ora). This file contains all the Oracle initialization parameters, and the parameter values depend on the configuration of your system and the size that your Atomica database is expected to reach. It is best if a DBA edits this file. When you are done, copy init[ORACLE_SID].ora to $ORACLE_HOME/dbs. Edit the file [ORACLE_BASE]/admin/[ORACLE_SID]/create/AtomicaBESetup.sh, and set the following values:

| Parameter | Explanation |
|---|---|
| ATDBCREATE_DIR | The directory you are running the script from. Usually [ORACLE_BASE]/admin/[ORACLE_SID]/create |
| ATDB_ORACLEPATH | The location for the Atomica db system and temp files |
| ATDB_ORA_DATAPATH | The location for the Atomica db data files |
| ATDB_ORA_INDEXPATH | The location for the Atomica db index files |
| ATDB_ORA_RBSPATH | The location for the Atomica db rollback files |
| ATOMICA_DATA_TABLESPACE | The logical name for the Atomica data table space. Default ATOMICA_DATA |
| ATOMICA_INDEX_TABLESPACE | The logical name for the Atomica index table space. Default ATOMICA_INDEX |
| ATDB_ATOMICADATA_FILESIZE | The initial size of the OS file that will hold the Atomica data |
| ATDB_ATOMICADATA_MAXFILESIZE | The maximum size that a single OS file of the Atomica data will be allowed to grow to. (It is possible to add more OS files) |
| ATDB_ATOMICAINDEX_FILESIZE | The initial size of the OS file that will hold the Atomica indexes |
| ATDB_ATOMICAINDEX_MAXFILESIZE | The maximum size that a single OS file of the Atomica indexes will be allowed to grow to. (It is possible to add more OS files) |
| ATOMICA_USER | The name of the user that will own all the Atomica objects and data. THIS NAME MUST BE 10 CHARACTERS OR LESS. Security note: Accessing the Oracle database directly as this user will allow viewing, manipulating and destroying all the data in the Atomica database. |
| ATOMICA_USER_PASSWD | The password needed to gain access to Oracle as the Atomica user |
| ATOMICA_SERVICES_USER | The name of the user that will own Atomica services |
| ATOMICA_SERVICES_USER_PASSWD | The password needed to gain access to Oracle as the Atomica services |
| ORACLE_PORT | The port that Oracle is listening on |
| UPDATE_FILE_ROOT_DIR | A directory on the UNIX server for placing ready to publish files |
| SCHEDULAR_LOG_FILE_NAME | A name and path for the log file produced by the scheduler |
| ATOMICA_ROOT | Use the same directory that use designated as ATOMICA_ROOT in the front-end package. |
| SMTP_SERVER | |
| SENDER_EMAIL_ADDRESS | The email address of the sender of scheduled update failure notifications |

You are now ready to run:
cd [ORACLE_BASE]/admin/[ORACLE_SID]/create
./AtomicaBESetup.sh>AtomicaBESetup.log &
When you are done, you can examine the logs.
Install the atsrv package:
cd [ATOMICA_ROOT]
cp /cdrom/Atomica/ATOMat-sparc.pkg.
pkgadd -d ./ATOMat-sparc.pkg During package installation, you will be asked a few questions. It is important that you get the right answers before starting the installation.

Below is a list of questions that you will be asked:

| Question | Notes |
|---|---|
| The following packages are available: 1 ATOMat Atomica Back-end (sparc) 0.1.1 Select package(s) you wish to process (or 'all' to process all packages).(default: all) [?,??,q]: Processing package instance <ATOMat> from </export/home/guruadm/naamab/ATOMat-sparc.pkg> Atomica Back-end (sparc) 0.1.1 Copyright 2001 Atomica Corp. ATOMICA LICENSE AGREEMENT . . . You must read and agree to the license agreement to continue installation. Do you agree to the Atomica License Agreement? [y,n,?,q] | |
| What should the root path for Atomica server files and executables be? (default: /usr/local/atomica/) [?,q] | This directory is referred to as [ATOMICA_ROOT] in this document. Use the same directory you typed in the front-end package. |
| What should the root path for the ATSrv logs be? (default: /var/log/atomica/) [?,q] | This directory is referred to as [LOGS_DIR] Use the same directory you typed in the front-end package. |
| Would you like us to setup automatic log rotation (cron script) for these logs? Who will be the owner of files installed? This must be a user that already exists. Enter \'?\' to see list of existing users. (default: atomica) [?,q] Which group will own the installed files? This group must already exist? Enter \'?\' to see list of existing groups. [?,q] | |
| Oracle SID? | The ORACLE_SID of the Oracle instance for Atomica |
| Oracle user name? | Must be the same as ATOMICA_USER |
| Oracle user password? | Must be the same as ATOMICA_USER_PASSWD |
| ORACLE_HOME? (default: /export/home/oracle/app/oracle/product/8.1.7) [?,q] Library path? (default: /usr/local/lib) [?,q] | Must be the same as ORACLE_HOME The location of your system's dynamic link libraries. (Specifically libxerces-c1_4.so and libextr.so) yes/no |
| Note the following setup information: prefix: /usr/local/atomica/ logprefix: /var/log/atomica/ user: atomica group: atomica ORACLE_SID: [ORACLE_SID] Oracle user name: Atomica Oracle password: Atomica1234 | |

-continued

| Question | Notes |
|---|---|
| ORACLEHOME:<br>/export/home/oracle/app/oracle/product/8.1.7<br>Library path: /usr/local/lib<br>Is this information correct? | |

Setting Up Front End Httpd Scripts And Configuration File
Atomica.conf Atomica.conf configure the Atomica front end. It is installed with the front end package, and built according to the information given during installation. This is a text file which may be edited using a text editor.

Configuration of ATSrv Configuration File

During the backend package installation, atsrv.conf was created in[ATOMICA_ROOT]/atsrv/bin.

Pulling It All Together

Starting the servers—httpd, atsrv, etc.

Get root permissions or use sudo

Start Apache with SSL:

[APACHE_ROOT]/bin/apachectl startssl

Enter the password defined for SSL.

Start the Atomica server ATSRV:

[ATOMICA_ROOT]/atsrv/bin/atsrvctl start

Initializing the Security Manager With The Master User's LDAP Name One administrator user must be defined before a user can use the Atomica Security Manager to set permissions. This is done using the addAdmin.pl script.

To activate the addAdmin.pl script, enter the following text:
[ATOMICA_ROOT]/httpd/cgi-bin/addAdmin.pl [parameters]

Entering the command with no parameters gives the following parameters list:

server=Web Server IP:Port(if port is needed)—default is localhost
admin=User Name of the new admin to insert to the Database
dbuser=User Name of the database(to log on the database)
dbpass=Password of the database
host=the IP of the Database machine—default is localhost
sid=Database SID
dbdriver=Database Driver (default is Oracle)

Verifying the Atomica Server Installation

Retrieve the Atomica server version number. The script that retrieves the version numbers of the different components can be used to verify that all the components are running and communicating.

The script return the version of the Atomica server, as well as the versions of the following components:
WebServer
ATSRV
Oracle stored procedures.

To activate the version script, type this URL in a browser:
http://[SERVER_IP_ADDRESS]/atomica/sversion If all the components are working, the user should get a page indicating the Atomica components and their version numbers.

Install the Client

Before installing, verify the computer fulfills the following hardware and software requirements:

TCP/IP connection to the Atomica Topic Warehouse™

Microsoft Windows Operating system such as Windows 95, Windows 98, Windows NT, or Windows 2000

Web Browser: Internet Explorer 4 and above

To install the Client application:

Using Windows Explorer, double click on the client installation executable file (atomicainstall.exe) located in the folder \CDROM.

Follow the instructions of the Windows installation program wizard and press Finish to complete the installation.
Try retrieving some sample data.
Double click the Atomica tray icon.
Type any word.
The user should get a page with data returned from the server.

User Installation and Connection to the Publisher Suite

Before installing, verify the computer fulfills the following hardware and software requirements:
RAM: 64 MB (128 MB recommended)
Free Disk Space: 90 MB
TCP/IP connection to the Atomica Topic Warehouse™
Operating Systems: Microsoft Windows 2000 Service Release 1 and above, or
Windows NT4-Service Pack 5 and above
Web Browser: Internet Explorer 5 and above To install the Publisher and Security Manager applications:
Using Windows Explorer, double click on the Publisher installation executable file (TopicBuilderSetup.exe) located in folder \CDROM.

Follow the instructions of the Windows installation program wizard and press Finish to complete the installation.

Maintenance

Starting and Stopping the Atomica Server

The Atomica server (atsrv), Apache, Oracle and the LDAP server should restart automatically upon reboot. In addition, atsev is brought up by a daemon up to 1 minute after it stops. To stop atsrv, one must bring down the daemon as well.
To start the system:
[APACHE_ROOT]/bin/apachectl startssl
[ATOMICA_ROOT]/atsrv/bin/atsrvctl start
To stop the system:
[APACHE_ROOT]/bin/apachectl stop
[ATOMICA_ROOT]/atsrv/bin/atsrvctl stop It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

The invention claimed is:

1. A computer system for displaying information pertaining to any of a universe of topics, said information comprising at least partially structured data culled from a plurality of online data sources each storing a first multiplicity of at least partially structured online data entries each pertaining to an individual topic from among a second multiplicity of topics, wherein, for at least one topic, more than one online data entry pertains thereto, the system comprising:

a topic repository;

a topic builder including a user interface and being operative at least partially automatically to employ structure in at least partially structured data in said plurality of online data sources to facilitate access to said data from said plurality of online data sources, by topic, including unification of online data entries pertaining to a single topic, for display under said single topic, said unification comprising analyzing a set of topics to identify therewithin subsets of identical topics and collapsing the set by redefining all identical topics in each subset as a single topic; and a topic-oriented user interface employed by a user to access said data in association with said topic repository by topic.

2. A topic builder for use in a computer system for displaying information pertaining to any of a universe of topics, said information comprising at least partially structured data culled from a plurality of online data sources each storing a first multiplicity of at least partially structured online data entries each pertaining to an individual topic from among a second multiplicity of topics, wherein, for at least one topic, more than one online data entry pertains thereto, the system comprising a topic repository and a topic-oriented user interface employed by a user to access said data in said topic repository by topic, said topic builder including a user interface and being operative at least partially automatically to employ structure in at least partially structured data in said plurality of online data sources to facilitate access to said data from said plurality of online data sources, by topic, including unification of data entries pertaining to a single topic, for display under said single topic, said unification comprising analyzing a set of topics to identify therewithin subsets of identical topics and collapsing the set by redefining all identical topics in each subset as a single topic.

3. A system according to claim 1 and also comprising:

an access controller operative to selectively assign, to various users, permission to access data originating from various of the plurality of online data sources.

4. A system according to claim 1 wherein at least one logical combinations of at least one sequences of at least one keywords are deemed to pertain to a single topic.

5. A system according to claim 1 wherein said unification comprises unification based on overlap of significant words or phrases between entries.

6. A system according to claim 1 wherein said unification comprises unification of data entries based on similarity in meaning between at least one data fields which each data entry includes.

7. A system according to claim 1 wherein said unification comprises using fuzzy matching algorithms to compare texts of data entries.

8. A system according to claim 1 wherein said unification comprises internal unification within a single data source.

9. A system according to claim 1 wherein said unification comprises title-based unification based on titles of data entries.

10. A system according to claim 1 wherein said unification comprises manually changing at least one system-made unification decision.

11. A topic builder according to claim 2 wherein at least one logical combinations of at least one sequences of at least one keywords are deemed to pertain to a single topic.

12. A topic builder according to claim 2 wherein said unification comprises unification based on overlap of significant words or phrases between entries.

13. A topic builder according to claim 2 wherein said unification comprises unification of data entries based on similarity in meaning between at least one data fields which each data entry includes.

14. A topic builder according to claim 2 wherein said unification comprises using fuzzy matching algorithms to compare texts of data entries.

15. A topic builder according to claim 2 wherein said unification comprises internal unification within a single data source.

16. A topic builder according to claim 2 wherein said unification comprises title-based unification based on titles of data entries.

17. A topic builder according to claim 2 wherein said unification comprises manually changing at least one system-made unification decision.

* * * * *